(12) United States Patent
Yamaguchi et al.

(10) Patent No.: US 10,585,601 B2
(45) Date of Patent: Mar. 10, 2020

(54) INFORMATION PROCESSING APPARATUS, STORAGE APPARATUS, AND INFORMATION PROCESSING SYSTEM WHEREIN VIRTUAL VOLUME TO PHYSICAL VOLUME MAPPING IS UPDATED FROM MANAGEMENT MACHINE RESPONSIVE TO STORAGE INDICATING SAID PHYSICAL VOLUME IS NOT PRESENT

(71) Applicant: FUJITSU LIMITED, Kawasaki-shi, Kanagawa (JP)

(72) Inventors: Akio Yamaguchi, Hekinan (JP); Atsushi Kawamoto, Kasugai (JP); Yoshinari Shinozaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 146 days.

(21) Appl. No.: 15/430,995

(22) Filed: Feb. 13, 2017

(65) Prior Publication Data
US 2017/0262203 A1    Sep. 14, 2017

(30) Foreign Application Priority Data

Mar. 9, 2016   (JP) ................................. 2016-045980

(51) Int. Cl.
*G06F 3/06*   (2006.01)
*G06F 11/14*  (2006.01)
*G06F 9/455*  (2018.01)

(52) U.S. Cl.
CPC ............ *G06F 3/0619* (2013.01); *G06F 3/065* (2013.01); *G06F 3/0631* (2013.01);
(Continued)

(58) Field of Classification Search
None
See application file for complete search history.

(56) References Cited

U.S. PATENT DOCUMENTS 9,836,327 B1 *  12/2017  Brouwer ............... G06F 9/5077
2002/0029326 A1 *  3/2002  Reuter .................. G06F 3/0605
                                                                711/206
(Continued)

FOREIGN PATENT DOCUMENTS

| EP | 2565771 A1 * | 3/2013 |
|----|--------------|--------|
| JP | 2010-055548  | 3/2010 |
| JP | 2015-520423  | 7/2015 |

*Primary Examiner* — Ann J Lo
*Assistant Examiner* — Chie Yew
(74) *Attorney, Agent, or Firm* — Fujitsu Patent Center

(57) ABSTRACT

An information processing apparatus includes a memory and a processor configured to obtain information on a relation between virtual volumes used by a virtual machine and physical volumes provided in a storage apparatus from a management machine configured to manage allocations of the virtual volumes to the physical volumes; store the obtained information into a management information stored in the memory; and in response to receiving a copy request, obtain information on a first physical volume allocated to the first virtual volume designated as a copy participant in the copy request from the management information when the information on the first virtual volume is present in the management information, and send the storage apparatus a copy instruction designating the first physical volume as a copy participant. Obtain the information on the relation is performed when the information on the first virtual volume is not present in the management information.

10 Claims, 48 Drawing Sheets

(52) U.S. Cl.
CPC ........ *G06F 3/0683* (2013.01); *G06F 9/45558* (2013.01); *G06F 11/1402* (2013.01)

(56) References Cited

U.S. PATENT DOCUMENTS

2010/0036889 A1\* 2/2010 Joshi .................. G06F 9/45558
                                                                                                                 718/1
2010/0058014 A1    3/2010 Satou et al.
2013/0282887 A1   10/2013 Terayama et al.

\* cited by examiner

FIG. 8

ONE EXAMPLE OF VIRTUAL MACHINE INFORMATION
~22

| VIRTUAL MACHINE | DEVICE NAME | VOLUME NUMBER |
|---|---|---|
| A | /dev/sda | 0x01 |
| | /dev/sdb | 0x02 |
| | /dev/sdc | 0x03 |
| | /dev/sdd | 0x04 |
| | ... | ... |
| B | /dev/sda | 0x11 |
| | /dev/sdb | 0x12 |
| | ... | ... |
| ... | | |

FIG. 9

ONE EXAMPLE OF DEVICE MANAGEMENT INFORMATION
~35

| DEVICE NAME | VOLUME NUMBER |
|---|---|
| /dev/sda | 0x01 |
| /dev/sdb | 0x02 |
| /dev/sdc | 0x03 |
| /dev/sdd | 0x04 |
| ⋯ | ⋯ |

ONE EXAMPLE OF FLAG MANAGEMENT
INFORMATION

| VOLUME NUMBER | CONTROL FLAG |
|---|---|
| 0x01 | ON |
| 0x02 | ON |
| 0x03 | OFF |
| 0x04 | OFF |
| ⋮ | ⋮ |

INFORMATION PROCESSING APPARATUS, STORAGE APPARATUS, AND INFORMATION PROCESSING SYSTEM WHEREIN VIRTUAL VOLUME TO PHYSICAL VOLUME MAPPING IS UPDATED FROM MANAGEMENT MACHINE RESPONSIVE TO STORAGE INDICATING SAID PHYSICAL VOLUME IS NOT PRESENT

CROSS-REFERENCE TO RELATED APPLICATION

This application is based upon and claims the benefit of priority of the prior Japanese Patent Application No. 2016-045980, filed on Mar. 9, 2016, the entire contents of which are incorporated herein by reference.

FIELD

The embodiments discussed therein relate to an information processing apparatus, a storage apparatus, and an information processing system.

BACKGROUND

Systems that provide virtualization environments are known. Such a system may include host servers that are execution environments for virtual machines, a storage apparatus including physical volumes, and a management machine that manages the entire virtualization environment, for example.

In a virtualization environment, volumes for storing data are virtualized, and thus volumes visible from a virtual machine are virtual volumes. Data in virtual volumes is stored in storage areas in physical volumes associated with the virtual volumes. Thus, an operating system (OS) or applications running on the virtual machine can utilize the virtual volumes without being aware of the physical volumes.

Virtual machines executed on a host server, or volumes used by the virtual machines are managed by a management machine. For example, the management machine stores information on a relation between virtual volumes and physical volumes, and manages the volumes based on the information.

In the meantime, an application running on a virtual machine may carry out a copy (e.g., backup) of a volume in a storage apparatus to another volume, utilizing a function provided to the storage apparatus.

Patent Document 1: Japanese National Publication of International Patent Application No. 2015-520423
Patent Document 2: Japanese Laid-open Patent Publication No. 2010-55548

In a virtual machine, upon copying a volume, a copy participant volume may be designated by information that is recognized by the virtual machine (e.g., the device name of the virtual volume).

On the other hand, in a storage apparatus that stores data in the virtual volume into a physical volume, the copy participant volume may be designated only by information of that physical volume (e.g., physical volume number).

However, as set forth above, the information on a relation between virtual volumes and physical volumes is managed by the management machine, and hence the virtual machine does not have the information.

Since the information on the relation is managed by the management machine as described above, processing of copying a volume by the virtual machine can become complicated, and the processing time of the copy is sometimes prolonged.

SUMMARY

According to an aspect of the embodiments, an information processing apparatus includes a memory configured to store a management information; and a processor coupled to the memory. The processor is configured to obtain information on a relation between virtual volumes used by a virtual machine and physical volumes provided in a storage apparatus from a management machine configured to manage allocations of the virtual volumes to the physical volumes; store the obtained information on the relation into the management information stored in the memory; in response to receiving a copy request, determine whether or not information on a first virtual volume designated as a copy participant in the copy request is present in the management information; obtain information on a first physical volume allocated to the first virtual volume from the management information when the information on the first virtual volume is present in the management information, and send the storage apparatus a copy instruction designating the first physical volume as a copy participant; and obtain the information on the relation from the management machine when the information on the first virtual volume is not present in the management information, and update the management information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram depicting an exemplary data structure of virtual machine information;

FIG. 9 is a diagram depicting an exemplary data structure of device management information;

DESCRIPTION OF EMBODIMENTS

Hereinafter, embodiments of the present invention will be described with reference to the drawings. The embodiments discussed below, however, are merely exemplary, and it is not intended to exclude various modifications to and applications of the techniques. For example, the present embodiments may be practiced in a wide variety of modification without departing from the spirit thereof.

Figure 1:
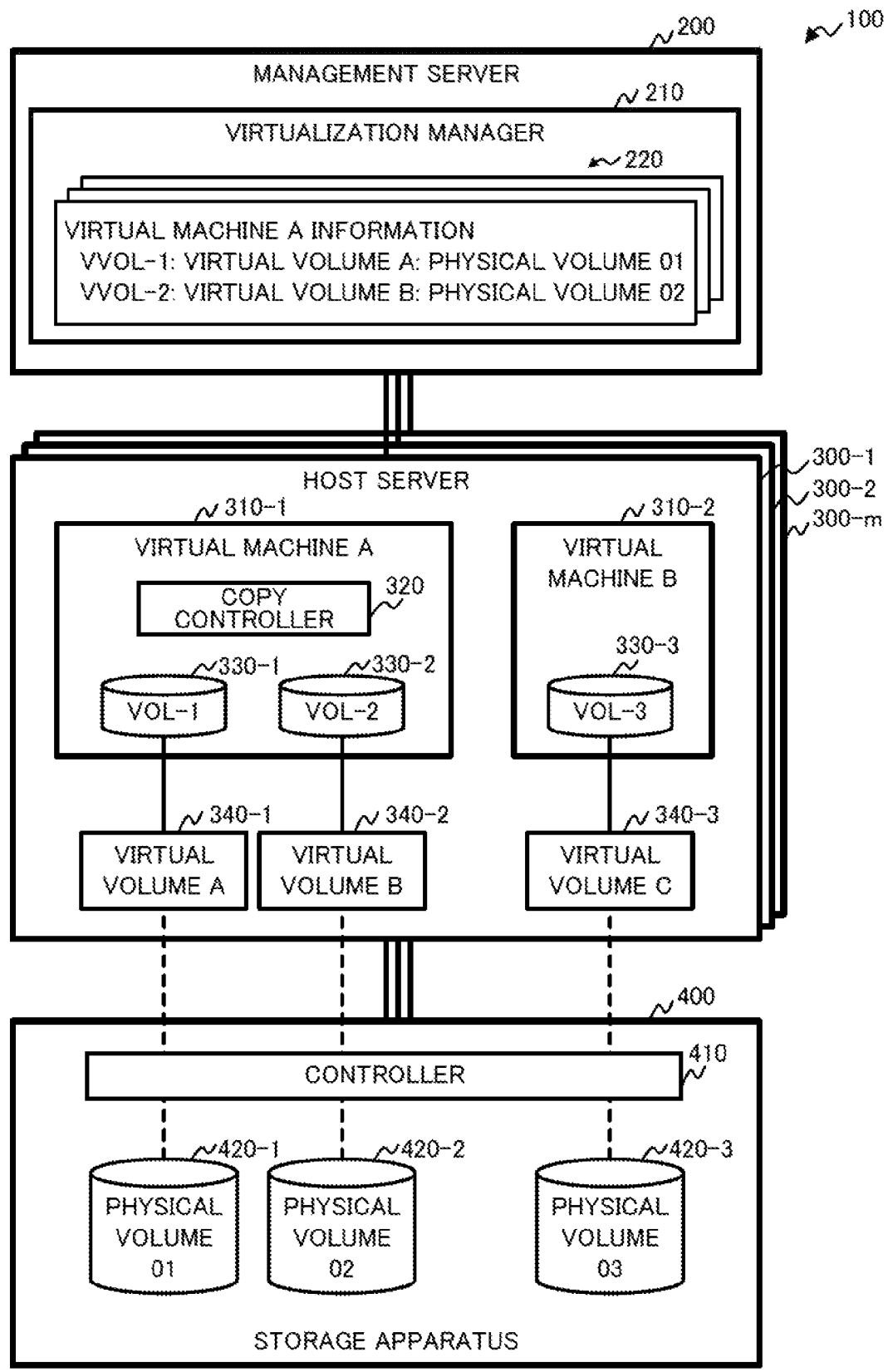
FIG. 1 is a block diagram depicting an exemplary configuration of an information processing system according to a comparative example.

In the drawings referenced to in the following description, elements denoted by like reference symbols denote the same or similar element, unless otherwise stated. Further, in the following description, when multiple elements are not distinguished from each other, the hyphen "-" and numbers following thereafter may be omitted. As an example, when host servers 300-1 to 300-*m* depicted in FIG. 1 are not distinguished from each other, they may be simply referred to as the host servers 300.

<1> Comparative Example

Firstly, referring to FIGS. 1 to 3, an information processing system 100 according to a comparative example will be described. The information processing system 100 is one example of a system that provides a virtualization environment. As depicted in FIG. 1, the information processing system 100 may include a management server 200, m (m is a natural number) host servers 300-1 to 300-*m*, and a storage apparatus 400, as an example.

The management server 200, the host servers 300, and the storage apparatus 400 may be communicatively connected to each other via a network (not illustrated), such as a local area network (LAN), for example.

The management server 200 is one example of a server that manages the entire virtualization environment, and includes a virtualization manager 210 that manages the virtualization environment, for example.

Each host server 300 is an execution environment for virtual machines 310. For example, the host server 300-1 executes virtual machines 310-1 and 310-2 that are provided to users.

As described above, the virtual platform tool for managing and providing the virtualization environment is deployed in the management server 200 and the host servers 300 in a distributed manner, for realizing the virtualization environment.

Each host server 300 also includes virtual volumes 340. The virtual volumes 340 are information on volumes managed by the host server 300 as files. For example, when VMWare® is used as a tool for a virtual platform, the virtual volumes 340 correspond to VMDK files.

Virtual volumes 340 are recognized as volumes 330 in a virtual machine 310. In the example in FIG. 1, virtual volumes 340-1 and 340-2 are recognized as volumes 330-1 and 330-2 in the virtual machine 310-1, respectively, and a virtual volume 340-3 is recognized as a volume 330-3 in the virtual machine 310-2.

Each virtual machine 310 can use the volumes 330 as devices provided to the virtual machine 310. Note that the "volumes" recognized by the virtual machines 310 may also be referred to as "devices" or "virtual disks".

The storage apparatus 400 is an apparatus provided with the volumes connected to the virtual machines 310, and includes a controller 410 that carries out various controls, and multiple (three in the example in FIG. 1) physical volumes 420-1 to 420-3, for example.

As depicted in FIG. 1, in the information processing system 100, one volume 330 is associated with one virtual volume 340, and one virtual volume 340 is associated with one physical volume 420.

The relation between the volumes 330 or the virtual volumes 340 and the associated physical volumes 420 is managed by virtual machine information 220 stored in a virtualization manager 210 in the management server 200. For each virtual machine 310, virtual machine information 220 stores information on the relation among volumes 330 (devices) provided to the virtual machine 310, virtual volumes 340, and physical volumes 420.

For example, a VVOL-1 (Virtual VOL-1), a virtual volume A, and a physical volume 01 are associated with each other, and a VVOL-2, a virtual volume B, and physical volume 02 are associated with each other, in virtual machine information 220 for the virtual machine 310-1 (virtual machine A information).

The storage apparatus 400 also provides a copy function of the volumes 330 by the controller 410. The term "copy" may include a copy and a backup of a volume 330.

The terms "copy" and "backup" refer to duplicating data in an entire volume 330 or a part of that volume 330 to another volume 330, and in the case of a backup, such a duplication is executed in regular intervals. Thereinafter, the terms "copy" and "backup" are collectively referred to as a "copy". Further, as set forth above, since one volume 330 is associated with one physical volume 420, a "copy of a volume" means a copy of data in a physical volume 420 associated with that volume 330.

Next, a copy of a volume 330 in a virtual machine 310 in the information processing system 100 employing the copy function provided to the storage apparatus 400, will be described.

A copy of the volume 330 may be carried out by means of a copy controller 320 deployed on a virtual machine 310 having a copy participant device, e.g., the virtual machine 310-1. The copy controller 320 runs on an OS on the virtual machine 310-1, and functions as an agent that carries out a copy control using the copy function provided to the storage apparatus 400.

A user of the virtual machine 310 issues a copy instruction, by designating a device name that is visible from the OS on the virtual machine 310, as a copy participant.

Here, the OS running on the virtual machine 310 does not recognize that the OS runs on a virtual machine, or is not aware that volumes 330 that are visible from the OS are actually virtual volumes. This is because the entire virtualization environment including the virtual machines 310 are managed by the management server 200, as set forth above. In other words, the virtual machine 310 does not know the volume 330 is allocated to which physical volume 420 (e.g., information on the allocated physical volume 420).

Hence, the user does not have to be aware that devices visible from the OS are actually (are allocated to) which physical volumes 420.

On the other hand, since the storage apparatus 400 does not have device names used by the OS on the virtual machine 310, the storage apparatus 400 can accept only copy instructions designating copy participants (targets) using physical volume numbers. Accordingly, the copy controller 320 employing the copy function provided in the storage apparatus 400 specifies a copy participant by a physical volume number used by the copy function for copy processing, in a copy instruction, instead of a device name managed by the OS.

In order to send a copy instruction to the storage apparatus 400, it is possible for the copy controller 320 to execute conversion processing of converting a device name designated by the user to a physical volume number used in the storage apparatus 400, for example.

The relations between device names and physical volume numbers are managed in the virtual machine information 220 in the management server 200. Hence, the copy controller 320 may obtain the relations by making an inquiry about the physical volume number associated with the device name designated by the user in the conversion processing, to the management server 200.

Hereinafter, referring to FIGS. 2 and 3, an exemplary operation of copy processing in the information processing system 100 will be described. As depicted in FIG. 3, the user of the virtual machine 310 accesses the management server 200 and the host servers 300 using a terminal apparatus 500, for example.

Firstly, a procedure of creating a copy participant volume 330 will be described. As depicted in FIG. 2, the terminal apparatus 500 sends the virtualization manager 210 in the management server 200, a creation instruction of a volume 330 to be used on the virtual machine 310 (Processing T1).

The virtualization manager 210 sends the volume creation instruction to the controller 410 in the storage apparatus 400 (Processing T2). Note that the virtualization manager 210 may determine the device name and the physical volume number of a volume to be created. In this case, the creation instruction from the virtualization manager 210 may include at least one of the device name and the physical volume number.

The controller 410 creates a physical volume 420 based on the volume creation instruction (Processing T3). Note that creation of the physical volume 420 may involve an allocation of the physical volume 420 to a volume 330. In the example in FIGS. 2 and 3, the physical volume 420-1 (0x01) is allocated to the volume 330-1 (/dev/sda), and the physical volume 420-2 (0x02) is allocated to the volume 330-2 (/dev/sdb). Here, "/dev/sda" and "/dev/sdb" are examples of device names used in the OS on the virtual machine 310.

Once the volume creation completes, the controller 410 sends a completion response to the virtualization manager 210 (Processing T4), and the virtualization manager 210 sends the completion response to the terminal apparatus 500 (Processing T5). After Processing T2 or after Processing T4, the virtualization manager 210 registers the relation between the created volume 330 and the physical volume 420 to the virtual machine information 220.

Next, copy processing will be described. The terminal apparatus 500 designates the device names and sends the copy controller 320 a copy instruction from the device with the device name "/dev/sda" to the device with the device name "/dev/sdb" (Processing T6; refer to the arrow (a) in FIG. 3). The copy controller 320 initiates a copy control for the designated device names (Processing T7).

In the copy control, the copy controller 320 requests the virtualization manager 210 to obtain physical volume numbers associated with the designated device names (Processing T8). The virtualization manager 210 obtains relationship information between the device names and physical volume numbers (Processing T9), and notifies the copy controller 320 of the obtained information (Processing T10).

Figure 3:
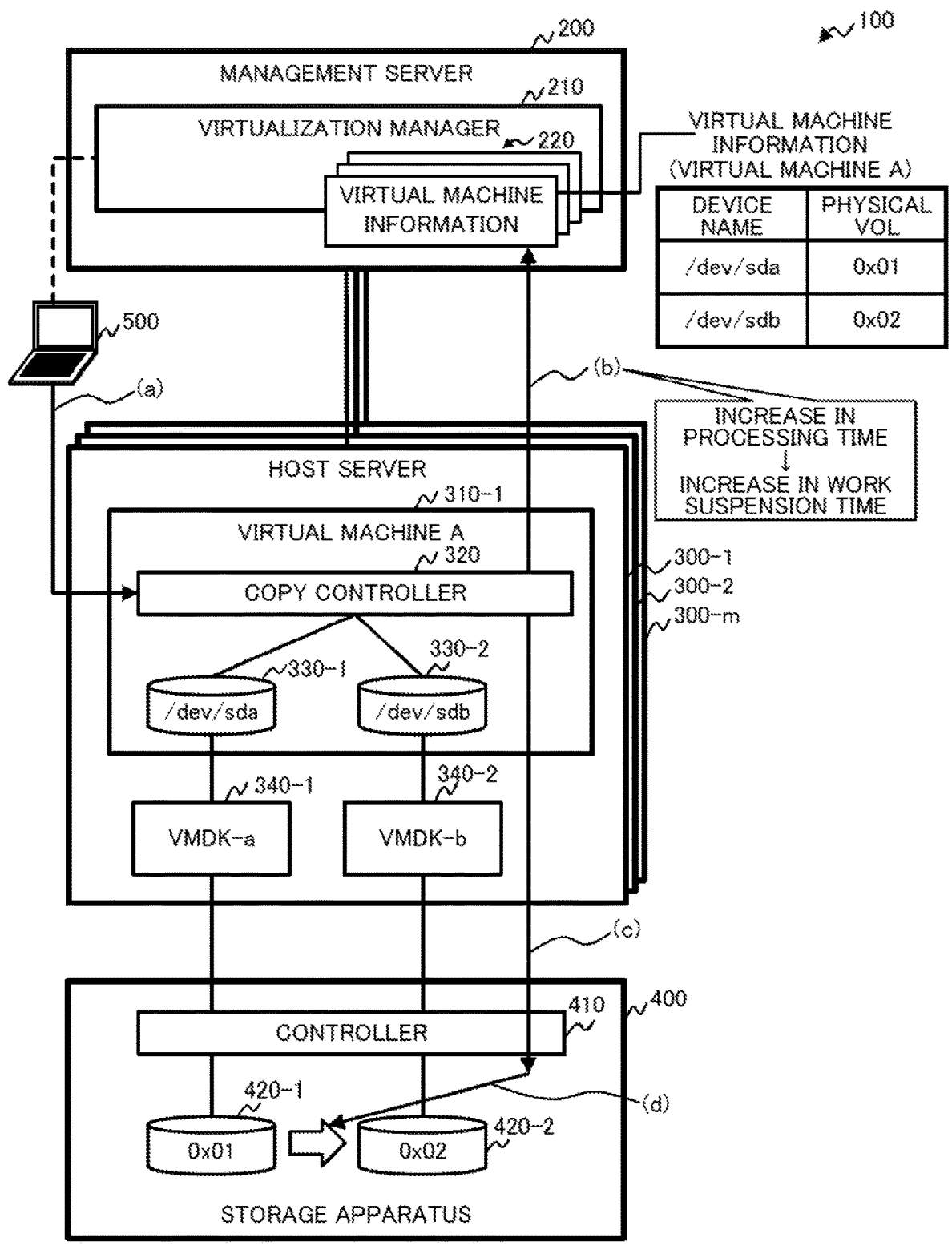
FIG. 3 is a diagram illustrating an exemplary operation of copy processing in the information processing system according to the comparative example.

In Processing T8-T10, the copy controller 320 can determine physical volume numbers in the storage apparatus 400, which are associated with the devices designated via the terminal apparatus 500, based on the obtained relationship information (Processing A1; refer to the arrow (b) in FIG. 3).

Subsequently, the copy controller 320 designates the physical volume numbers to the controller 410, and sends a copy instruction from the physical volume with the volume number "0x01" to the physical volume with the volume number "0x02" (Processing T11; refer to the arrow (c) in FIG. 3). The controller 410 executes the designated copy processing from the physical volume with the volume number "0x01" to the physical volume with the volume number "0x02" (Processing T12, Processing B1; refer to the arrow (d) in FIG. 3).

Once the copy completes, the controller 410 sends a completion response to the virtual machine 310 (Processing T13), the copy controller 320 sends a completion response to the terminal apparatus 500 (Processing T14), and the processing ends.

Figure 2:
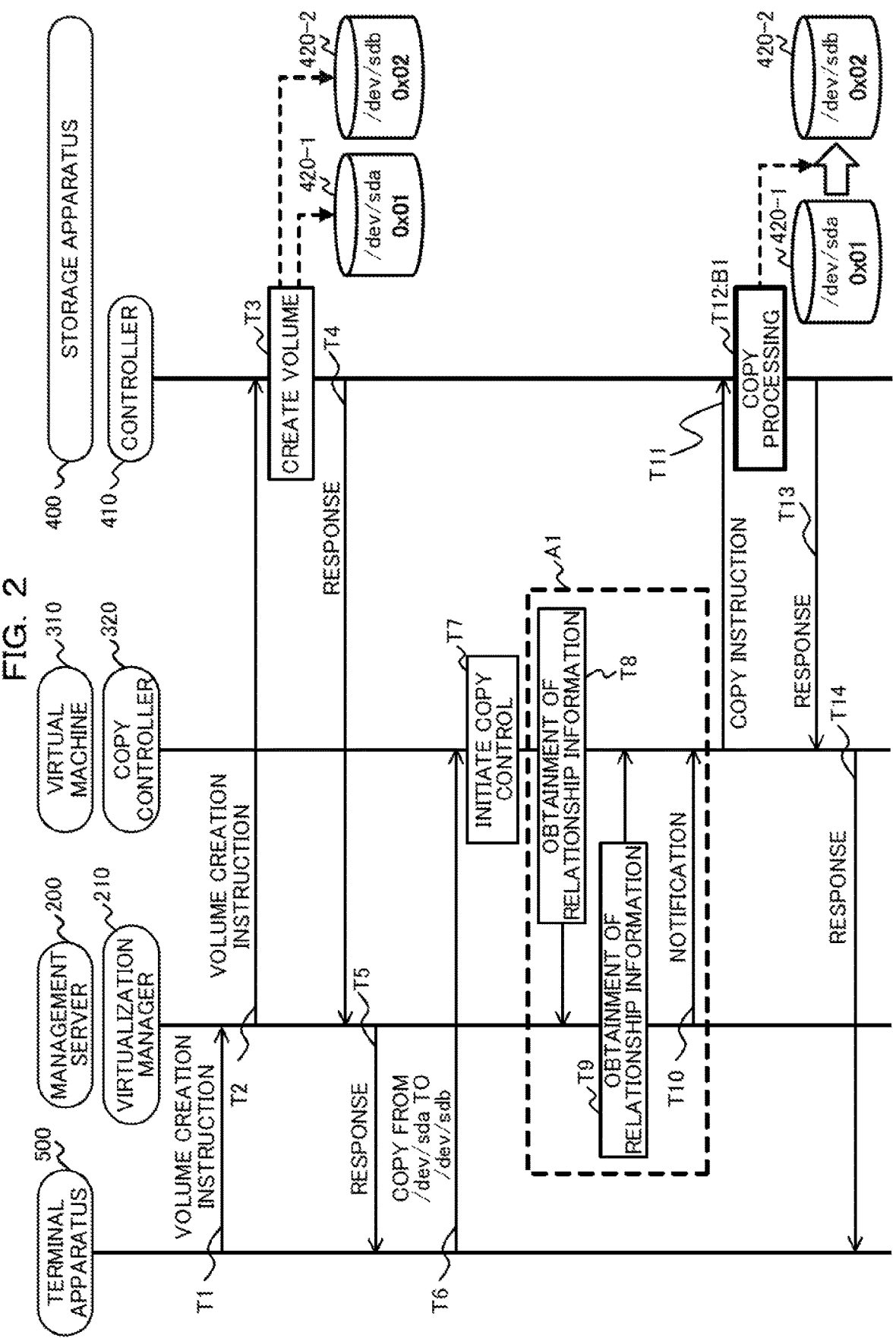
FIG. 2 is a sequence diagram depicting an exemplary operation of copy processing in the information processing system according to the comparative example.

Note that, in the information processing system 100, every time a copy instruction is sent from the terminal apparatus 500, Processing T6 to T14 in FIG. 2 (processing indicated by the arrows (a) to (d) in FIG. 3) is executed.

In accordance with the comparative example operation depicted in FIGS. 2 and 3, however, the following disadvantages may arise.

In a virtualization environment, the processing time may be prolonged as compared to that in a physical environment, in the processing of determining a physical volume number in the storage apparatus 400 from a device (Processing A1 in FIG. 2 and the arrow (b) in FIG. 3), which results in an increase in the copy time (work suspension time) for the following reasons:

In a virtualization environment, the volumes 330 visible from the OS are virtual volumes. Thus, for determining a physical volume number from a device name, processing of identifying a relation among a device (e.g., "/dev/sda"), a virtual volume 340 (e.g., "VMDK-a" file), and a physical volume 420 is to be executed.

In order to determine the relation, the information is obtained from the virtual platform on the management server 200 (e.g., the virtualization manager 210), as well as from the OS on the virtual machine 310 and the storage apparatus 400, for each copy processing. Since the information is obtained from the virtual platform on the management server 200 through a LAN, the communication delay depends on the performance of the network.

Further, the management server 200 manages all of the virtual machines 310. Accordingly, in a large-scale virtualization environment wherein the number of host servers 300 (a value of "m") is hundreds or thousands, the processing time may be prolonged due to the processing load on the management server 200, for example.

<2> Embodiments

In such a situation, a technique for reducing the processing time of a copy of a virtual volume in the operation configuration of the above-described information processing system 100, in first and second embodiments that will be described later, will be described. Note that an exemplary configuration of an information processing system described below may be used in the first and second embodiments that will be described later.

<2-1> Exemplary Configuration of Information Processing System

Firstly, referring to FIG. 4, an exemplary configuration of an information processing system 1 according to the first and second embodiments will be described.

Figure 4:
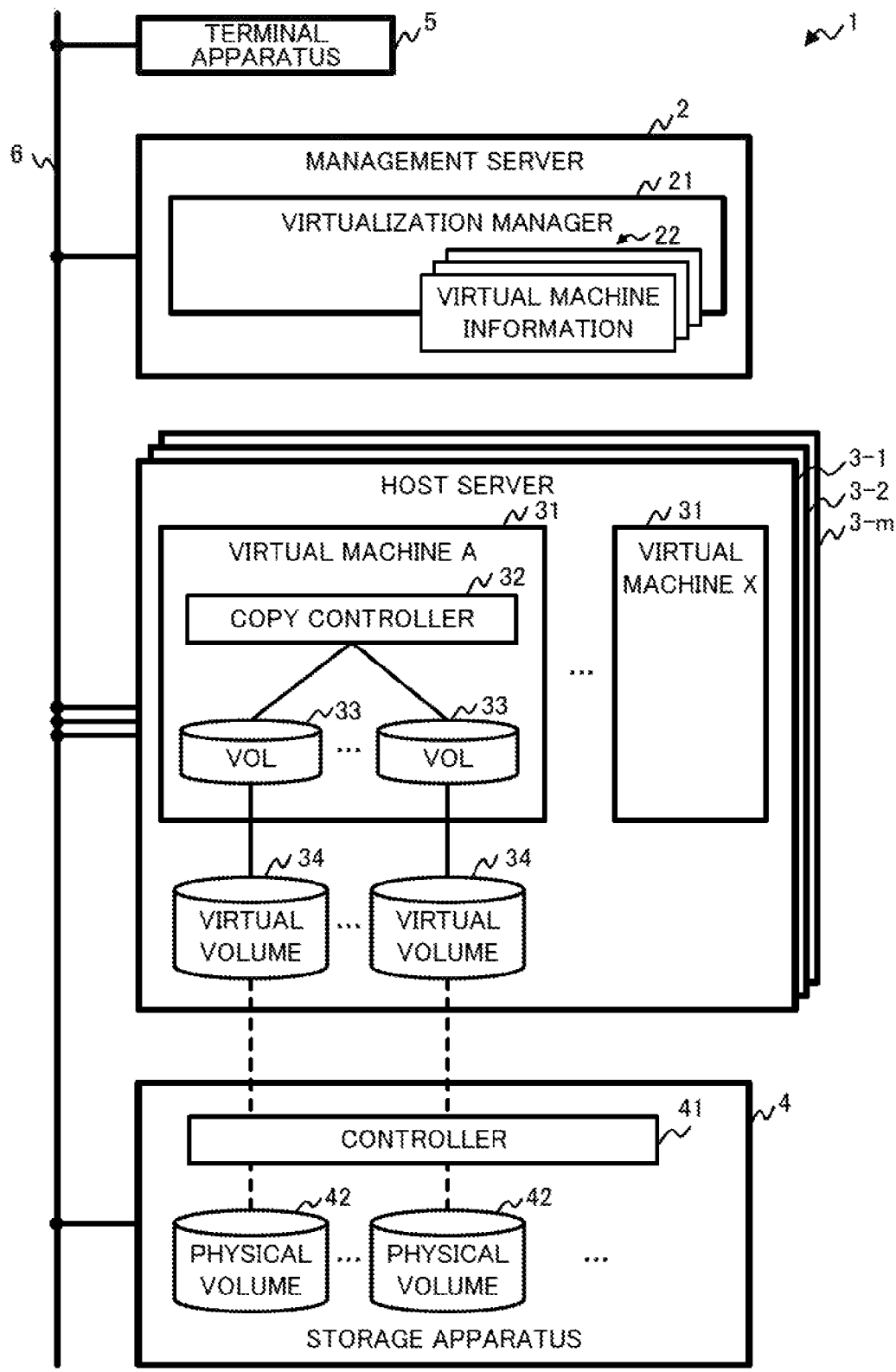
FIG. 4 is a block diagram depicting an exemplary configuration of an information processing system according to first and second embodiments.

As depicted in FIG. 4, the information processing system 1 is one example of a system that provides a virtualization environment. The information processing system 1 may include a management server 2, multiple host servers 3-1 to 3-*m*, and one or more (one in the example in FIG. 4) storage apparatuses 4, as an example. Note that in the following description, unless otherwise stated, the configuration or processing of the information processing system 1 may be the same as those of the information processing system 100 depicted in FIG. 1.

The management server 2, the host servers 3, and the storage apparatus 4 may be communicatively connected to each other via a network 6, such as a LAN, for example. The network 6 may also be connected to a terminal apparatus 5.

The management server 2 is one example of a server that manages the entire virtualization environment, and is one example of a management machine that manages respective allocations of physical volumes 42 to volumes 33. For example, the management server 2 includes a virtualization manager 21. The virtualization manager 21 is one example of an application that manages the virtualization environment.

Each host server 3 is an execution environment for virtual machines 31 provided to users. In such a host server 3, multiple virtual machines 31 (e.g., virtual machines A to X) may be executed.

Each host server 3 also includes virtual volumes 34. The virtual volumes 34 are information on volumes managed by the host server 3 as files. For example, when VMWare® is used as a tool for a virtual platform, the virtual volumes 34 correspond to VMDK files.

The virtual volumes 34 are recognized as volumes 33 in the virtual machine 31. Each virtual machine 31 can use the volumes 33 as devices provided to the virtual machine 31. Note that the volumes 33 and the virtual volumes 34 may also be regarded as virtual volumes.

The storage apparatus 4 is an apparatus that includes volumes connected to the virtual machines 31, and includes a controller 41 that carries out various controls, and multiple physical volumes 42, for example. The controller 41 may be embodied by a controller module (CM) that executes firmware, for example.

The physical volumes 42 may be logical volumes, each embodied by one or more storage devices, and may be a disk group configured with a Redundant Arrays of Inexpensive Disks (RAID), for example.

Similar to the information processing system 100, it is also assumed in the information processing system 1 according to the embodiments that one volume 33 is associated with one virtual volume 34, and one virtual volume 34 is associated with one physical volume 42.

The relation between the volumes 33 and the associated physical volumes 42 is managed by virtual machine information 22 stored in a virtualization manager 21 in the management server 2. For each virtual machine 31, virtual machine information 22 stores information on a relation between volumes 33 (devices) provided to the virtual machine 31 and physical volumes 42.

The storage apparatus 4 also provides a copy function of the volumes 33 by the controller 41.

A copy of the volume 33 may be carried out by means of a copy controller 32 deployed on a virtual machine 31 having a copy participant device. The copy controller 32 runs on an OS on the virtual machine 31, and functions as an agent that carries out a copy control using the copy function provided to the storage apparatus 4.

A user of the virtual machine 31 may operate the terminal apparatus 5 connected to the host server 3, and may issue a copy instruction to the virtual machine 31, by designating a device name that is visible from the OS on the virtual machine 31, as a copy participant.

The copy controller 32 may execute conversion processing of converting from a device name designated by the user to a physical volume number on the storage apparatus 4, and may send the storage apparatus 4 a copy instruction designating the resultant physical volume number. In the conversion processing, the copy controller 32 may obtain relationship information between a device name and a physical volume number. The obtainment processing of the relationship information will be described later.

<2-2> Example of Hardware Configuration

Next, exemplary hardware configurations of the management server 2, the host servers 3, the storage apparatus 4, and the terminal apparatus 5 will be described. Note that the management server 2, the host servers 3, the CM in the storage apparatus 4, and the terminal apparatus 5 may all have similar hardware configurations. Hereinafter, the management server 2, the host servers 3, the CM in the storage apparatus 4, and the terminal apparatus 5 are collectively referred to as computers 10 for the sake of convenience, and an exemplary hardware configuration of the computers 10 will be described.

Figure 5:
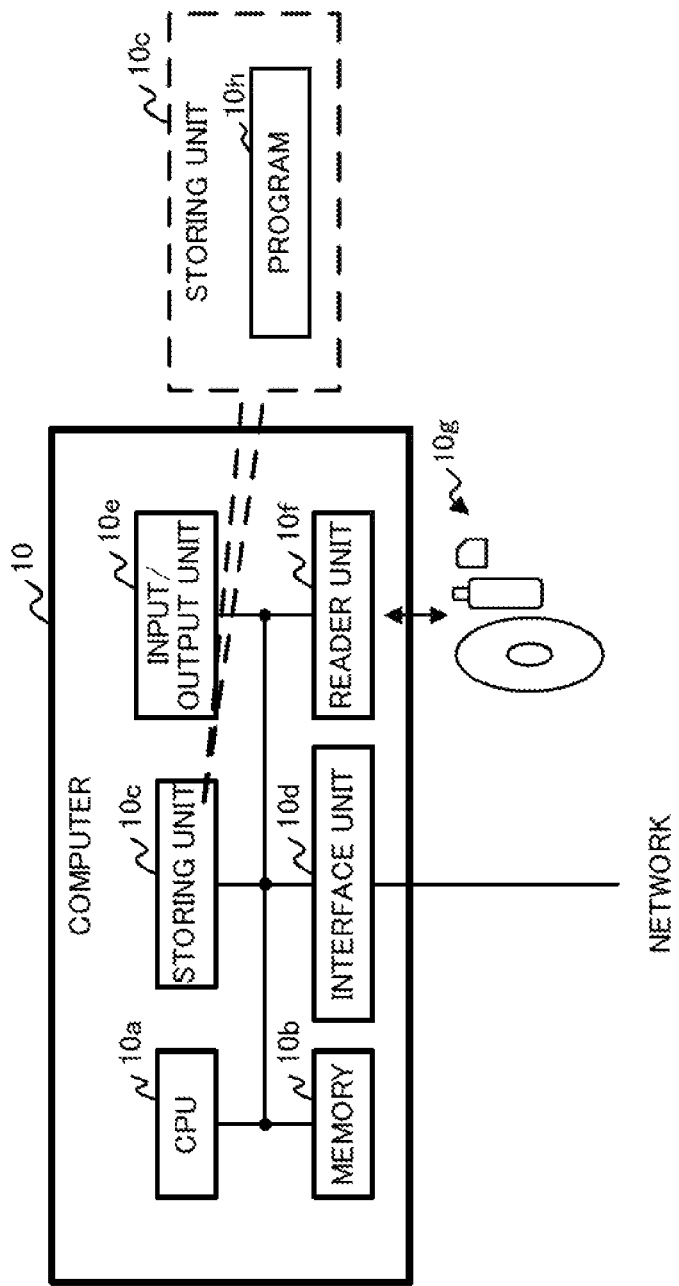
FIG. 5 is a block diagram depicting an exemplary hardware configuration of a computer according to the first and second embodiments.

As depicted in FIG. 5, each computer 10 includes a CPU 10a, a memory 10b, a storing unit 10c, an interface unit 10d, an input/output unit 10e, and a reader unit 10f, as an example.

The CPU 10a is one example of a processor that carries out various controls and computations. The CPU 10a may be communicatively connected to each block in the computer 10 via a bus. In place of a computing processing device (e.g., the CPU 10a), an electric circuit, such as an integrated circuit (IC), e.g., a micro processing unit (MPU), an application specific integrated circuit (ASIC), or a field programmable gate array (FPGA), may be used, as the processor.

The memory 10b is one example of hardware that stores information, such as various types of data and programs. Examples of the memory 10b include a volatile memory, such as a random access memory (RAM), for example.

The storing unit 10c is one example of hardware that stores information, such as various types of data and programs. Examples of the storing unit 10c include a wide variety of devices, such as a magnetic disk device, e.g., a hard disk drive (HDD); a semiconductor drive device, e.g., a solid state drive (SSD); and a non-volatile memory, e.g., a flush memory and a read only memory (ROM).

For example the storing unit 10c may store a program 10h for embodying all or a part of the functions of the computer 10. The CPU 10a can embody the functions of the computer 10 by saving the program 10h stored in the storing unit 10c into the memory 10b, and executing it, for example.

The interface unit 10d is one example of a communication interface that controls connections, communications, and the like, to the network 6 or the devices under the control. For example, examples of the interface unit 10d include an adaptor compliant with standards, such as LANs, the SAS, the Fibre Channel (FC), the Infiniband, the Universal Serial Bus (USB), and Bluetooth®. Note that SAS is an abbreviation for Serial Attached SCSI (Small Computer System Interface).

Note that the program 10h may be download from the network 6 and the like to the computer 10 via the interface unit 10d.

The input/output unit 10e may include one or both of an input unit, e.g., a mouse, a keyboard, and operation buttons, and an output unit, e.g., a display and a printer.

The reader unit 10f is one example of a reader that reads information of data and programs recorded in the storage medium 10g. The reader unit 10f may include a connection slot or connector to which the computer-readable storage medium 10g is connected or inserted. Examples of the reader unit 10f include an adaptor compliant with the USB or the like, a drive device that accesses a recording disk, and a card reader that accesses a flush memory, e.g., an SD card, for example. Note that the program 10h may be stored in the storage medium 10g.

Examples of the storage medium 10g include a non-transitory storage medium, such as a flexible disk, and an optical disk, e.g., a CD, a DVD, a Blu-ray disk, and a flush memory, e.g., a USB memory and an SD card, as an example. Examples of the CD include a CD-ROM, a CD-R, and a CD-RW, as an example. Examples of the DVD include a DVD-ROM, a DVD-RAM, a DVD-R, a DVD-RW, a DVD+R, and a DVD+RW, as an example.

The above-described hardware configuration of the computer 10 is exemplary. Hence, hardware may be added or deleted (e.g., addition or deletion of any block), divided, or combined in any combinations, or a bus may be added or deleted, where appropriate, in the computer 10. Another hardware configuration may also be provided among the management server 2, the host servers 3, the CM in the storage apparatus 4, and the terminal apparatus 5.

Figure 6:
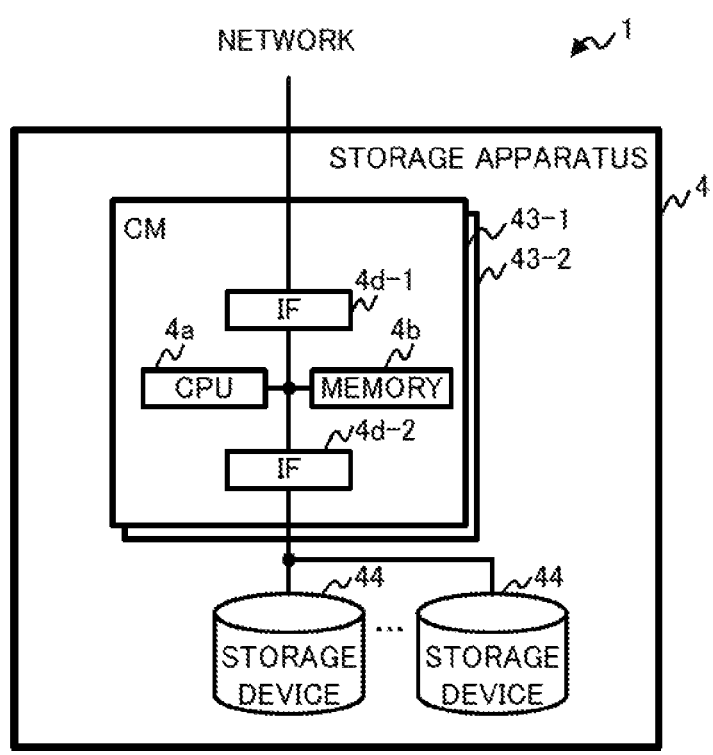
FIG. 6 is a block diagram depicting an exemplary hardware configuration of a storage apparatus according to the first and second embodiments.

FIG. 6 depicts an exemplary hardware configuration of the storage apparatus 4. The storage apparatus 4 may include multiple (two in the example in FIG. 6) CMs 43-1 and 43-2 and multiple storage devices 44, as an example. Note that the CMs 43 for providing redundancy may be communicatively connected to each other through an SAS cable and the like.

Each CM 43 may include a CPU 4a, a memory 4b, and interfaces (IF) 4d-1 and 4d-2, as an example. The CPU 4a and the memory 4b are examples of the CPU 10a and the memory 10b in the computer 10 depicted in FIG. 5, respectively.

The IF 4d-1 is one example of a communication interface (host interface) that controls connections and communications with the apparatuses connected to the network 6, e.g., the management server 2, the host servers 3, or the terminal apparatus 5, for example. Examples of the IF 4d-1 include one or more channel adaptors (CAs) having adaptors compliant with standards, such as LANs, the SAS, the FC, the InfiniBand, for example.

The IF 4d-2 is one example of a communication interface that controls connections and communications with the storage devices 44, for example. Examples of the IF 4d-2 include a device adapter (DA) compliant with standards, such as the SAS, the SATA, the FC, for example. SATA is an abbreviation for Serial ATA (Advanced Technology Attachment).

Each storage device 44 is one example of hardware that stores information, such as various types of data and programs. Examples of the storage devices 44 include a wide variety of devices, such as a magnetic disk device, e.g., an HDD, and a semiconductor drive device, e.g., an SSD, for example. The physical volumes 42 depicted in FIG. 4 may be embodied by storage areas in one or more storage devices 44. Note that the storage devices 44 may be mounted in a drive enclosure (DE) that encloses multiple storage devices 44, for example.

<3> First Embodiment

Next, the first embodiment will be described. In the first embodiment, when an initial copy is executed or presetting is configured, a virtual machine 31 stores relationship information indicating relation between device names and physical volume numbers, in the virtual machine 31. When a copy is executed, the virtual machine 31 executes conversion processing, by looking up the relationship information stored in the virtual machine 31.

As described above, in the first embodiment, since the virtual machine 31 generates its own relationship information and stores it locally, it is possible to reduce the conversion time, i.e., the copy processing time.

<3-1> Exemplary Functional Configuration

Firstly, referring to FIGS. 7 to 9, an exemplary functional configuration of the information processing system 1A according to the first embodiment will be described.

The virtualization manager 21 in the management server 2 may include a memory unit 23 and an information manager 24, as an example. The memory unit 23 stores information of the virtual machine information 22. The memory unit 23 may be embodied by storage areas in the memory 10b depicted in FIG. 5, for example.

FIG. 8 depicts an exemplary data structure of the virtual machine information 22. As depicted in FIG. 8, the virtual machine information 22 may contain virtual machines 31, device names of devices provided in the virtual machines 31, and volume numbers of physical volumes 42 associated with the device names, as an example. As an example, the virtual machine information 22 indicates that "a virtual machine A" includes devices with device names "/dev/sda", "/dev/sdb", "/dev/sdc", "/dev/sdd", . . . , and that volume numbers "0x01", "0x02", "0x03", "0x04", . . . , are associated with those devices.

The information manager 24 manages the virtual machine information 22. For example, the information manager 24 may update the virtual machine information 22, in response to a change in the virtualization environment, or may obtain apart of information of the virtual machine information 22 in response to a request from a virtual machine 31, and may send it to that virtual machine 31. Examples of the trigger for updating the virtual machine information 22 include addition (deployment) or deletion of a virtual machine 31 to or from a host server 3, and addition or deletion of a volume 33 to or from a virtual machine 31.

The copy controller 32A in the virtual machine 31 may include a copy unit 36, a memory unit 37, and an information obtainment unit 38A, as an example. The memory unit 37 stores information of a device management information 35. The memory unit 37 may be embodied by storage areas in the memory 10b depicted in FIG. 5, for example.

FIG. 9 depicts an exemplary data structure of the device management information 35. The device management information 35 is one example of management information that manages a relation between a device name and a physical volume number. As depicted in FIG. 9, the device management information 35 may contain device names and volume numbers of physical volumes 42 associated with the device names, as an example. The device management information 35 may be similar to information of entries of local virtual machines 31 in the virtual machine information 22, for example.

In response to receiving a copy instruction from the terminal apparatus 5, the copy unit 36 converts a device name designated in the copy instruction as a copy participants, to physical volume numbers, and sends the storage apparatus 4 a copy request designating those physical volume numbers. For example, the copy unit 36 may carry out the following processing:

The copy unit 36 may determine whether or not information of a first virtual volume (e.g., device name) that is designated in a copy instruction as a copy participant, is present in the device management information 35. When the designated device name is present in the device management information 35, the copy unit 36 may obtain physical volume numbers allocated to device names designated in the copy instruction, e.g., copy source and copy destination device names, from the device management information 35. Otherwise, when the device name designated in the copy instruction is not present in the device management information 35, the copy unit 36 may instruct the information obtainment unit 38A to update the device management information 35, and may obtain physical volume numbers, using the updated device management information 35.

The information obtainment unit 38A is one example of an obtainment unit that obtains information on the relation from the management server 2. For example, the information obtainment unit 38A obtains the relationship information from the management server 2, and stores the obtained relationship information in the device management information 35 to update the device management information 35. The obtainment processing of the relationship information by the information obtainment unit 38A may be carried out as follows:

When the device designated in the copy instruction is not present in the device management information 35, the information obtainment unit 38A makes an inquiry about the relationship information related to the designated device name to the management server 2, and sets the relationship information received from the management server 2 in the device management information 35. The information obtainment unit 38A may make an inquiry about the relationship information to the management server 2 when a copy is executed for the first time, for example.

Note that the relationship information inquired by the information obtainment unit 38A of the management server 2 may be the relationship information for all of the volumes 33 provided to the local virtual machine 31, or may be limited to the relationship information for a device name designated in the copy instruction.

Otherwise, when the device designated in the copy instruction is present in the device management information 35, the information obtainment unit 38A does not make an inquiry about the relationship information to the management server 2 since the copy unit 36 obtains the relationship information from the device management information 35. In this configuration, possible delay time of copy processing is reduced which might be experienced when the relationship information is inquired of the management server 2.

Note that the information obtainment unit 38A may obtain the relationship information about all of the volumes 33 provided to the local virtual machine 31 from the management server 2 at predetermined timing, such as upon or after a startup of the copy controller 32A. In this configuration, frequent inquiries of the relationship information to the management server 2 is reduced in response to a copy instruction received from the terminal apparatus 5.

The controller 41A in the storage apparatus 4 may include a copy processing unit 45A, as an example. The copy processing unit 45A, in response to a copy instruction received from the copy controller 32A, carries out a copy of a volume 33 with a physical volume number designated in the copy instruction.

<3-2> Exemplary Operations

Figure 12:
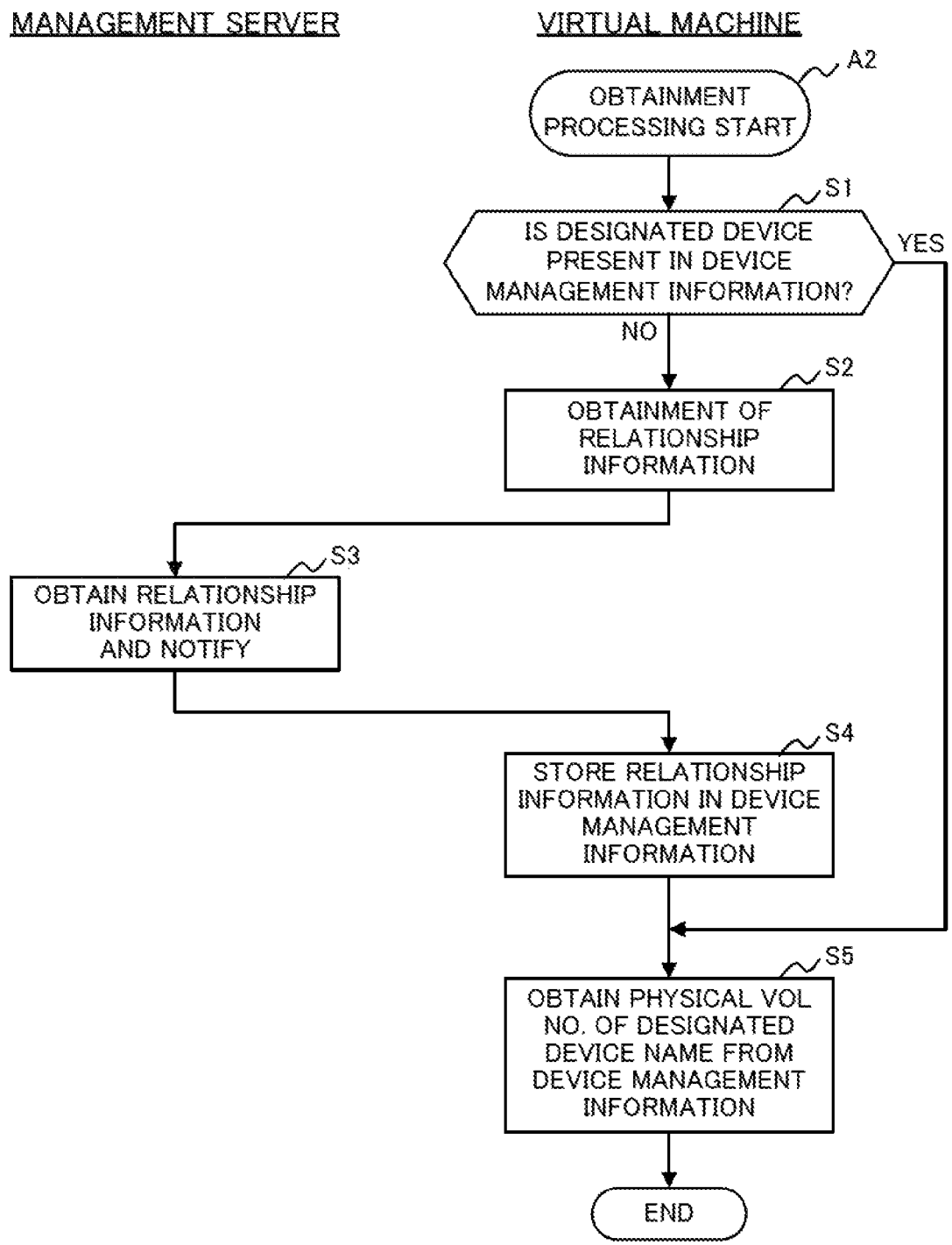
FIG. 12 is a flowchart illustrating obtainment processing in a virtual machine and a management server.
Figure 13:
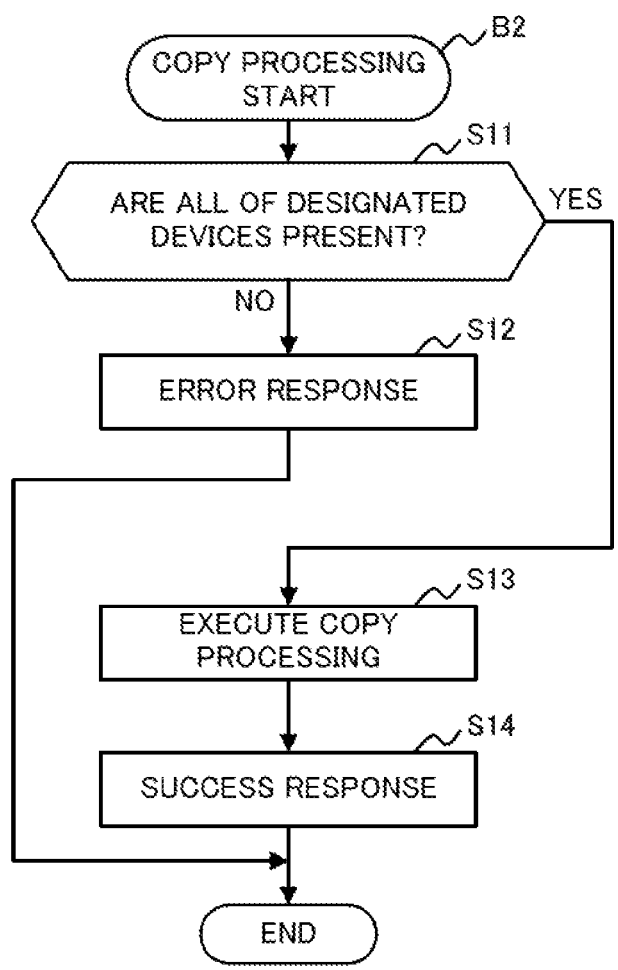
FIG. 13 is a flowchart illustrating copy processing in the storage apparatus.
Figure 14:
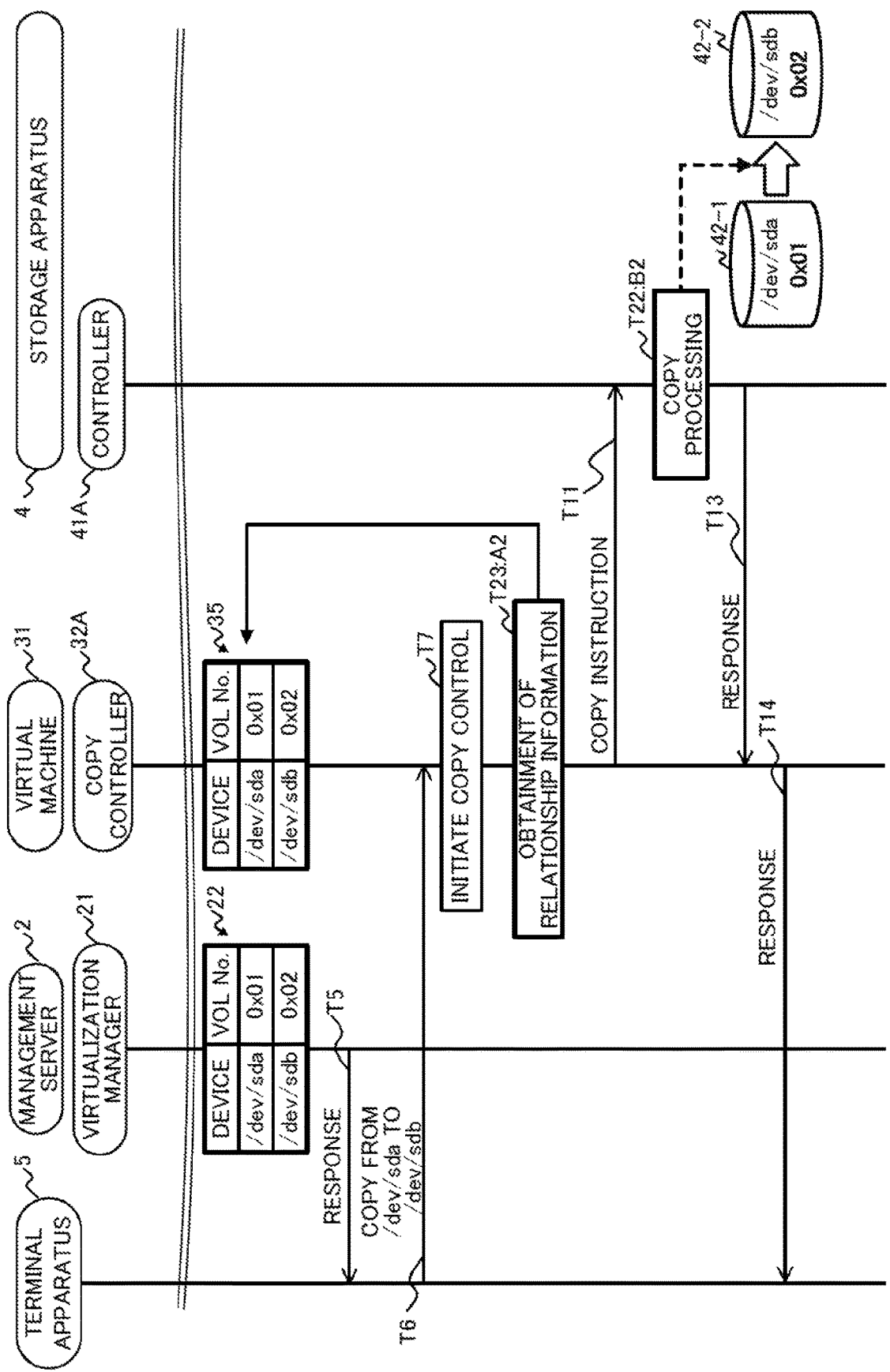
FIG. 14 is a sequence diagram depicting an exemplary operation when second and subsequent copies are executed.
Figure 15:
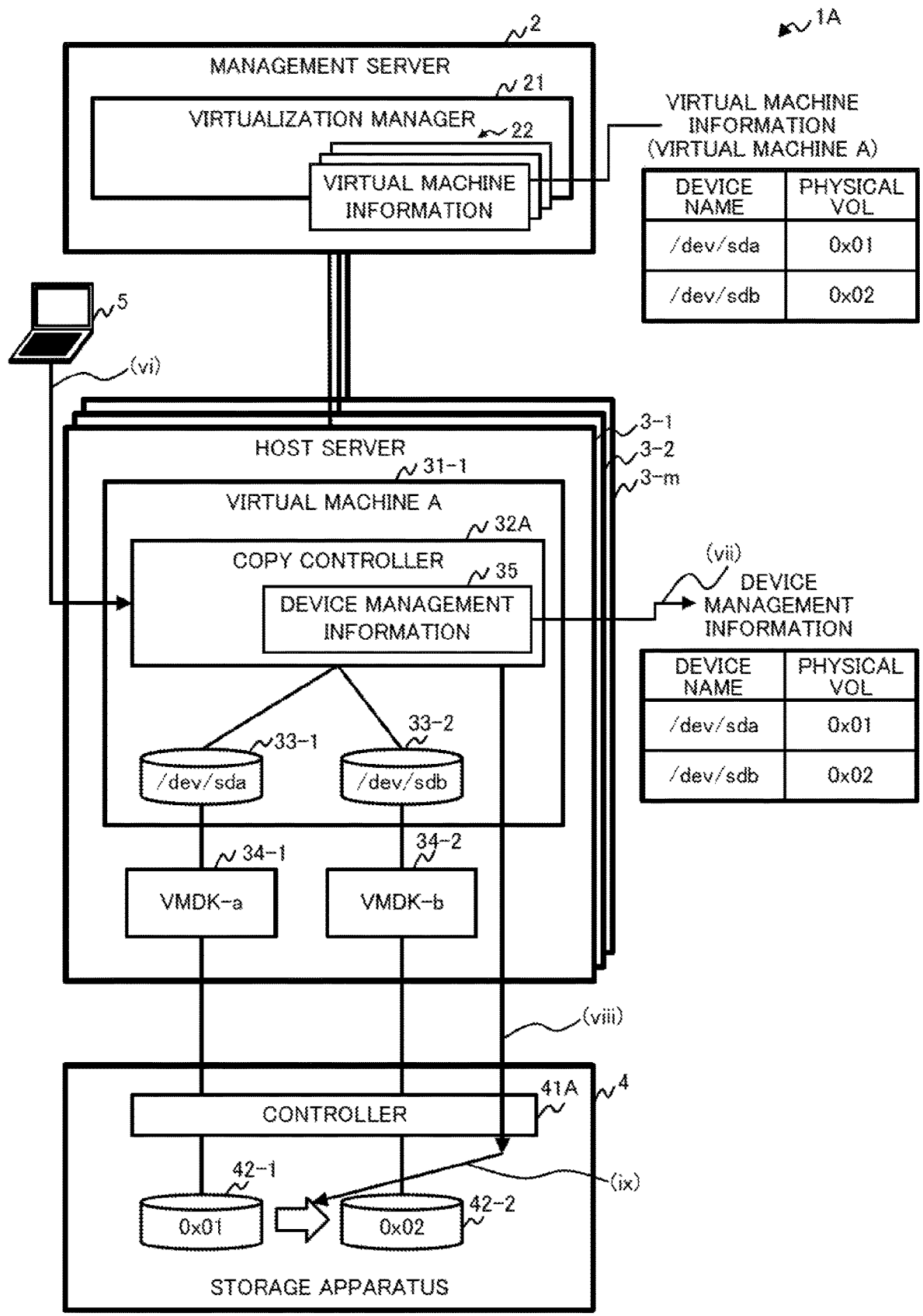
FIG. 15 is a diagram illustrating an exemplary operation when second and subsequent copies are executed.

Hereinafter, referring to FIGS. 10 to 15, an exemplary operation of copy processing in the information processing system 1A will be described. Note that FIGS. 10 and 11 depict an exemplary operation when an initial copy is executed, for example; and FIGS. 14 and 15 depict an exemplary operation when second and subsequent copies are executed, for example.

Figure 10:
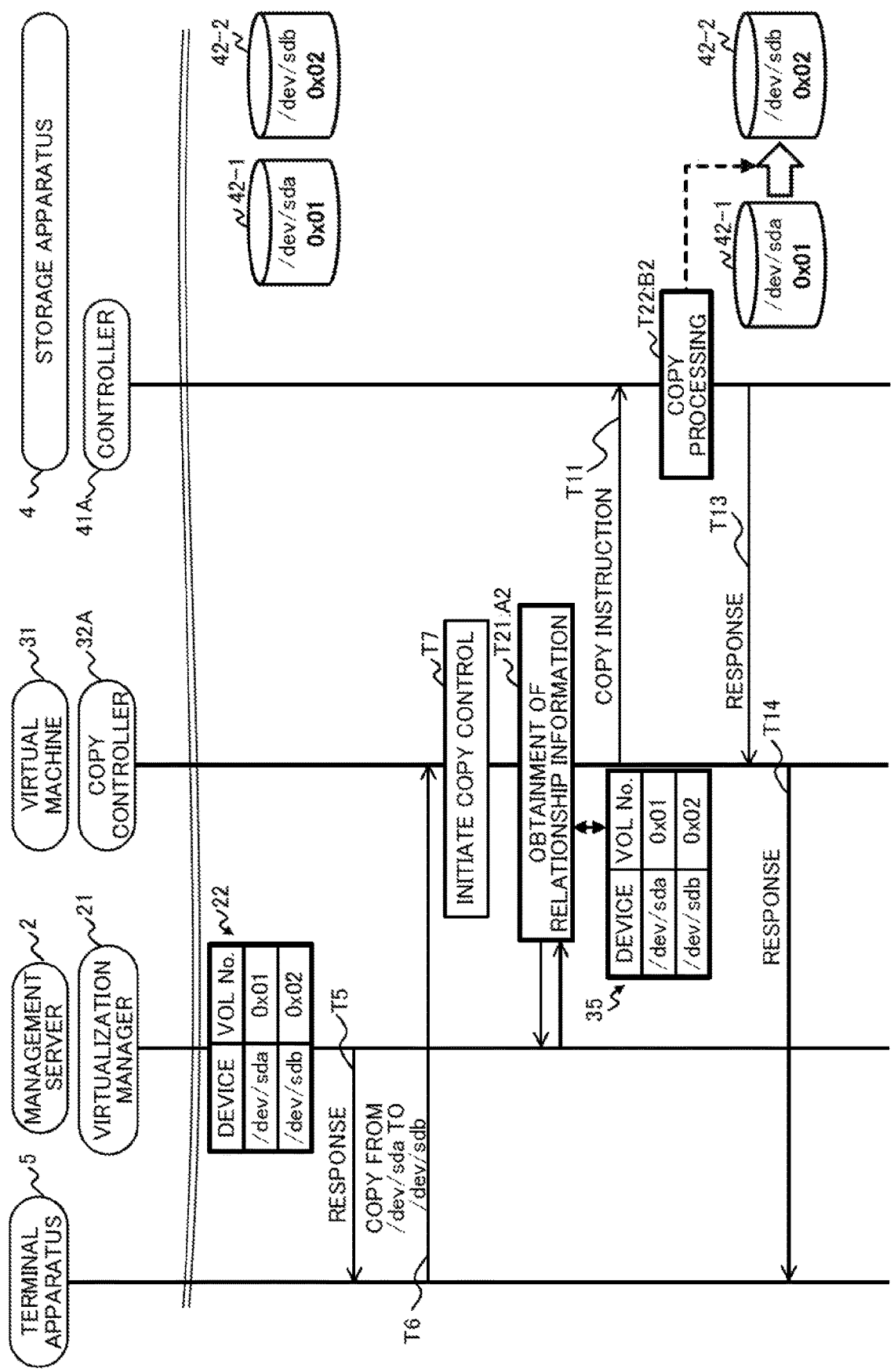
FIG. 10 is a sequence diagram depicting an exemplary operation when an initial copy is executed.
Figure 11:
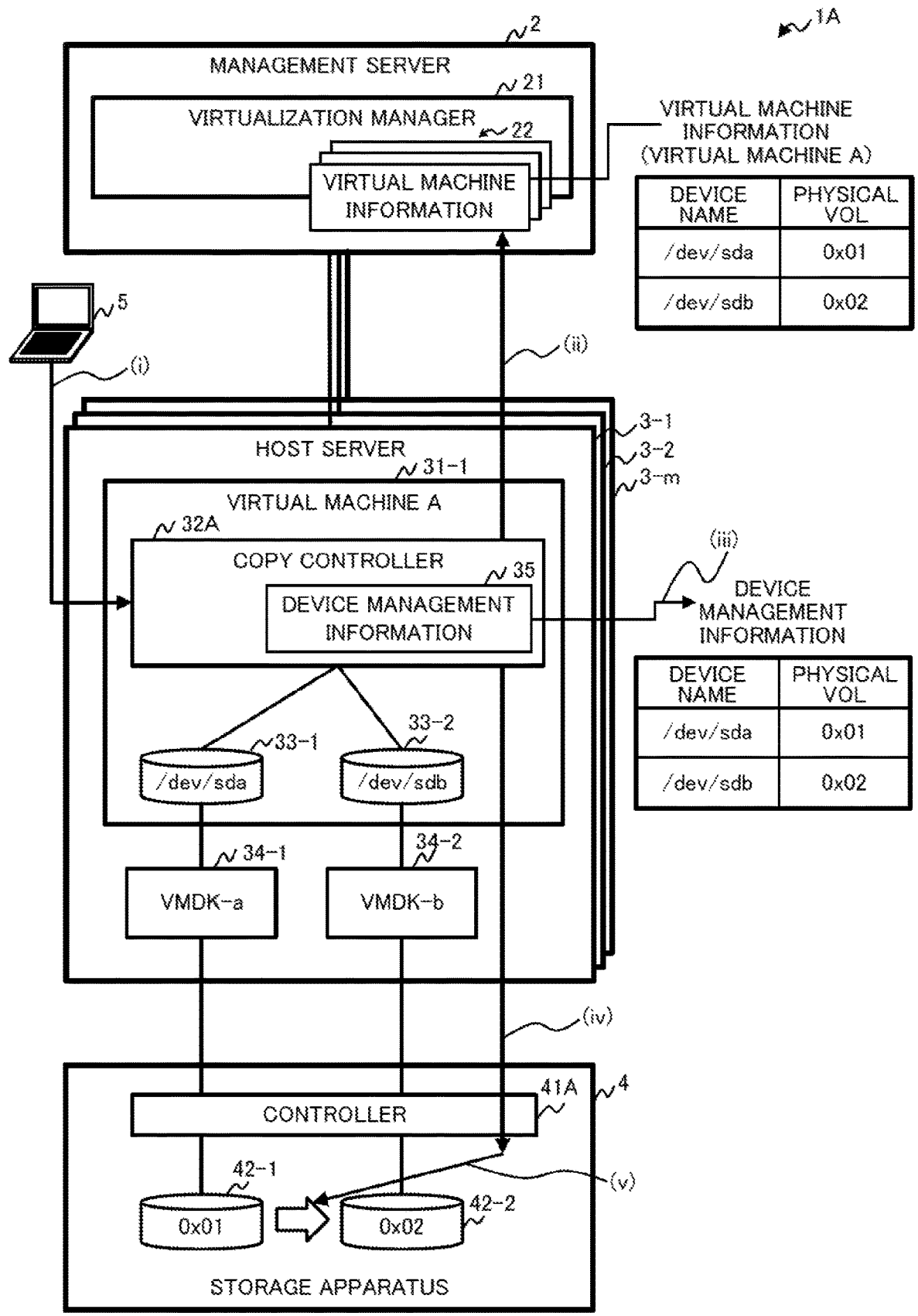
FIG. 11 is a diagram illustrating an exemplary operation when an initial copy is executed.

Note that copy participant volumes 33 (e.g., copy participant volumes 33-1 and 33-2 used by the virtual machine 31-1; refer to FIG. 11) have been created in advance. The creation processing for the volumes 33 may be similar to Processing T1 to T5 in FIG. 2, for example. As depicted in FIGS. 10 and 11, the device names "/dev/sda" and "/dev/sdb" are associated with the volume numbers "0x01" and "0x02", respectively, in the virtual machine information 22 by creating the volumes 33-1 and 33-2.

As depicted in FIG. 10, the terminal apparatus 5 designates the device names and sends the copy controller 32A a copy instruction from the device with the device name "/dev/sda" to the device with the device name "/dev/sdb" (Processing T6; refer to the arrow (i) in FIG. 11). The copy unit 36 in the copy controller 32A initiates a copy control for the designated device names (Processing T7). In the copy control, the information obtainment unit 38A in the copy controller 32A executes obtainment processing of the relationship information (Processing T21, Processing A2).

Hereinafter, referring to FIG. 12, obtainment processing of the relationship information will be described. As depicted in FIG. 12, in the virtual machine 31, the information obtainment unit 38A determines whether or not the device designated in the copy instruction is present in the device management information 35 (determines whether it is registered or not) (Step S1).

When the designated device is not present in the device management information 35 ("No" from Step S1), the information obtainment unit 38A requests the virtualization manager 21 in the management server 2 to obtain the relationship information of that device (Step S2).

The information manager 24 in the virtualization manager 21 obtains the relationship information of the device designated in the copy instruction, from the entry of the requesting virtual machine 31 in the virtual machine information 22, and notifies the copy controller 32A of it (Step S3).

The information obtainment unit 38A in the copy controller 32A stores the relationship information received from the virtualization manager 21, in the device management information 35 (Step S4). The information obtainment unit 38A then obtains, from the device management information 35, the physical volume number associated with the device name designated in the copy instruction (Step S5), and the obtainment processing ends.

Otherwise, when the designated device is present in the device management information 35 in Step S1 ("Yes" from Step S1), the processing migrates to Step S5 wherein the information obtainment unit 38A obtains the physical volume number from the device management information 35.

Note that Processing T21 in FIG. 10 and processing indicated by the arrows (ii) and (iii) in FIG. 11 correspond to the processing in Steps S2 to S5 in FIG. 12 when Step S1 is determined as negative ("No"). In other words, the obtainment processing depicted in FIGS. 10 and 11 is exemplary operations of the phase of obtaining the relationship information from the management server 2, as in the case where an initial copy is executed, for example.

Referring back to FIG. 10, the information obtainment unit 38A notifies the copy unit 36 of the obtained physical volume number. The copy unit 36 designates the physical volume number, and sends the controller 41A in the storage apparatus 4 a copy instruction from the physical volume with the volume number "0x01" to the physical volume with the volume number "0x02" (Processing T11; refer to the arrow (iv) in FIG. 11).

The copy processing unit 45A in the controller 41A executes the copy processing from the designated physical volume with the volume number "0x01" to the physical volume with the physical volume number "0x02" (Processing T22, Processing B2; refer to the arrow (v) in FIG. 11).

Hereinafter, referring to FIG. 13, copy processing will be described. As depicted in FIG. 13, in the storage apparatus 4, the copy processing unit 45A determines whether or not all of the devices designated in the copy instruction (e.g., the copy source and copy destination physical volumes 42) are present under the storage apparatus 4 (Step S11).

When at least one device is not present ("No" from Step S11), the copy processing unit 45A responds the copy controller 32A with an error response (Step S12) and the copy processing ends.

Otherwise, when all of the devices are present ("Yes" from Step S11), the copy processing unit 45A executes copy processing (Step S13). Once the copy completes, the copy processing unit 45A sends a completion response to the copy controller 32A (Step S14; Processing T13 in FIG. 10) and the copy processing ends.

Referring back to FIG. 10, in response to the response from the storage apparatus 4, the copy controller 32A sends a response to the terminal apparatus 5 (Processing T14), and the processing ends.

Next, referring to FIGS. 14 and 15, an exemplary operation when the relationship information of the device designated in the copy instruction is registered in the device management information 35 will be described.

As depicted in FIG. 14, the terminal apparatus 5 designates the device names and sends the copy controller 32A a copy instruction from the device with the device name "/dev/sda" to the device with the device name "/dev/sdb" (Processing T6; refer to the arrow (vi) in FIG. 15). The copy unit 36 in the copy controller 32A initiates a copy control for the designated device names (Processing T7). In the copy control, the information obtainment unit 38A in the copy controller 32A executes obtainment processing of the relationship information (Processing T23, Processing A2).

In Processing T23, since all of the device names designated in the copy instruction are present in the device management information 35, the information obtainment unit 38A obtains physical volume numbers associated with those device names from the device management information 35.

Note that the Processing 123 in FIG. 14 and the processing indicated by the arrow (vii) in FIG. 15 correspond to the processing in Step S5 in FIG. 12 when Step S1 is determined as affirmative ("Yes"). In other words, the obtainment processing depicted in FIGS. 14 and 15 is exemplary operations of the phase to obtain the relationship information from the device management information 35 stored in the local virtual machine 31, as in the case where second and subsequent copies are executed, for example.

The copy unit 36 designates the physical volume numbers obtained by the information obtainment unit 38A from the device management information 35, and sends the controller 41A in the storage apparatus 4 a copy instruction from the physical volume with the volume number "0x01" to the physical volume with the volume number "0x02" (Processing T11; refer to the arrow (viii) in FIG. 15).

The copy processing unit 45A in the controller 41A executes the copy processing from the designated physical volume with the volume number "0x01" to the physical volume with the physical volume number "0x02" (Processing T22, Processing B2; refer to the arrow (ix) in FIG. 15). Note that the following processing is similar to the processing described above with reference to FIGS. 10 and 11.

As set forth above, in the information processing system 1A, since the relationship information indicating relations between virtual devices and physical volumes 42 is stored in the memory unit 37 in the virtual machine 31, the processing time of obtaining the relationship information is reduced, as compared to the comparative example described with reference to FIGS. 1 to 3. As a result, it is possible to reduce the processing time of copying a virtual volume.

Further, in the information processing system 1A, a copy of the data is executed using the copy function of the storage apparatus 4. As a result, the work suspension time caused by the copy (e.g., backup) is reduced, without applying loads on the work system (e.g., the environment of the virtual machines 31).

Further, since an agent is provided on a business machine (virtual machine 31) to which disks (volumes 33) to be backed up are connected, a backup free from a business suspension can be achieved in collaboration with applications.

Accordingly, the information processing system 1A is preferably used for a system in which business data is backed up, and a system that has operation prerequisites of shorter backup time (shorter work suspension time) or regular (e.g., daily) backups, for example.

<4> Second Embodiment

Next, the second embodiment will be described. In the second embodiment, the case wherein a storage migration function provided in a virtual platform is employed in the information processing system 1 will be described.

<4-1> Storage Migration Function

A storage migration function is a function to modify a physical volume 42 configuring a virtual volume (a volume 33 or a virtual volume 34) while storing data therein, by means of a collaboration with the virtual platform and the storage apparatus 4. An example of the storage migration function is a live migration function, for example. Examples of known live migrations include Storage vMotion provided by VMware®, for example.

Since the storage migration function maintains data and volumes 33 visible from the virtual machines 31 remain unchanged, operations of OSs or applications on the virtual machines 31 are not affected and a continuous operation is ensured.

Figure 16:
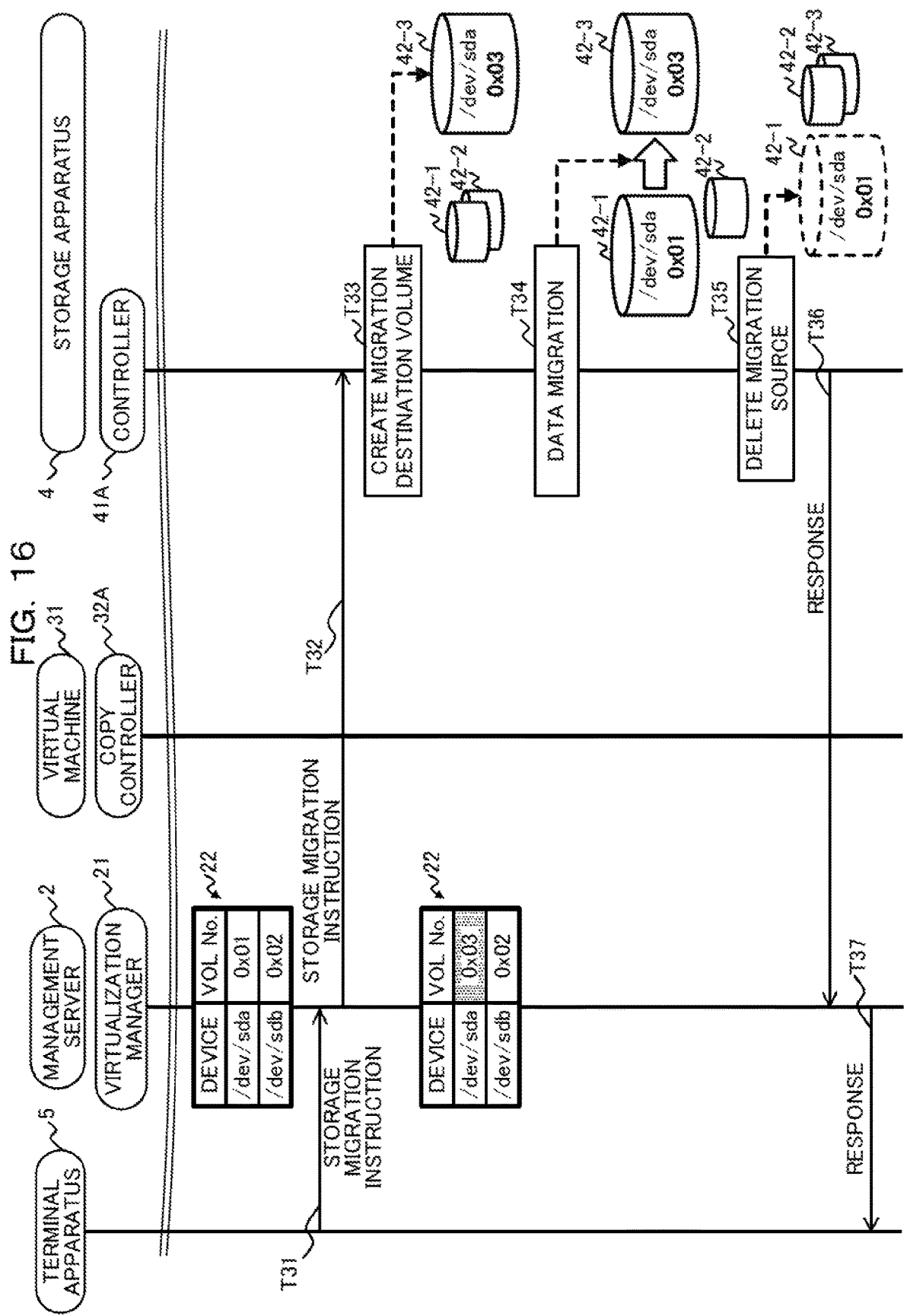
FIG. 16 is a sequence diagram depicting an exemplary operation of storage migration processing.

Hereinafter, with reference to configuration of the information processing system 1A according to the first embodiment, an exemplary operation of storage migration processing will be described. As depicted in FIG. 16, it is assumed that the device names "/dev/sda" and "/dev/sdb" are associated with the volume numbers "0x01" and "0x02", respectively, in the virtual machine information 22.

Figure 17:
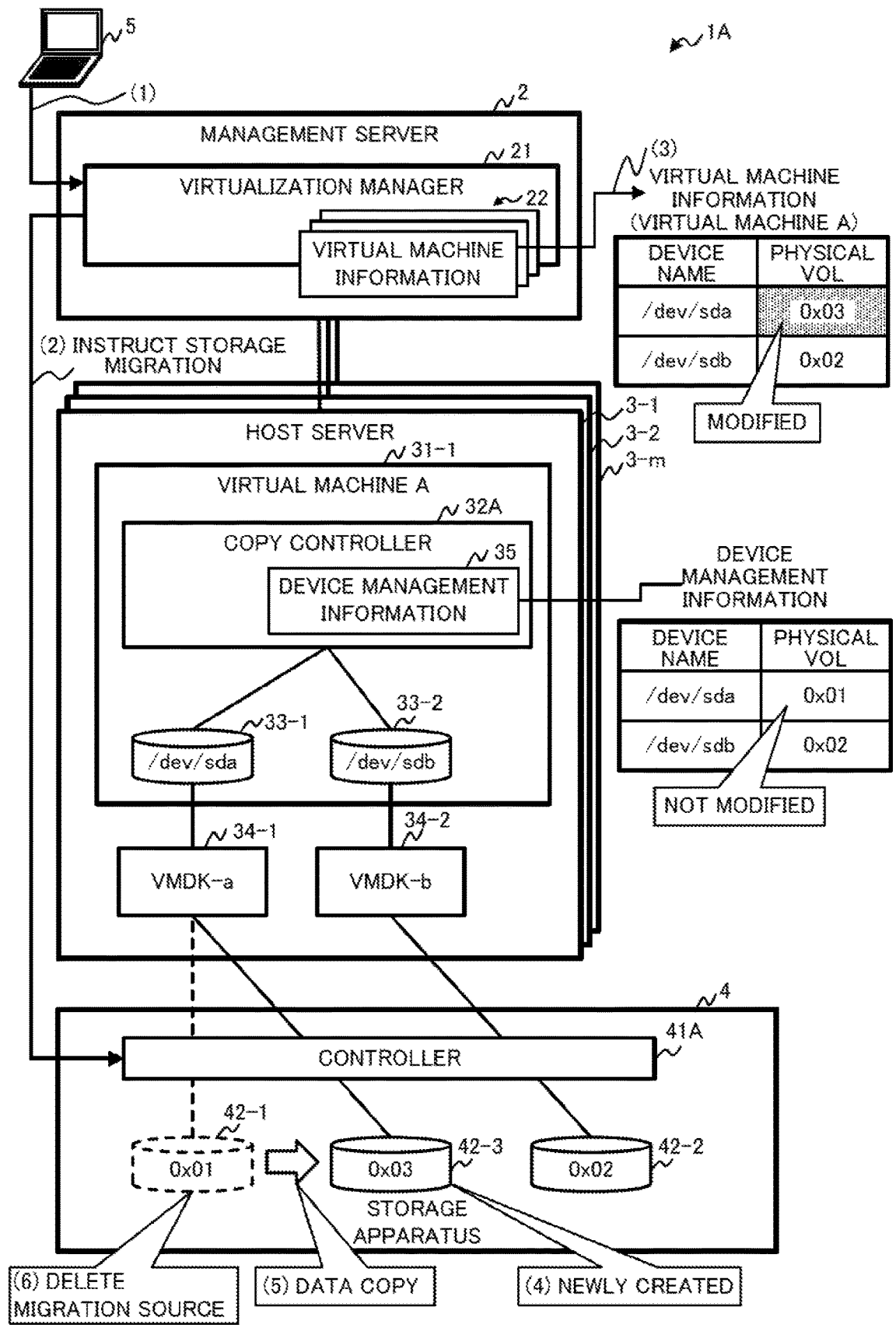
FIG. 17 is a diagram illustrating an exemplary operation of storage migration processing.

As depicted in FIG. 16, the terminal apparatus 5 designates the device name "/dev/sda" as a device to undergo a storage migration, and sends a storage migration instruction to the virtualization manager 21 in the management server 2 (Processing T31; refer to the arrow (1) in FIG. 17).

The virtualization manager 21 designates the physical volume 42-1 ("0x01") associated with the device name designated via the terminal apparatus 5, and sends a storage migration instruction to the controller 41A in the storage apparatus 4 (Processing T32; refer to the arrow (2) in FIG. 17). In Processing T32, the physical volume 42 associated with the device name may be obtained, based on the virtual machine information 22, for example.

The migration destination physical volume 42-3 ("0x03") may also be designated by the virtualization manager 21, and the information manager 24 may update the physical volume number associated with the device name "/dev/sda" to "0x03" in the virtual machine information 22 (refer to the arrow (3) in FIG. 17).

In response to receiving the storage migration instruction, the controller 41A creates a migration destination physical volume 42-3 ("0x03") as a physical volume 42 for "/dev/sda" (Processing T33; refer to (4) in FIG. 17).

Subsequently, the controller 41A copies the data from the migration source volume with the volume number "0x01", to the migration destination physical volume with the volume number "0x03" created in Processing T33 (Processing T34; refer to (5) in FIG. 17).

The controller 41A then deletes the migration source physical volume 42-1 with the volume number "0x01" (Processing T35; refer to (6) in FIG. 17), and sends a response to the virtualization manager 21 (Processing T36).

The virtualization manager 21 sends the terminal apparatus 5 a response to the storage migration instruction (Processing T37), and the processing ends. Note that the migration destination physical volume number may be determined by the controller 41A, and may be notified to the virtualization manager 21 in the response in Processing T36. In this case, the information manager 24 may update the virtual machine information 22 after receiving the response in Processing T36.

As described above, in a virtualization environment, a relation virtual-physical volumes may be modified with the storage migration function.

If a storage migration function is activated during a copy operation in the information processing system 1A, device management information 35 stored in a virtual machine 31 does not reflect an actual relation (refer to the device management information 35 in FIG. 17) and the following failures may occur.

(a) The copy controller 32A designates an absent physical volume number in a copy instruction, resulting in an error of copy processing in the storage apparatus 4.

(b) In the storage apparatus 4, a different volume is copied.

<4-1-1> Copy Processing Failure Due to Designation of Absent Physical Volume Number Firstly, referring to FIGS. 18 and 19, the above failure (a) will be described.

After the storage migration processing depicted in FIG. 17 (after the execution of Processing 137 in FIG. 16), the migration source physical volume 42-1 ("0x01") has been deleted and thus is not present in the storage apparatus 4.

However, in the device management information 35, the migration source physical volume 42-1 ("0x01") is registered as the physical volume number associated with the device name "/dev/sda". A copy is carried out is this situation, the processing exemplified in FIGS. 18 and 19 is executed.

Figure 18:
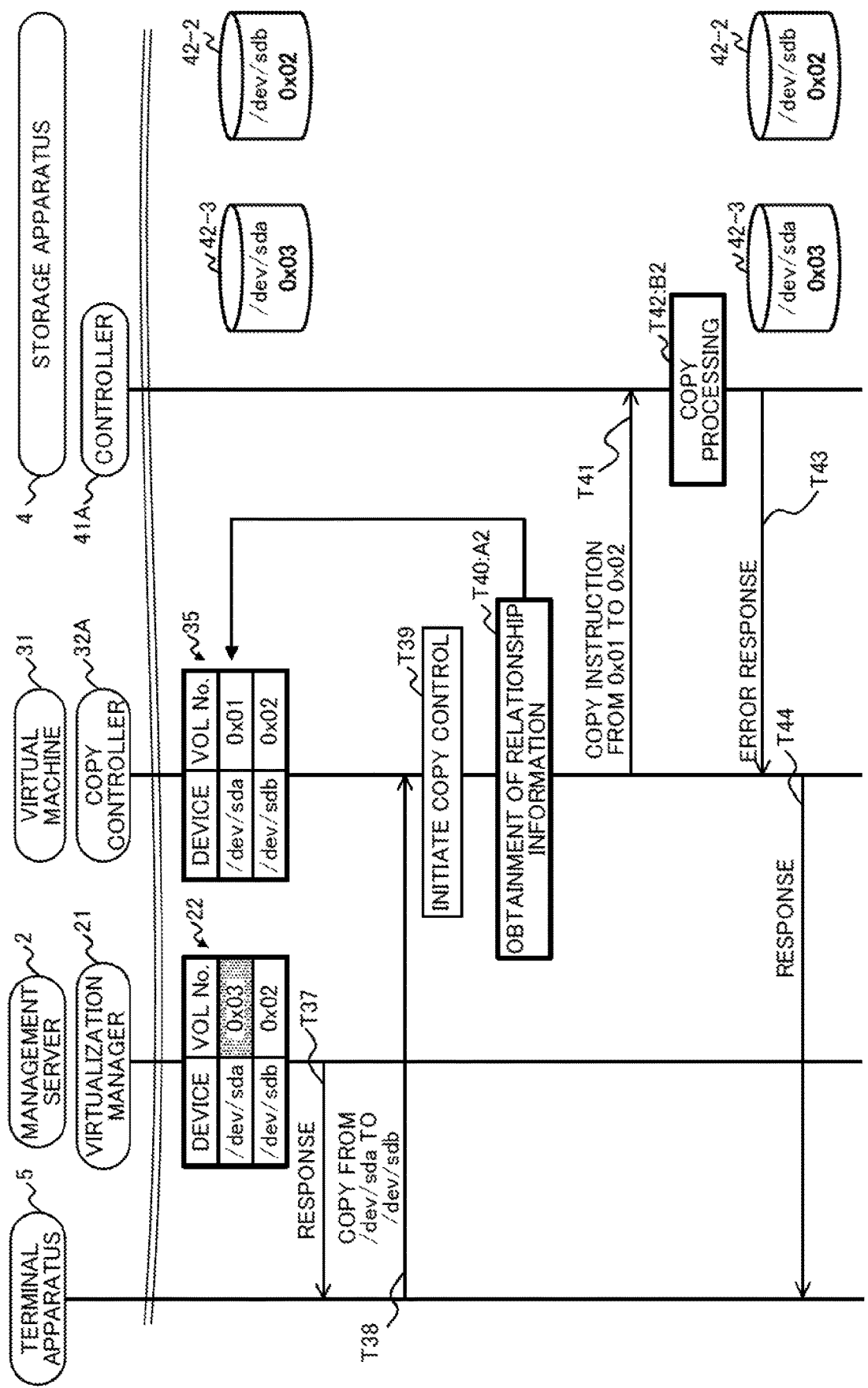
FIG. 18 is a sequence diagram depicting an exemplary operation when copy processing fails due to designation of an absent physical volume number.
Figure 19:
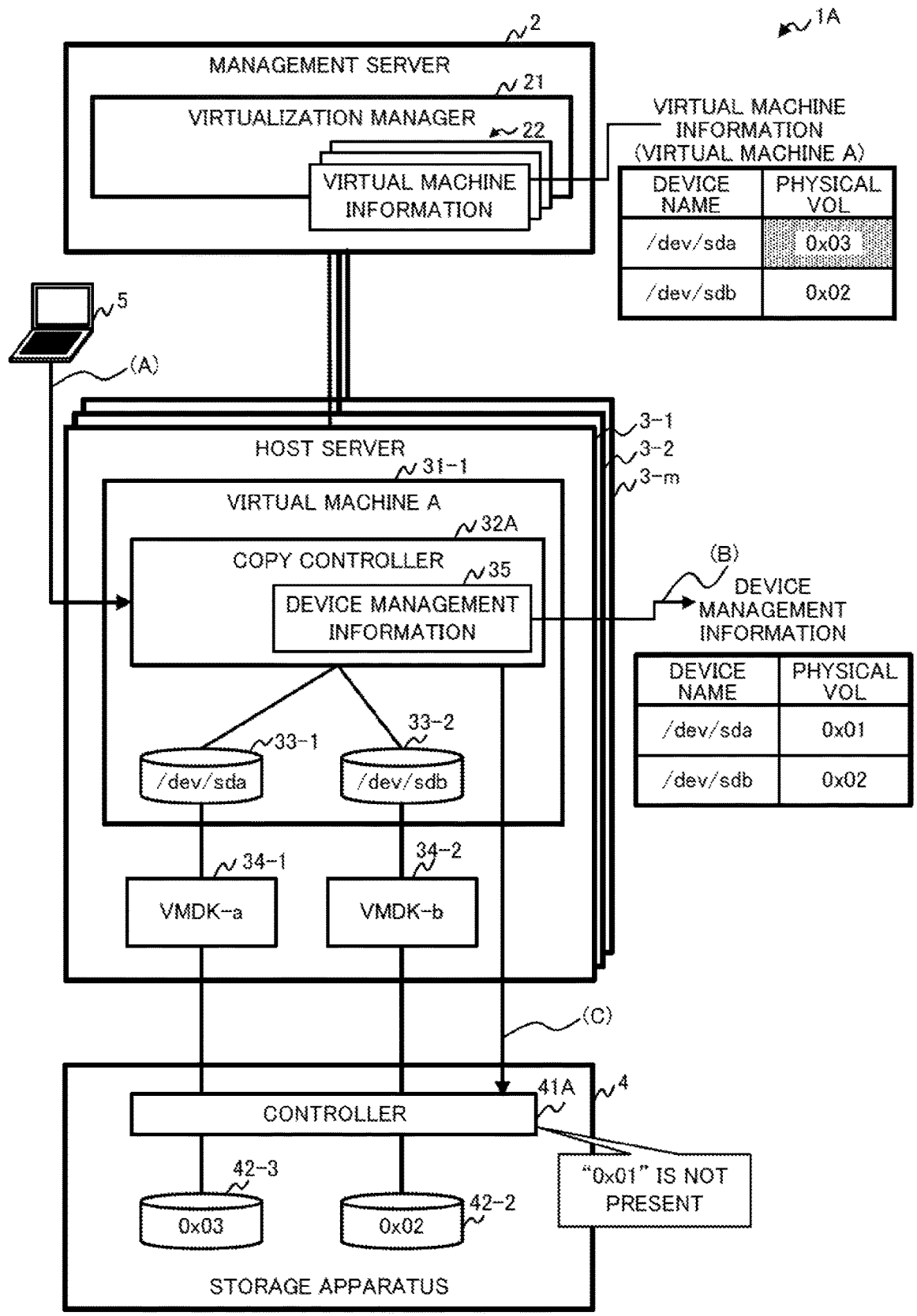
FIG. 19 is a diagram illustrating an exemplary operation when copy processing fails due to designation of an absent physical volume number.

As depicted in FIG. 18, the terminal apparatus 5 sends the copy controller 32A in the virtual machine 31 a copy instruction from the device with the device name "/dev/sda" to the device with the device name "/dev/sdb" (Processing T38; refer to the arrow (A) in FIG. 19). The copy controller 32A initiates a copy control (Processing T39), and obtains the relationship information in the copy control (Processing T40, Processing A2).

In Processing T40, since the devices of "/dev/sda" and "/dev/sdb" that are designated in the copy instruction are both present in the device management information 35, the relationship information is obtained from the device management information 35 (refer to the arrow (B) in FIG. 19).

The copy controller 32A then, based on the relationship information obtained from the device management information 35, and sends the controller 41A in the storage apparatus 4 a copy instruction from the physical volume with the volume number "0x01" to the physical volume with the volume number "0x02" (Processing T41; refer to the arrow (C) in FIG. 19).

The controller 41A executes copy processing for the designated device (Processing T42, Processing B2). However, since the physical volume 42-1 ("0x01") designated as the copy source is not present, Step S11 in FIG. 13 is determined as negative ("No"), an error response is sent from the controller 41A to the copy controller 32A (Processing T43; Step S12 in FIG. 13).

The copy controller 32A sends a response to the terminal apparatus 5, based on the error response from the controller 41A (Processing T44), and the processing ends.

As described above, when copy processing is executed after storage migration processing, the copy controller 32A may specify an absent volume number, resulting in an error of the copy processing.

<4-1-2> Copy of Invalid Volume

Next, referring to FIGS. 20 to 23, the above failure (b) will be described.

After the situation depicted in FIG. 19, a new volume 33 may be created in an operation or the like. Alternatively, an unused physical volume number may be reused in the information processing system 1.

For example, since the physical volume number ("0x01") is not used, that volume number "0x01" may be reused for creating a new volume 33.

Figure 20:
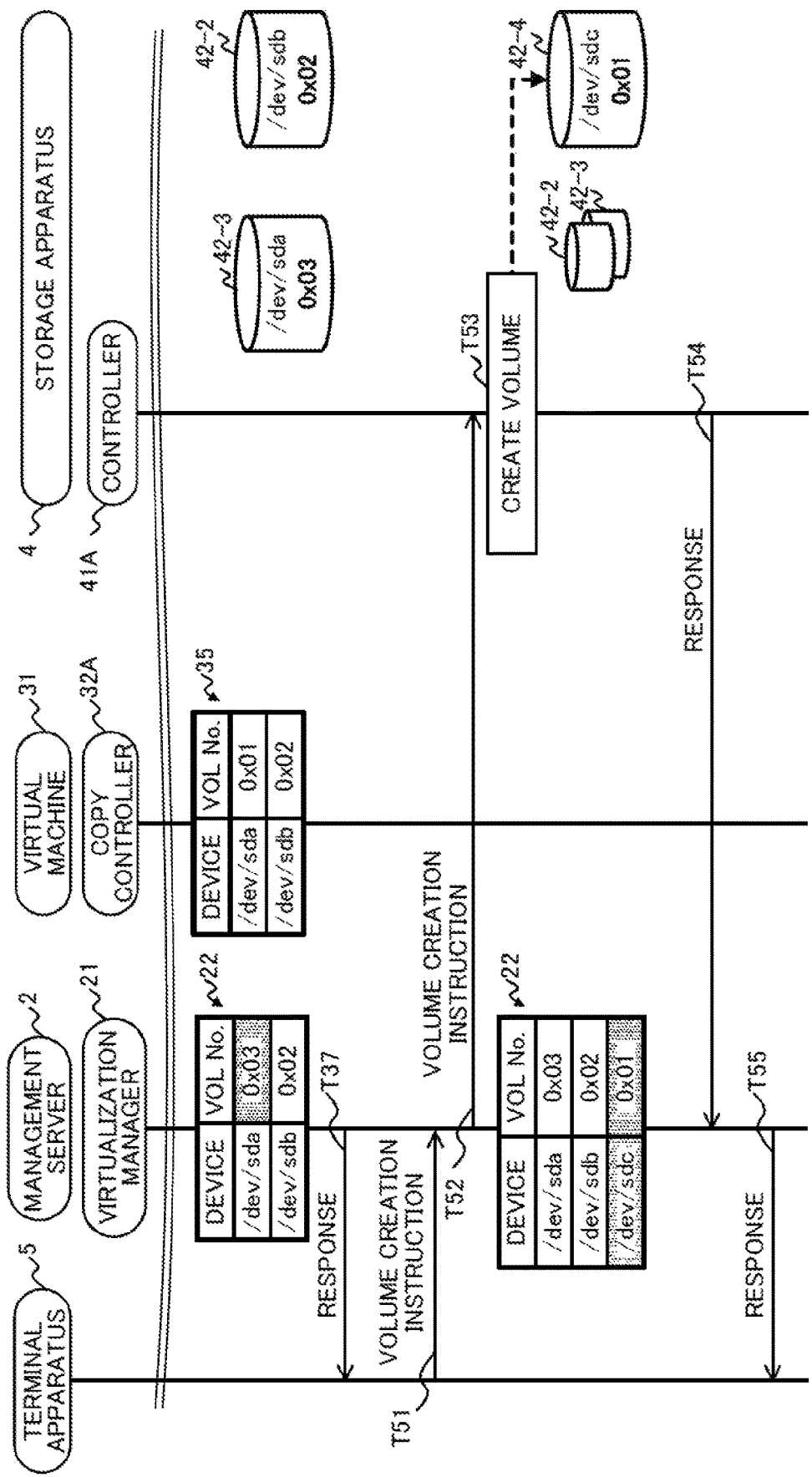
FIG. 20 is a sequence diagram depicting the exemplary operation (1) when a different volume is copied.

Hereinafter, one example of creation processing of a volume 33 will be described. As depicted in FIG. 20, after storage migration processing, the terminal apparatus 5 sends a volume creation instruction to the virtualization manager 21 (Processing T51; refer to the arrow (1) in FIG. 21).

Figure 21:
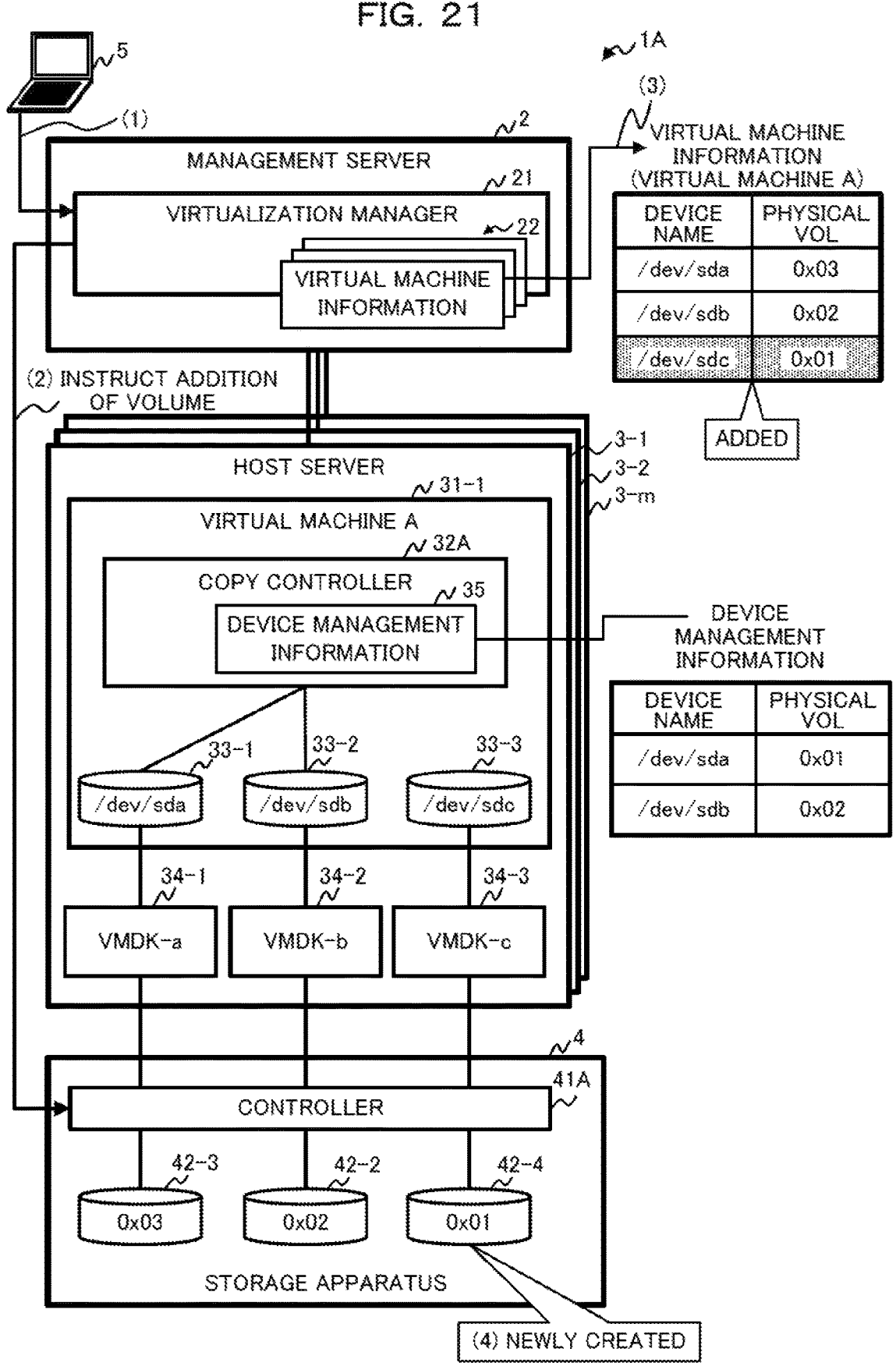
FIG. 21 is a diagram illustrating an exemplary operation (1) when a different volume is copied.

The virtualization manager 21 sends a volume creation instruction to the controller 41A in the storage apparatus 4 (Processing T52; refer to the arrow (2) in FIG. 21). Note that the virtualization manager 21 may determine the device name and the physical volume number of a volume to be created; in this case, at least one of a device name and a physical volume number may be included in the volume creation instruction from the virtualization manager 21.

The virtualization manager 21 also registers relationship information between the device name ("/dev/sdc") and the physical volume number ("0x01") in the virtual machine information 22 (refer to the arrow (3) in FIG. 21). An update of the virtual machine information 22 may be carried out after Processing T52 or after Processing T55.

The controller 41A creates a physical volume 42-4 in response to the volume creation instruction (Processing T53; refer to (4) in FIG. 21), and sends a response to the virtualization manager 21 (Processing T54). The creation of the physical volume 42-4 may involve an allocation of the physical volume 42-4 ("0x01") to the volume 33-3 ("/dev/sdc").

In accordance with the response from the controller 41A, the virtualization manager 21 sends a response to the terminal apparatus 5 (Processing T55), and the processing ends.

In the processing described above, the physical volume 42-4 ("0x01") is allocated to the volume 33-3 ("/dev/sdc").

Otherwise, in the device management information 35, the physical volume 42-1 ("0x01") is registered as the physical volume number associated with the device name "/dev/sda". When a copy is carried out in this situation, the processing exemplified in FIGS. 22 and 23 is executed.

Figure 22:
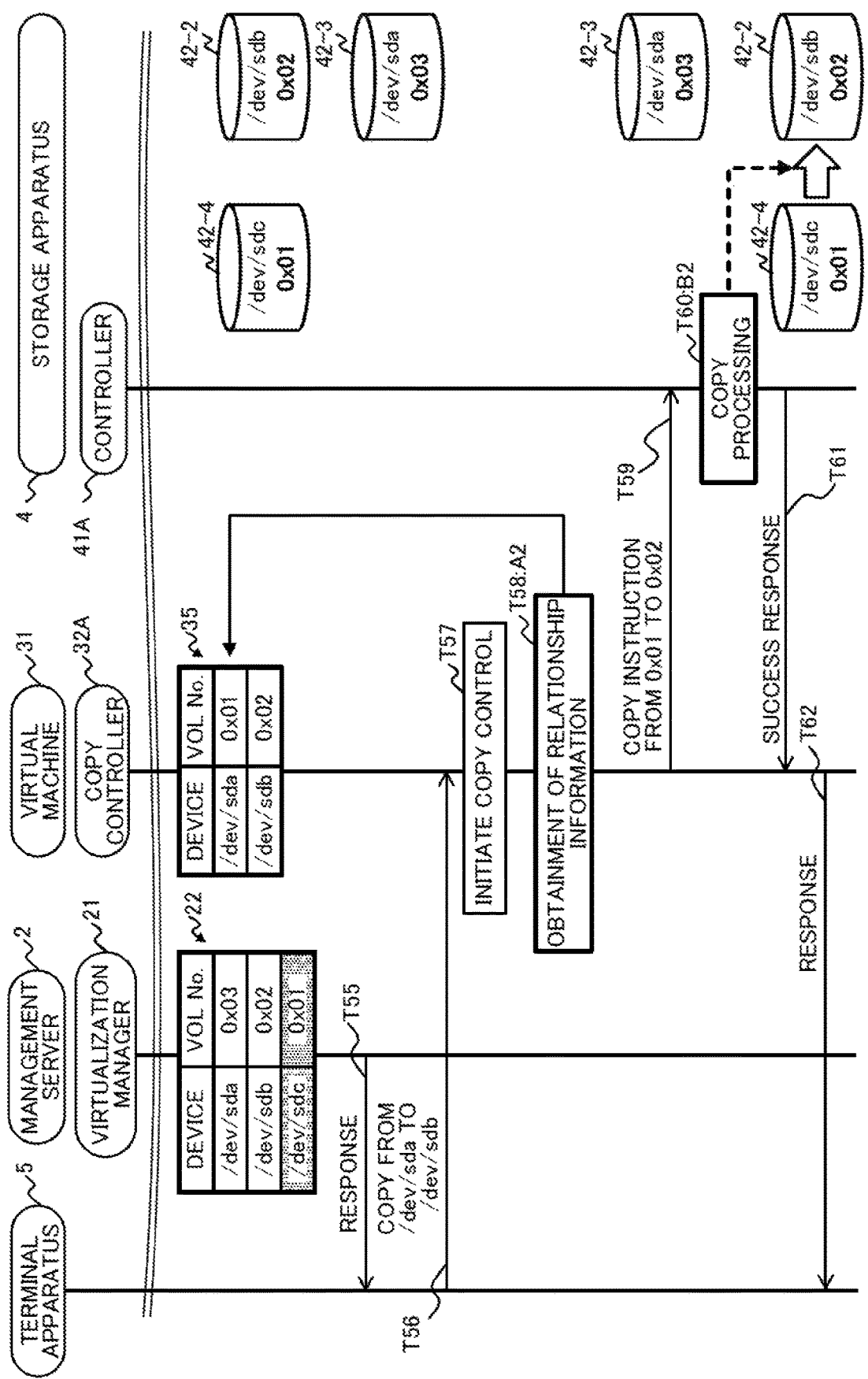
FIG. 22 is a sequence diagram depicting an exemplary operation (2) when a different volume is copied.
Figure 23:
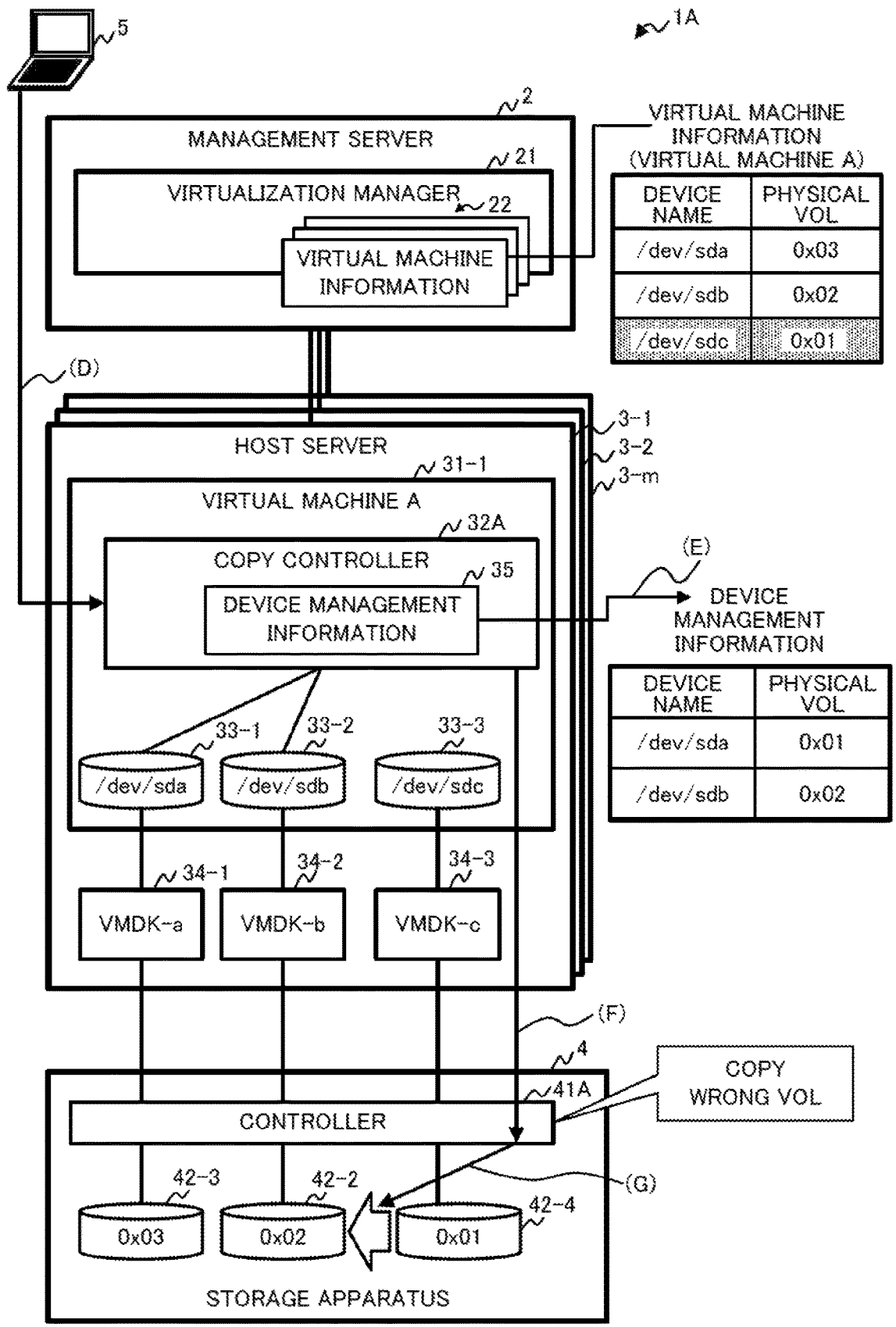
FIG. 23 is a diagram illustrating the exemplary operation (2) when a different volume is copied.

As depicted in FIG. 22, the terminal apparatus 5 sends the copy controller 32A in the virtual machine 31 a copy instruction from the device with the device name "/dev/sda" to the device with the device name "/dev/sdb" (Processing T56; refer to the arrow (D) in FIG. 23). The copy controller 32A initiates a copy control (Processing T57), and obtains the relationship information in the copy control (Processing T58, Processing A2).

In Processing T58, since the devices of "/dev/sda" and "/dev/sdb" that are designated in the copy instruction are both present in the device management information 35, the relationship information is obtained from the device management information 35 (refer to the arrow (E) in FIG. 23).

The copy controller 32A then sends the controller 41A in the storage apparatus 4, a copy instruction from the physical volume with the volume number "0x01" to the physical volume with the volume number "0x02", based on the relationship information obtained from the device management information 35 (Processing T59; refer to the arrow (F) in FIG. 23).

The controller 41A executes copy processing from the physical volume with the volume number "0x01" to the physical volume with the volume number "0x02" for the designated devices (Processing T60, Processing B2; refer to the arrow (G) in FIG. 23). Since the copy source and copy destination physical volumes 42 are both present in the storage apparatus 4, the copy processing successfully ends, the controller 41A sends a completion response to the copy controller 32A (Processing T61).

In accordance with the response from the storage apparatus 4, the copy controller 32A sends a response to the terminal apparatus 5 (Processing T62), and the processing ends.

As described above, the copy processing successfully completes in the storage apparatus 4. However, the physical volume number "0x01" designated as the copy source is not the volume 33-1 ("/dev/sda") instructed from the terminal apparatus 5, but is the physical volume 42-4 allocated to the newly created volume 33-3.

As a result, the copy processing copies an invalid volume 33, not the device designated by the user.

As described above, when copy processing is executed after storage migration processing and volume creation processing are executed, the copy controller 32A may specify an invalid volume number. In this case, copy processing of a wrong the volume 33 may be executed.

Hence, in the second embodiment, the storage apparatus 4 detects that the physical volume 42 has been modified. When the physical volume 42 has been modified, the copy controller 32 obtains the relationship information from a virtual platform again and updates the device management information 35.

As described above, in the second embodiment, a detection of a modification to a physical volume 42 can be used as a trigger to an update of the relationship information by a virtual machine 31, and the above-described failures can be eliminated. Further, a reduction in the performance during a normal operation can be avoided by reflecting the latest information to the device management information 35 upon a modification of a storage.

<4-2> Exemplary Functional Configuration

Firstly, referring to FIGS. 24 and 25, an exemplary functional configuration of an information processing system 1B according to the second embodiment will be described. The information processing system 1B is different from the information processing system 1A according to the first embodiment, in terms of functions of a copy controller 32B in a virtual machine 31 and a controller 41B in the storage apparatus 4.

Figure 24:
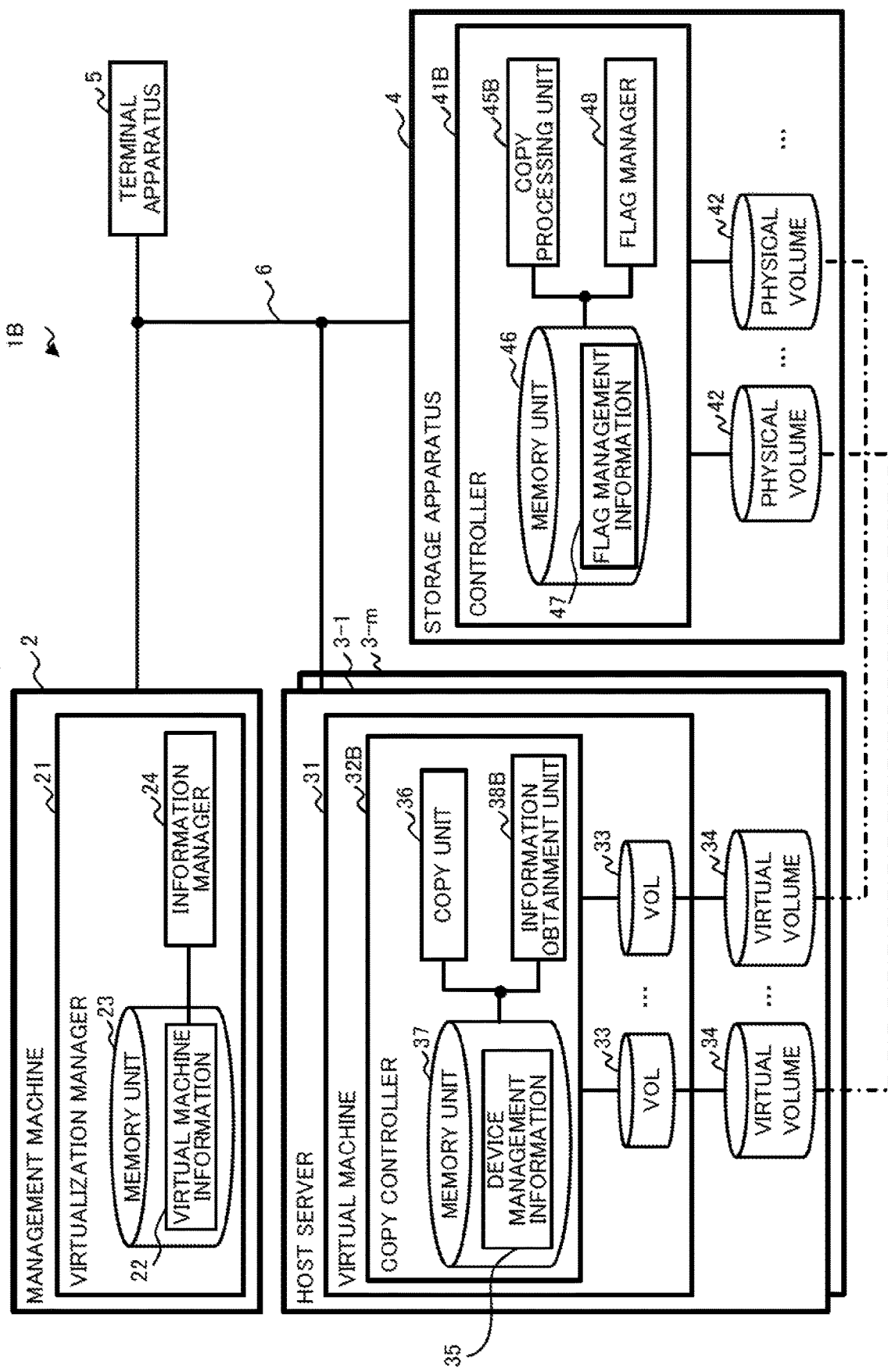
FIG. 24 is a block diagram depicting an exemplary functional configuration of an information processing system according to the second embodiment.

As depicted in FIG. 24, the controller 41B may include a copy processing unit 45B, a memory unit 46, and a flag manager 48, as an example.

The memory unit 46 stores information of flag management information 47. The flag management information 47 is one example of control information indicating the validity of the device management information 35 stored in the memory unit 37. The memory unit 46 may be embodied by storage areas in the memory 4b depicted in FIG. 6, for example.

Figure 25:
FIG. 25 is a diagram depicting an exemplary data structure of flag management information.

FIG. 25 depicts an exemplary data structure of the flag management information 47. As depicted in FIG. 25, the flag management information 47 may contain the volume numbers of physical volumes 42 provided to the storage apparatus 4, and control flags associated with the respective volume numbers, as an example.

As an example, in the flag management information 47, the control flag for the physical volume 42 with the volume number "0x01" is set to "ON" (e.g., 1), and the control flag for the physical volume 42 with the volume number "0x03" is set to "OFF" (e.g., 0).

Note that the flag management information 47 may be information created by adding control flags to management information of the physical volumes 42 managed by the storage apparatus 4, for example.

A control flag is one example of information indicating whether or not a physical volume number is present in the device management information 35, and may represent the state (status) whether the physical volume number is valid or invalid. Note that in the following description, the control flags may be referred to as "C-Fs".

For example, when a control flag is "OFF", the corresponding physical volume number is not present in the device management information 35 and is invalid, in other words, information on the physical volume 42 is not managed by the copy controller 32B.

In contrast, when a control flag is "ON", the corresponding physical volume number is present in the device management information 35 and is valid, in other words, information on the physical volume 42 is under the management of the copy controller 32B.

Note that the initial value of a control flag, such as the value (state) of a control flag for a newly created physical volume 42 may be set to "OFF".

The flag manager 48 manages the control flags in the flag management information 47. For example, the flag manager 48 may update a control flag, in response to an instruction from the copy controller 32B.

The flag manager 48 also may set or update the corresponding control flag when creation or deletion of a physical volume 42 is instructed from the virtualization manager 21. Note that the creation or deletion of a physical volume 42 may involve storage migration processing, for example.

As an example, when a physical volume 42 is created, the flag manager 48 sets the value of the control flag for that physical volume 42 to "OFF". Or, a physical volume 42 is deleted, the flag manager 48 deletes information on that physical volume 42 from the flag management information 47. Upon the deletion, the entry of the information on the physical volume 42 may be deleted from the flag management information 47, or the control flag may be invalidated without deleting the entry.

In addition to executing processing similar to the processing in the first embodiment, the copy processing unit 45B may carry out an error determination depending on a copy instruction.

In the error determination, a determination as to whether or not a designated device is present in the storage apparatus 4 and a determination as to whether or not control flags of all of the physical volumes 42 designated in the copy instruction are set to "ON" may be made.

For example, when a designated physical volume 42 is not present in the storage apparatus 4, the copy processing unit 45B may send the copy controller 32B an error response indicating that the physical volume 42 is not present (first response).

Further, when the control flag for a designated physical volume 42 is set to "OFF", the copy processing unit 45B may send an error response indicating that the control flag is invalid (second response) to the copy controller 32B, based on the flag management information 47, for example. In other words, the copy processing unit 45B determines whether a physical volume 42 can be copied or not, in accordance with the control flag for the copy participant physical volume 42.

The copy controller 32B may include a copy unit 36, a memory unit 37, and an information obtainment unit 38B, as an example. The copy unit 36 and the memory unit 37 may be similar to those in the first embodiment.

The copy controller 32B may control the control flags stored by the storage apparatus 4, e.g., may control the states of the control flags. For example, the copy controller 32B controls physical volumes 42 managed by that copy controller 32B, to set their control flags to "ON" in the flag management information 47, thereby indicating that those physical volumes 42 are managed by that copy controller 32B.

As an example, when a physical volume 42 becomes under the management of the copy controller 32B, the copy controller 32B sets the corresponding control flag to "ON". The control of a control flag by the copy controller 32B may be done when the copy controller 32B obtains the relationship information from the management server 2 and updates the device management information 35, for example.

In addition to executing processing similar to the processing in the first embodiment, the information obtainment unit 38B may update the device management information 35 in accordance with an error response from the storage apparatus 4.

For example, when the information obtainment unit 38B receive an error responses from the controller 41B indicating that a device is not present, or that a control flag is "OFF", the information obtainment unit 38B executes obtainment processing of the relationship information and updates the device management information 35. In the obtainment processing, the relationship information may be obtained from the management server 2, similar to the first embodiment.

When the information obtainment unit 38B updates the device management information 35 in response to an error response, the copy controller 32B sends the controller 41B a copy instruction, designating information on a second physical volume 42 (correct physical volume number) as a copy participant, based on the updated device management information 35.

As described above, in the storage migration processing, the control flag for a migration destination physical volume 42 should be set to "OFF". In this configuration, even if the migration destination physical volume 42 is erroneously designated as a copy participant, the controller 41B can detect the mismatch between the actual environment and the device management information 35. An error is notified to the copy controller 32B without executing a copy.

Accordingly, the copy controller 32B can update the device management information 35 to the latest one, and can send a copy instruction based on the latest information.

As set forth above, by detecting a modification to a physical volume 42 during copy processing based on a copy instruction, frequent of accesses to the management server 2 for updating the device management information 35 can be minimized, which prevents a reduction in the performance of the information processing system 1B.

The reason why the storage apparatus 4 manages control flags and detects a modification to a physical volume 42 are as follows:

As set forth above, since the storage migration processing is executed on the storage apparatus 4 from the virtual platform, the copy controller 32B operating on a virtual machine 31 have no function to detect storage migrations. Hence, it is possible to detect a migration of a storage designated as a copy participant on the virtual platform or by the storage apparatus 4.

However, if the virtual platform detects migrations of a storages, the performance would be reduced due to extra accesses to the virtual platform when the device management information 35 has no mismatch, e.g., no storage has been migrated.

For the reasons set forth above, in the information processing system 1B according to the second embodiment, the storage apparatus 4 detects migrations of storages, for preventing a reduction in the performance of the virtual platform.

<4-3> Exemplary Operations

Hereinafter, referring to FIGS. 26 to 48, exemplary operations of the information processing system 1B will be described. In the following description, it is assumed that the information processing system 1B operates in the following sequence:

1. Creation of new volumes
2. First copy or initial setting
3. Copy operation
4. Storage migration processing
5. Continuation of copy operation
6. Creation of a new volume
7. Continuation of copy operation <4-3-1> Creation of New Volumes (Refer to FIGS. 26 to 28)

Figure 26:
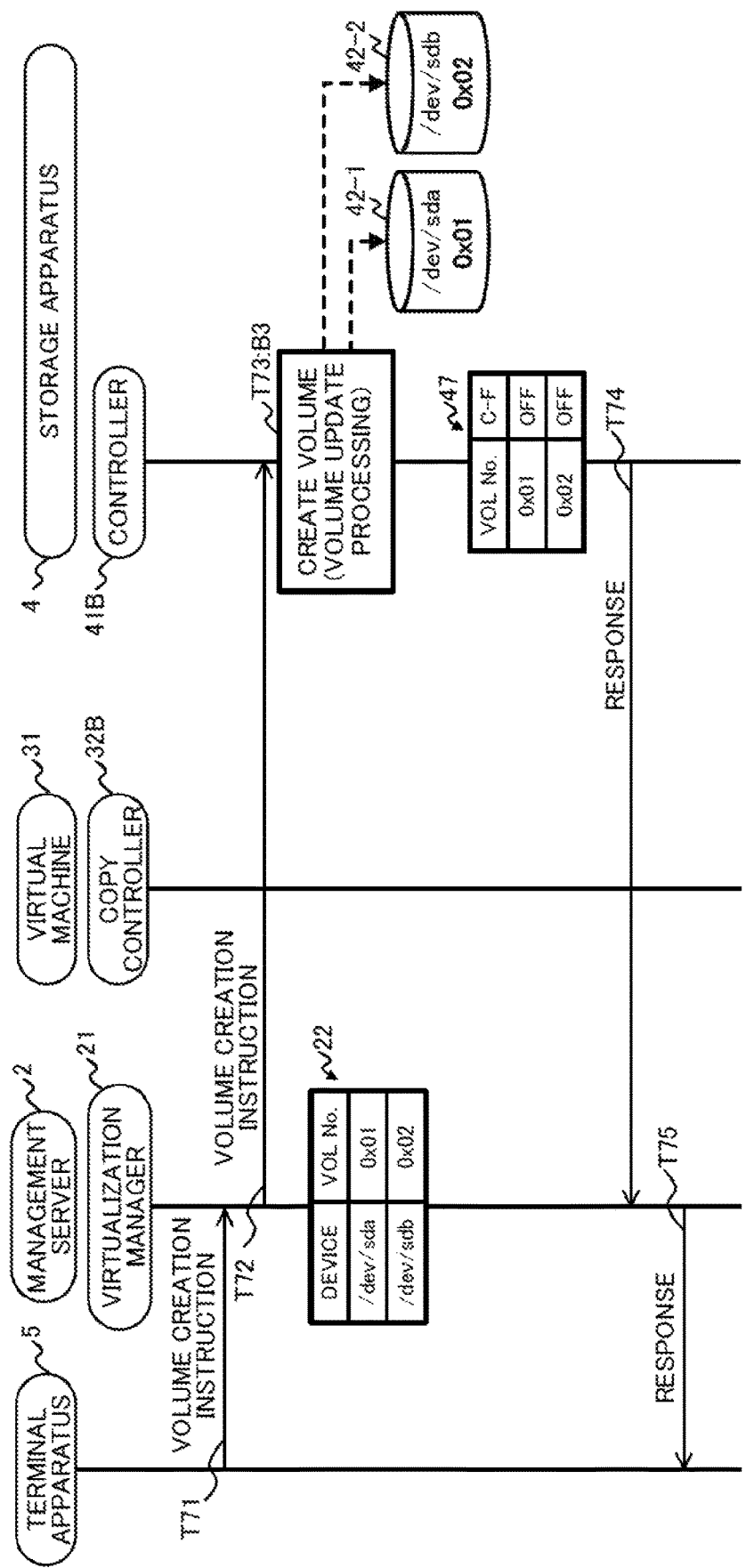
FIG. 26 is a sequence diagram depicting an exemplary operation for a creation of a new volume.

Firstly, an exemplary operation for a creation of new volumes will be described. As depicted in FIG. 26, the terminal apparatus 5 sends a volume creation instruction to the virtualization manager 21 (Processing T71; refer to the arrow (1) in FIG. 28).

Figure 28:
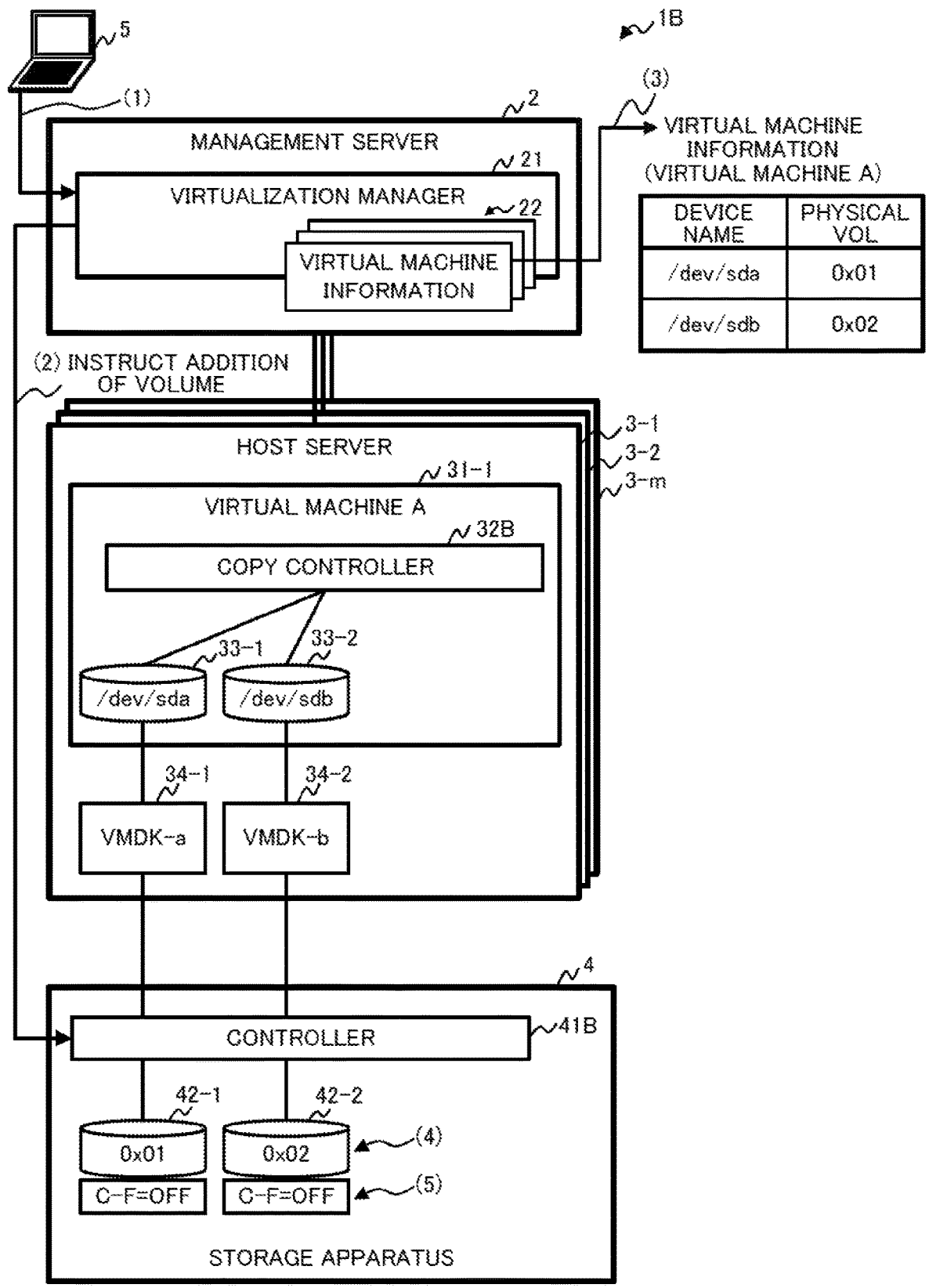
FIG. 28 is a diagram illustrating an exemplary operation for a creation of a new volume.

The virtualization manager 21 sends the volume creation instruction to the controller 41B in the storage apparatus 4 (Processing T72; refer to the arrow (2) in FIG. 28). Note that the virtualization manager 21 may determine the device names and the physical volume numbers of volumes to be created; in this case, at least one of device names and physical volume numbers may be included in the volume creation instruction from the virtualization manager 21.

The virtualization manager 21 also add relationship information between device names ("/dev/sda" and "/dev/sdb") and physical volume numbers ("0x01" and "0x02") to the virtual machine information 22 (refer to the arrow (3) in FIG. 28). An update of the virtual machine information 22 may be carried out after Processing T72 or after Processing T74.

In response to the volume creation instruction, the controller 41B executes volume update processing to create physical volumes 42-1 and 42-2 (Processing T73; refer to (4) in FIG. 28). The creation of the physical volumes 42-1 and 42-2 may involve allocations of the physical volume 42-1 ("0x01") and the physical volume 42-2 ("0x02") to the volume 33-1 ("/dev/sda") and the volume 33-2 ("/dev/sdb"), respectively.

In volume update processing in Processing T73, update processing of the flag management information 47 is executed by the flag manager 48 in the controller 41B (Processing B3; refer to (5) in FIG. 28).

Figure 27:
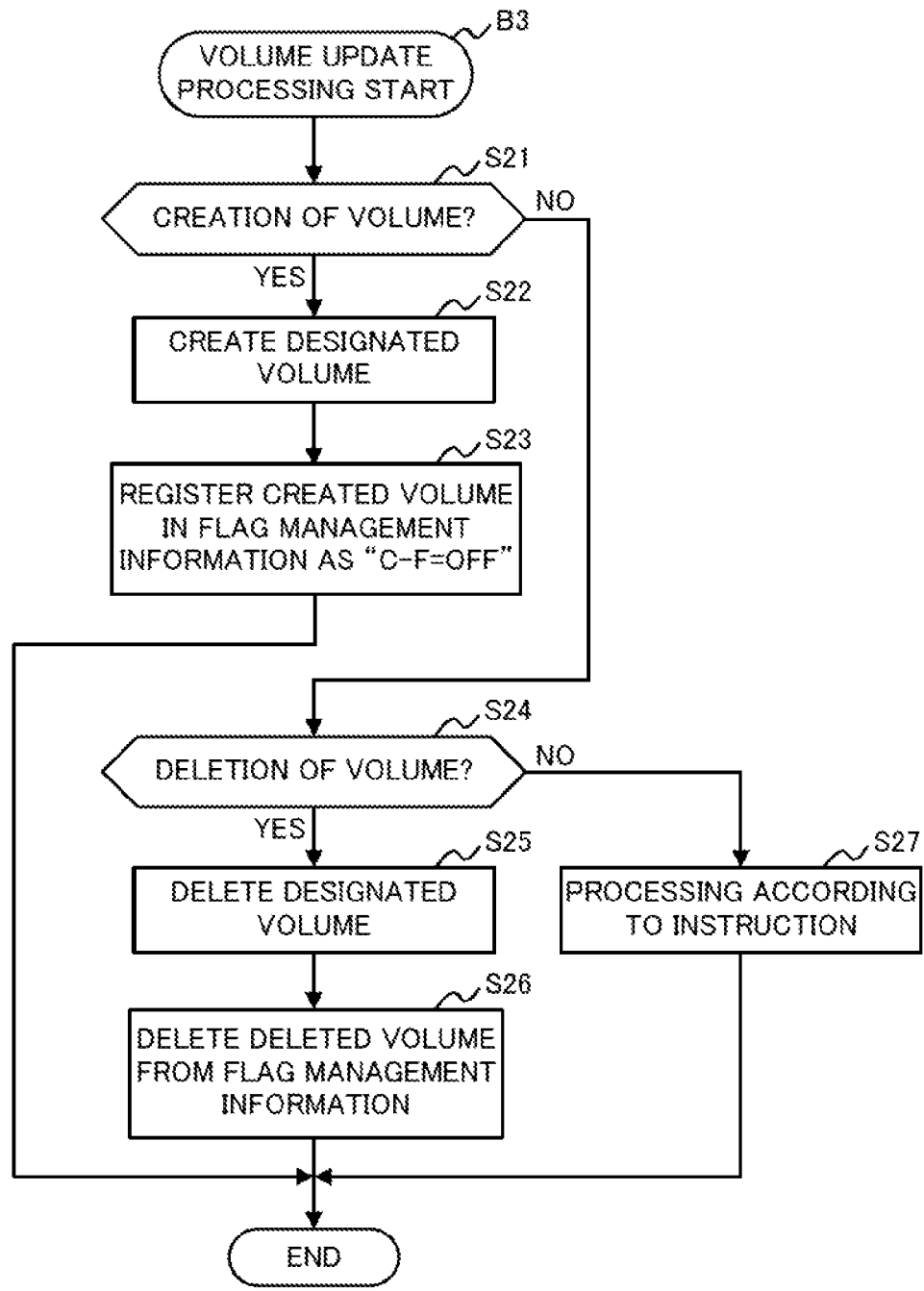
FIG. 27 is a flowchart illustrating volume update processing in the storage apparatus.

Hereinafter, referring to FIG. 27, the volume update processing will be described. As depicted in FIG. 27, in the storage apparatus 4, the controller 41B determines whether or not the processing to be executed is a creation of a physical volume 42 (Step S21).

When a physical volume 42 is to be created ("Yes" from Step S21), the controller 41B create a designated physical volume 42 (Step S22). The flag manager 48 also registers the value "C-F=OFF" to the flag management information 47 for the created physical volume 42 (Step S23), and the processing ends. In the processing in Step S23, the flag management information 47 depicted in FIG. 26 is set.

Otherwise, when the processing to be executed is not a creation of a physical volume 42 in Step S21 ("No" from Step S21), the controller 41B determines whether or not the processing to be executed is a deletion of a physical volume 42 (Step S24).

When a physical volume 42 is to be deleted ("Yes" from Step S24), the controller 41B deletes the designated physical volume 42 (Step S25). The flag manager 48 also deletes information of the deleted physical volume 42 from the flag management information 47 (Step S26), and the processing ends.

When the processing to be executed is not a deletion of a physical volume 42 in Step S24 ("No" from Step S24), the controller 41B executes processing in accordance with the instruction (Step S27), and the processing ends.

Referring back to FIG. 26, once the creation of the physical volumes 42 is completed, the controller 41B sends a response to the virtualization manager 21 (Processing T74).

In accordance with the response from the controller 41B, the virtualization manager 21 sends a response to the terminal apparatus 5 (Processing T75), and the processing ends.

In the processing described above, the physical volumes 42-1 and 42-2 ("0x01" and "0x02") are allocated to the volumes 33-1 and 33-2 ("/dev/sda" and "/dev/sdb"), respectively. Further, the value "OFF" is set to the control flags for the created physical volumes 42, in the flag management information 47.

<4-3-2> First Copy or Initial Setting (Refer to FIGS. 29 to 34)

Figure 29:
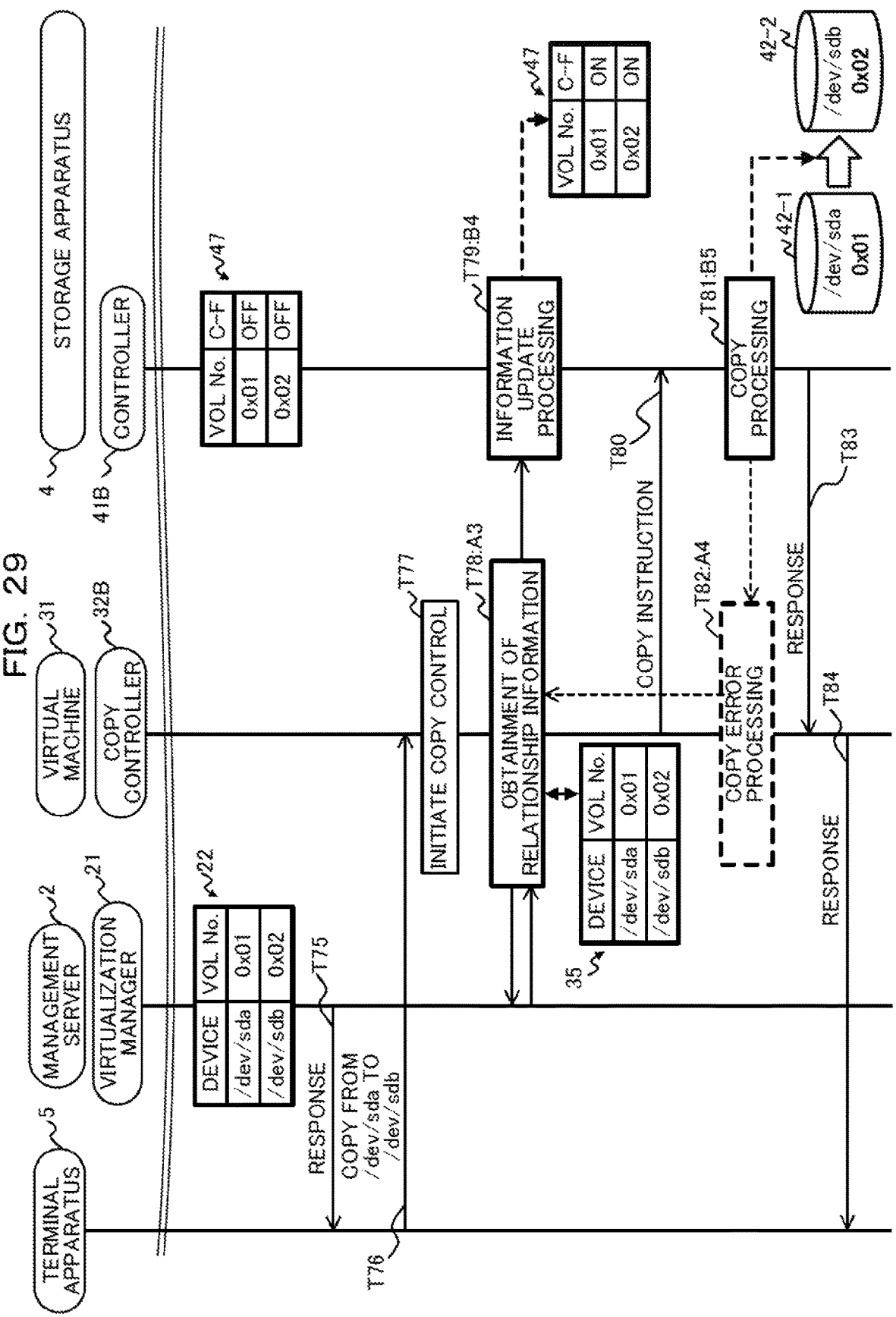
FIG. 29 is a sequence diagram depicting an exemplary operation of an initial copy or initial setting.

Next, an exemplary operation of an initial copy or initial setting (predefined) will be described. As depicted in FIG. 29, after receiving a response to the volume creation instruction (e.g., Processing T75 in FIG. 26), the terminal apparatus 5 designates the device names and sends the copy controller 32B a copy instruction from "/dev/sda" to "/dev/sdb" (Processing T76; refer to the arrow (I) in FIG. 34).

The copy unit 36 in the copy controller 32B initiates a copy control for the designated device names (Processing T77). In the copy control, the information obtainment unit 38B in the copy controller 32B executes obtainment processing of the relationship information (Processing T78, Processing A3).

Figure 30:
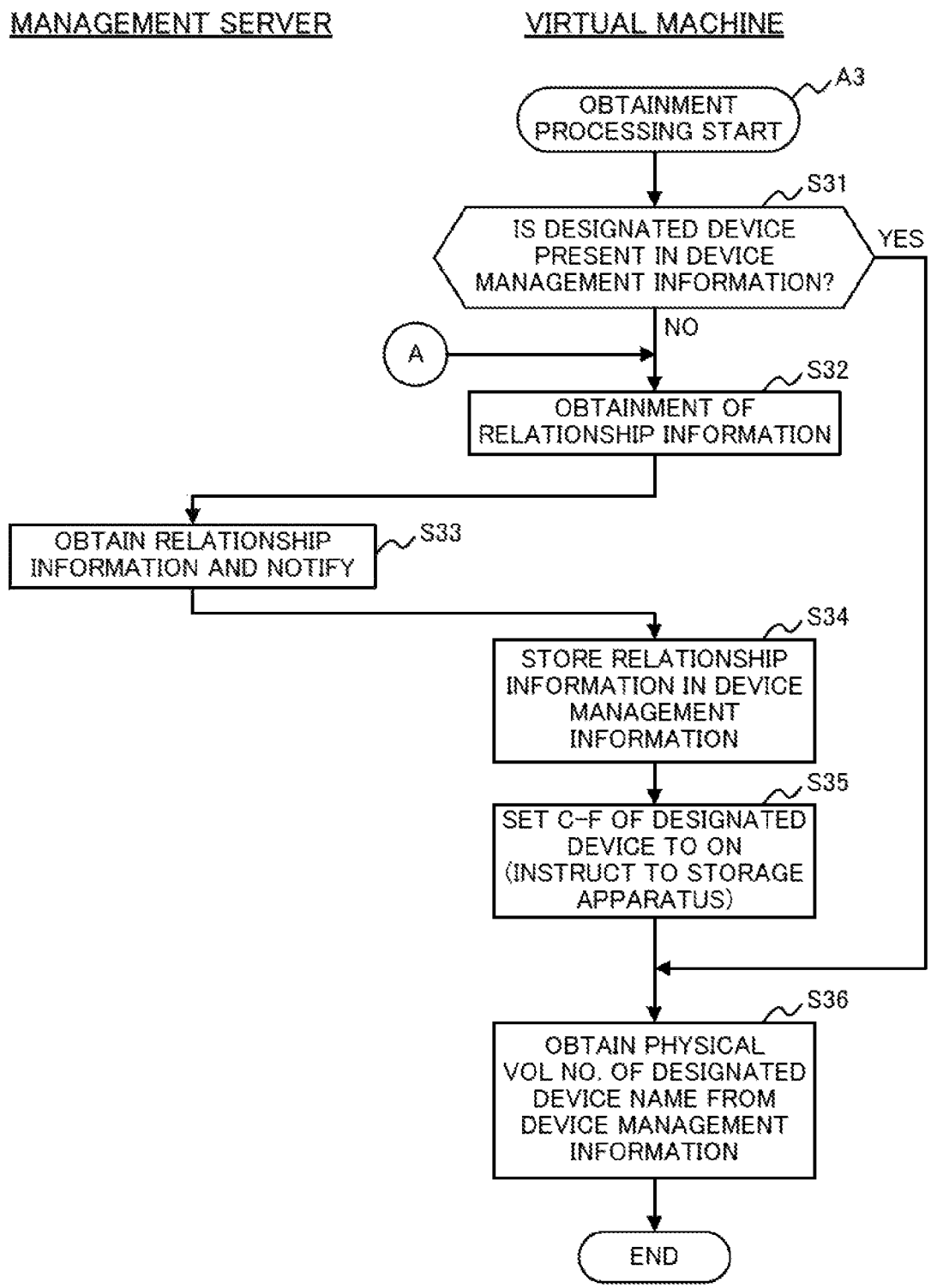
FIG. 30 is a flowchart illustrating obtainment processing in the virtual machine and the management server.

Hereinafter, referring to FIG. 30, the obtainment processing of the relationship information will be described. As depicted in FIG. 30, in the virtual machine 31, the information obtainment unit 38B determines whether or not the device designated in the copy instruction is present in the device management information 35 (determines whether it is registered or not) (Step S31).

When the designated device is not present in the device management information 35 ("No" from Step S31), the information obtainment unit 38B requests the virtualization manager 21 in the management server 2 to obtain the relationship information of that device (Step S32).

The information manager 24 in the virtualization manager 21 obtains the relationship information of the device designated in the copy instruction, from the entry of the requesting virtual machine 31 in the virtual machine information 22, and notifies the copy controller 32B of it (Step S33).

The information obtainment unit 38B in the copy controller 32B stores the relationship information received from the virtualization manager 21, in the device management information 35 (Step S34). The information obtainment unit 38B also controls to set the control flag associated with the device designated in the copy instruction to the value "ON" ("C–F=ON") (Step S35). This control may be done by sending an update instruction of the control flags to the controller 41B in the storage apparatus 4, for example. In the example in FIG. 29, the control flags for the physical volume numbers "0x01" and "0x02" are set to ON".

The information obtainment unit 38B then obtains, from the device management information 35, the physical volume number associated with the device name designated in the copy instruction (Step S36), and the obtainment processing ends.

Otherwise, when the designated device is present in the device management information 35 in Step S31 ("Yes" from Step S31), the processing migrates to Step S36 where the information obtainment unit 38B obtains the physical volume number from the device management information 35.

Figure 34:
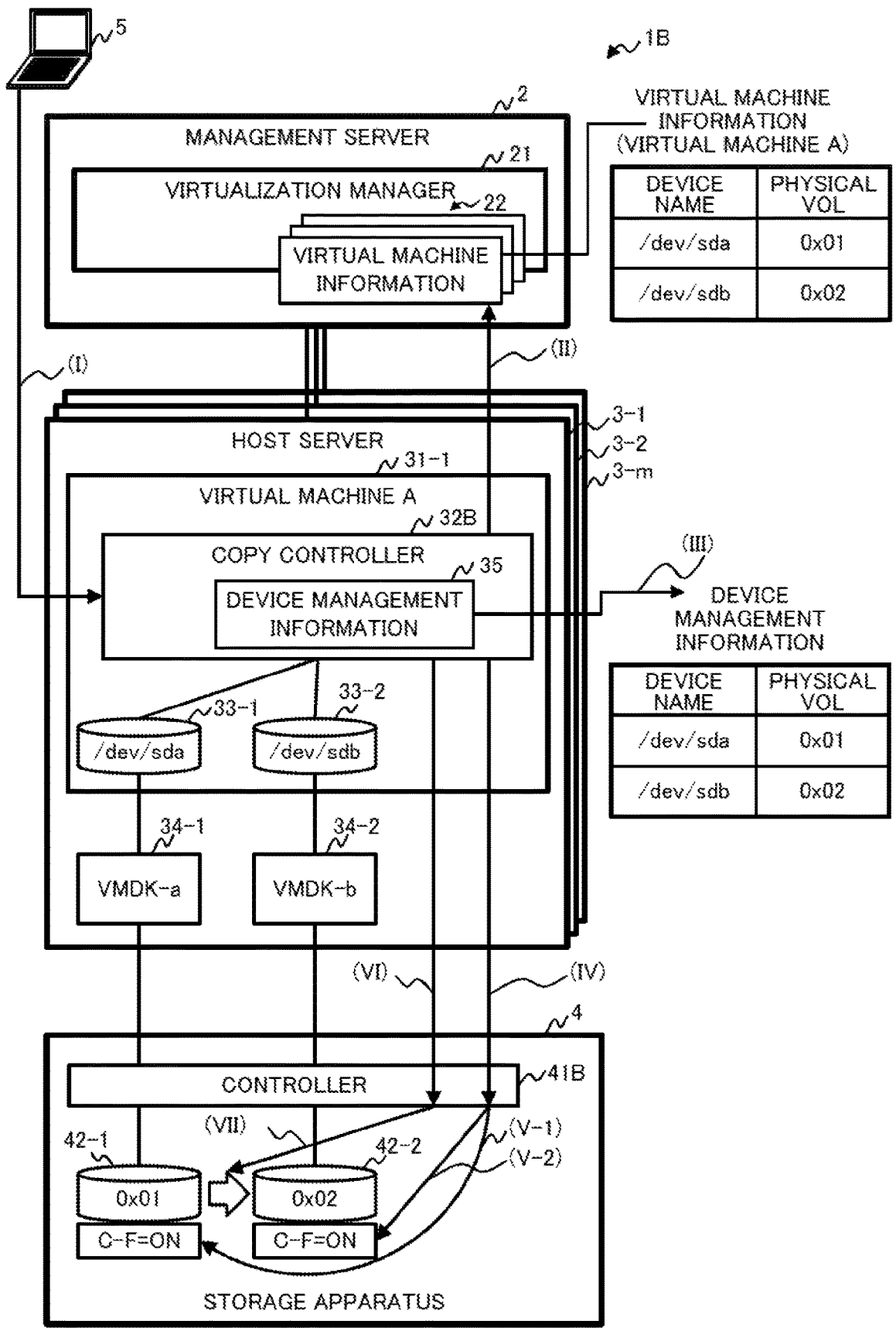
FIG. 34 is a diagram illustrating an exemplary operation of an initial copy or initial setting.

Note that Processing T78 in FIG. 29 and the processing indicated by the arrows (II) to (IV) in FIG. 34 correspond to the processing in Steps S32 to S36 in FIG. 30 when Step S31 is determined as negative ("No"). In other words, the obtainment processing depicted in FIG. 29 and FIG. 34 is exemplary operations of the phase of obtaining the relationship information from the management server 2, as in the case where an initial copy is executed, for example.

Referring back to FIG. 29, in response to receiving, from the copy controller 32B, the update instruction of the control flag, which has been sent during the obtainment processing of the relationship information, the controller 41B in the storage apparatus 4 executes information update processing (Processing T79, Processing B4).

Figure 31:
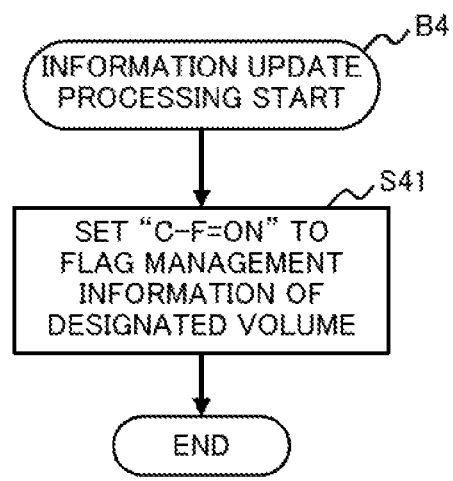
FIG. 31 is a flowchart illustrating information update processing in the storage apparatus.

In the information update processing, as depicted in FIG. 31, in the storage apparatus 4, the flag manager 48 sets "C–F=ON" in the flag management information 47 of the physical volume 42 designated in the update instruction (Step S41), and the processing ends. In the processing in Step S41, as depicted in FIG. 29, the control flags for the physical volume numbers "0x01" and "0x02" are both set to "ON" (refer to the arrows (V-1) and (V-2) in FIG. 34).

Referring back to FIG. 29, the information obtainment unit 38B in the copy controller 32B notifies the copy unit 36 of the physical volume number obtained in the obtainment processing. The copy unit 36 designates the physical volume names and sends a copy instruction from the physical volume with the volume number "0x01" to the physical volume with the volume number "0x02", to the controller 41B in the storage apparatus 4 (Processing T80; refer to the arrow (VI) in FIG. 34).

The copy processing unit 45B in the controller 41B executes the copy processing from the designated physical volume with the volume number "0x01" to the physical volume with the volume number "0x02" (Processing T81, Processing B5; refer to the arrow (VII) in FIG. 34).

Figure 32:
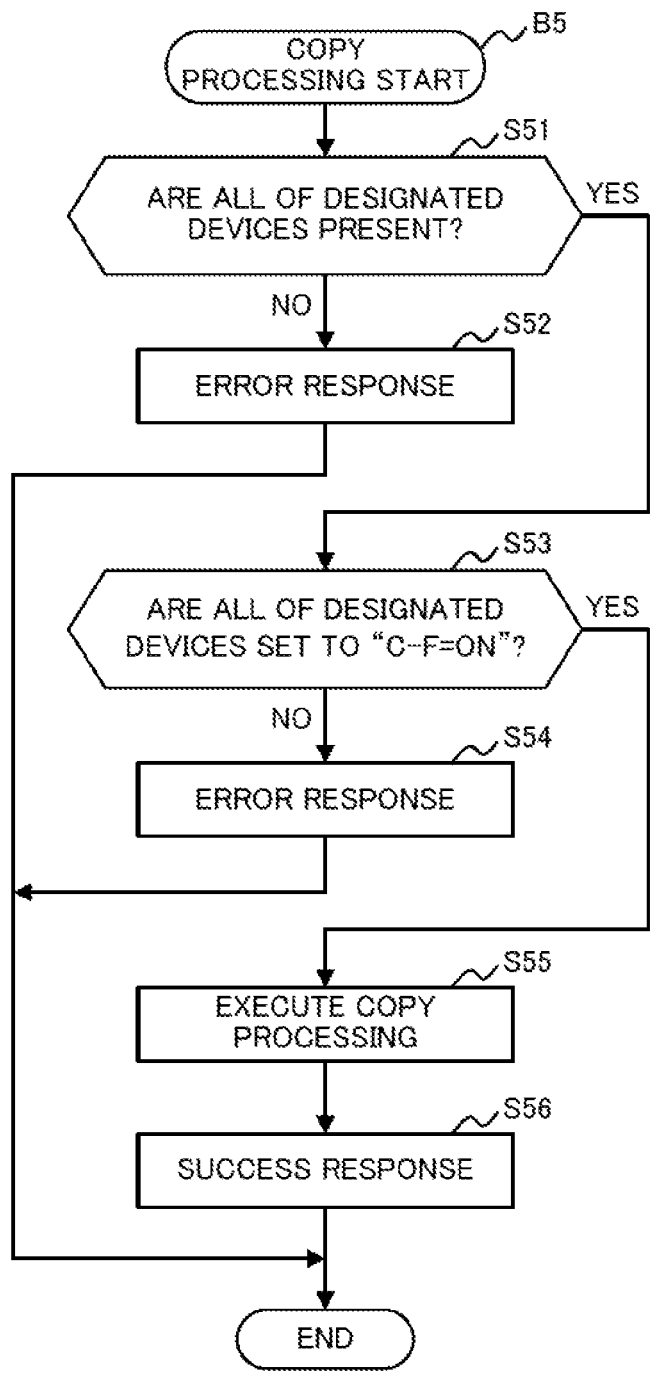
FIG. 32 is a flowchart illustrating copy processing in the storage apparatus.

Hereinafter, referring to FIG. 32, copy processing will be described. As depicted in FIG. 32, in the storage apparatus 4, the copy processing unit 45B determines whether or not all of the devices designated in the copy instruction (e.g., the copy source and copy destination physical volumes 42) are present under the storage apparatus 4 (Step S51).

When at least one device is not present ("No" from Step S51), the copy processing unit 45B responds the copy controller 32B with an error response indicating that the device is not present (Step S52), and the copy processing ends.

Otherwise, when all of the devices are present ("Yes" from Step S51), the copy processing unit 45B determines whether or not all of the devices designated in the copy instruction (e.g. the copy source and copy destination physical volumes 42) are set to "C–F=ON" (Step S53). The determination in Step S53 may be done by looking up the flag management information 47.

When at least one device is not set to "C–F=ON" ("No" from Step S53), the copy processing unit 45B responds the copy controller 32B with an error response indicating that "C–F=OFF" is found (Step S54), and the copy processing ends.

Otherwise, when all of the devices are set to "C–F=ON" ("Yes" from Step S53), the copy processing unit 45B executes the copy processing (Step S55). Once the copy completes, the copy processing unit 45B sends a success response to the copy controller 32B (Step S56; Processing T83 in FIG. 29) and the copy processing ends.

Referring back to FIG. 29, in response to receiving the error response sent during the copy processing from the controller 41B, the copy controller 32B may execute copy error processing (Processing T82, Processing A4).

Figure 33:
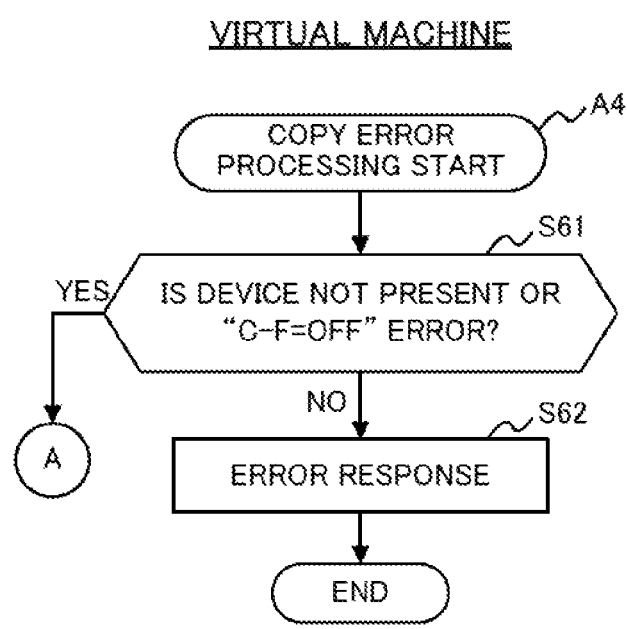
FIG. 33 is a flowchart illustrating copy error processing in a virtual machine.

In the copy error processing, as depicted in FIG. 33, in the virtual machine 31, the copy controller 32B determines whether or not the error response received from the controller 41B indicates that the device is not present, or that the flag value is set to "OFF" ("C–F=OFF") (Step S61).

When the error response does not match the determination conditions in Step S61 (from Step S61 "No"), the copy controller 32B sends an error response to the terminal apparatus 5 (Step S62; Processing T84 in FIG. 29).

Otherwise, when the error response matches the determination conditions in Step S61 ("Yes" from Step S61), the processing migrates to Step S32 in in FIG. 30 for obtaining the latest relationship information from the management server 2 to update the device management information 35, and update processing is executed.

Referring back to FIG. 29, in response to receiving the success response from the controller 41B, the copy controller 32B sends a success response to the terminal apparatus 5 (Processing T84), and the processing ends.

In the processing described above, in the initial copy or in the initial setting, the physical volume numbers of the devices designated by the user is obtained from the management server 2 by the copy controller 32B. Further, the control flags for those devices are set to "ON", and a copy is executed by the controller 41B.

<4-3-3> Copy Operation (Refer to FIGS. 30 to 33, 35, and 36)

Next, an exemplary operation when an operation of a copy is carried out, in other words, when the relationship information of the device designated in the copy instruction is registered in the device management information 35 will be described.

Figure 35:
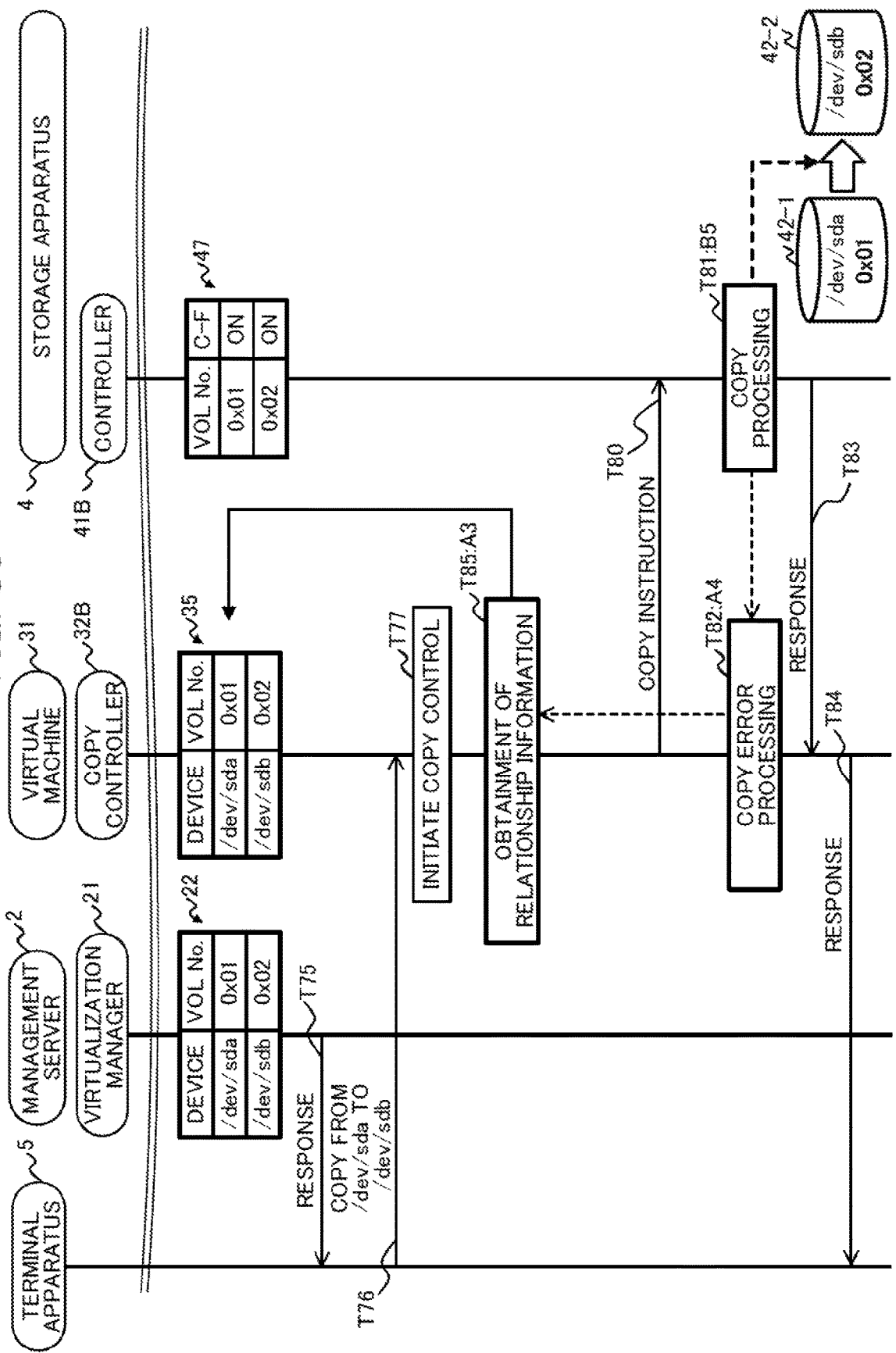
FIG. 35 is a sequence diagram depicting an exemplary operation of a copy operation.
Figure 36:
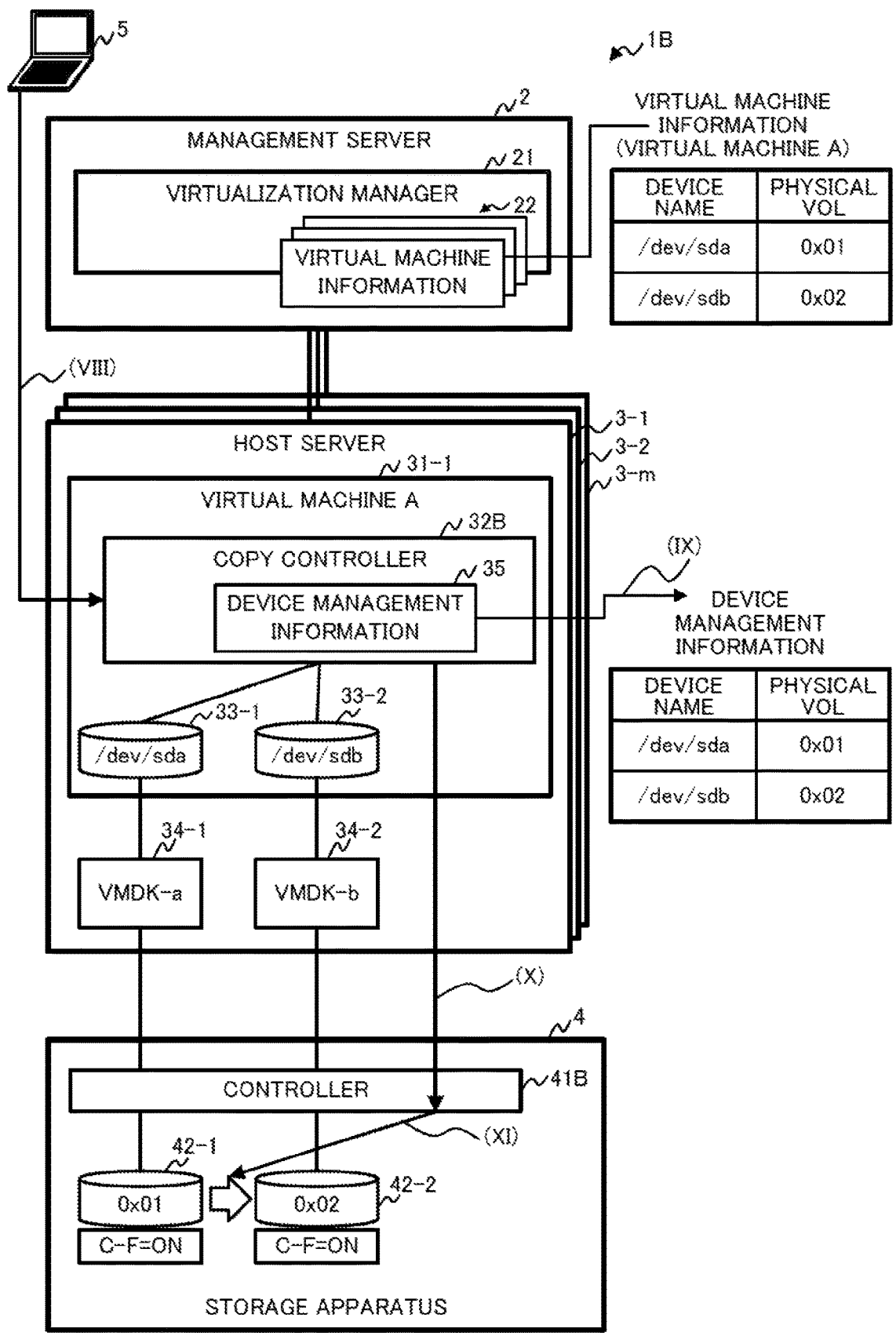
FIG. 36 is a diagram illustrating an exemplary operation of a copy operation.

As depicted in FIG. 35, the terminal apparatus 5 designates the device names and sends the copy controller 32B a copy instruction from "/dev/sda" to "/dev/sdb" (Processing T76; refer to the arrow (VIII) in FIG. 36).

The copy unit 36 in the copy controller 32B initiates a copy control for the designated device names (Processing T77). In the copy control, the information obtainment unit 38B in the copy controller 32B executes obtainment processing of the relationship information (Processing T85, Processing A3).

In Processing T85, since all of the device names designated in the copy instruction are present in the device management information 35, the information obtainment unit 38B obtains physical volume numbers associated with those device names from the device management information 35.

Note that Processing T85 in FIG. 35 and processing indicated by the arrow (IX) in FIG. 36 correspond to the processing in Step S36 in FIG. 30 when Step S31 is determined as affirmative ("Yes"). In other words, obtainment processing depicted in FIGS. 35 and 36 is exemplary operations of the phase to obtain the relationship information from the device management information 35 stored in the local virtual machine 31, as in the case where second and subsequent copies are executed, for example.

The copy unit 36 designates the physical volume number obtained from the device management information 35 by the information obtainment unit 38B, and sends a copy instruction from the physical volume with the volume number "0x01" to the physical volume with the volume number "0x02", to the controller 41B in the storage apparatus 4 (Processing T80; refer to the arrow (X) in FIG. 36).

The copy processing unit 45B in the controller 41B executes the copy processing from the designated physical volume with the volume number "0x01" to the physical volume with the volume number "0x02" (Processing T81, Processing B5; refer to the arrow (XI) in FIG. 36). Note that the following processing is similar to the processing described above with reference to FIGS. 29 and 34.

As described above, in the copy processing during an operation, since the copy controller 32B looks up the device management information 35 on the virtual machine 31, no access to the virtual platform occurs.

Figure 37:
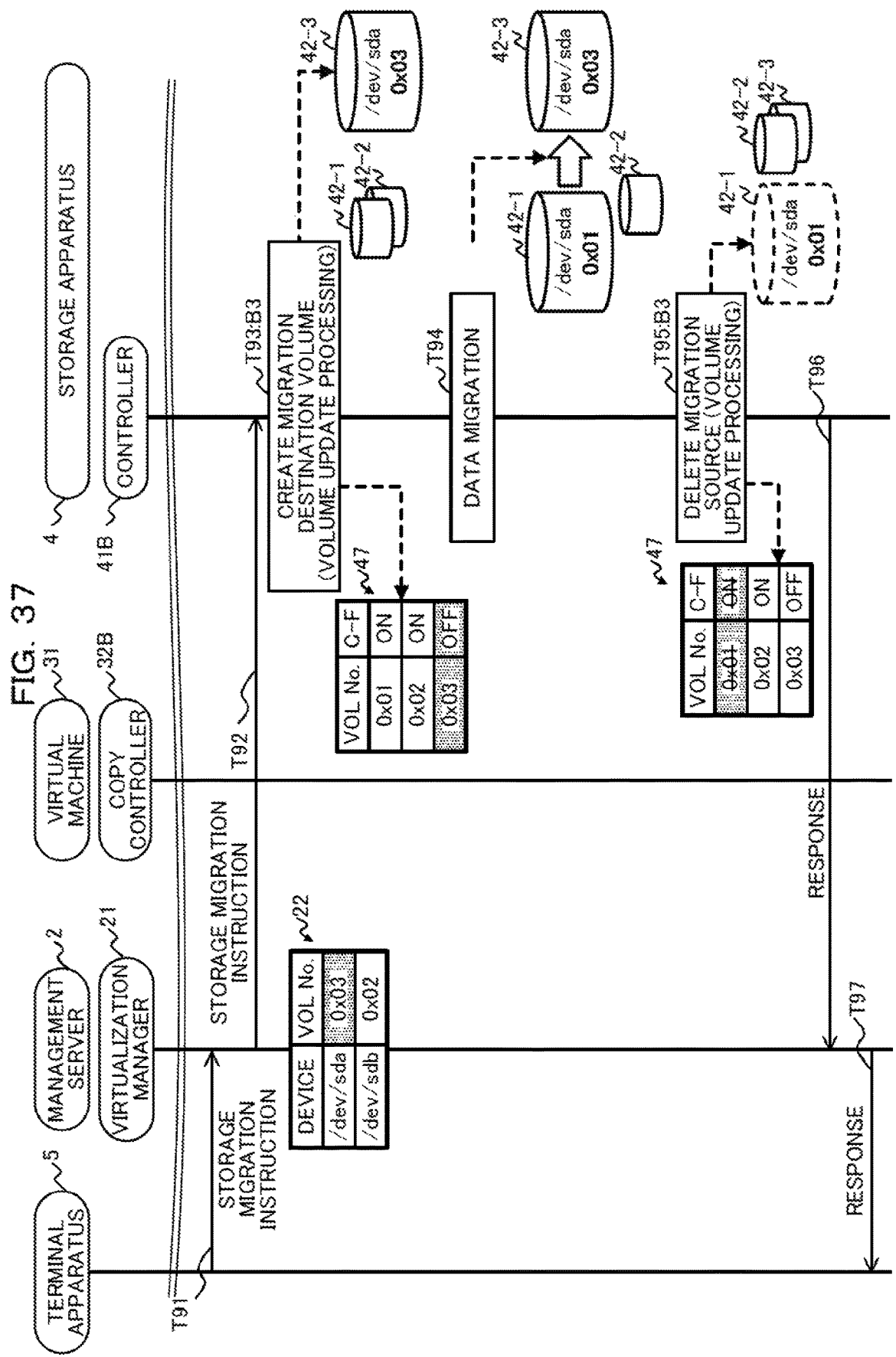
FIG. 37 is a sequence diagram depicting an exemplary operation of storage migration processing.
Figure 38:
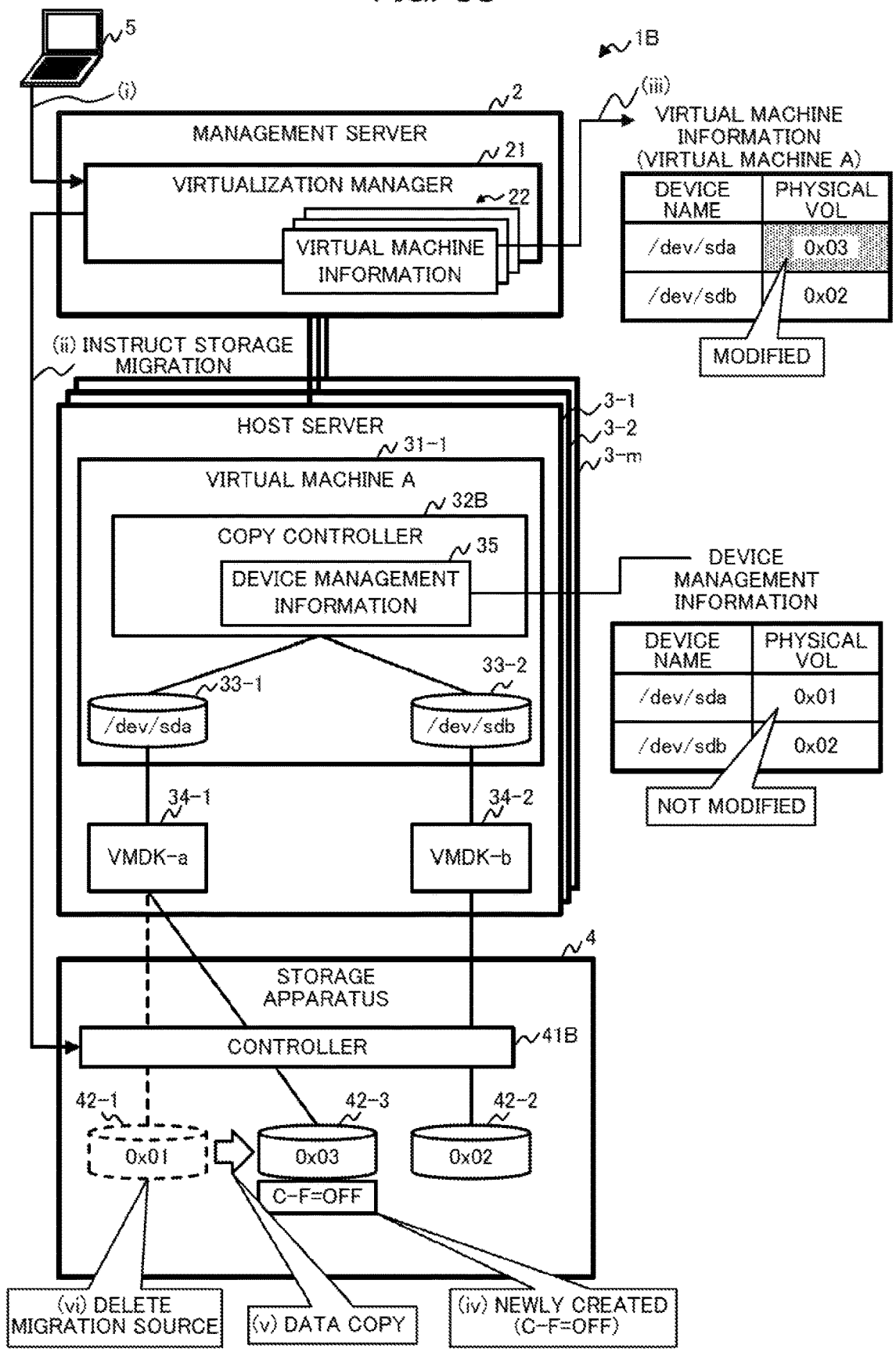
FIG. 38 is a diagram illustrating an exemplary operation of storage migration processing.

<4-3-4> Execution of Storage Migration Processing (Refer to FIGS. 37 and 38)

Next, an exemplary operation of storage migration processing will be described. It is assumed that, as depicted in FIG. 34 or FIG. 36, the volume numbers "0x01" and "0x02" are associated with the device names "/dev/sda" and "/dev/sdb", respectively, in the virtual machine information 22 and the device management information 35.

As depicted in FIG. 37, the terminal apparatus 5 designates the device name "/dev/sda" as a device to undergo a storage migration, and sends a storage migration instruction to the virtualization manager 21 in the management server 2 (Processing T91; refer to the arrow (i) in FIG. 38).

The virtualization manager 21 designates the physical volume 42-1 ("0x01") associated with the device name designated via the terminal apparatus 5, and sends a storage migration instruction to the controller 41B in the storage apparatus 4 (Processing T92; refer to the arrow (ii) in FIG. 38). In Processing T92, the physical volume 42 associated with the device name may be obtained, based on the virtual machine information 22, for example.

The migration destination physical volume 42-3 ("0x03") may also be designated by the virtualization manager 21, and the information manager 24 may update the physical volume number associated with the device name "/dev/sda" in the virtual machine information 22 to "0x03" (refer to the arrow (iii) in FIG. 38).

In response to receiving the storage migration instruction, the controller 41B executes volume update processing for creating a migration destination physical volume 42-3 ("0x03") as a physical volume 42 for "/dev/sda" (Processing T93; refer to (iv) in FIG. 38).

In the volume update processing in Processing T93, update processing of the flag management information 47 is executed by the flag manager 48 in the controller 41B (Processing B3). In Processing B3, the value "C–F=OFF" is set to the physical volume number "0x03" in the flag management information 47.

Subsequently, the controller 41B copies the data from the migration source volume with the volume number "0x01", to the migration destination volume with the volume number "0x03" created in Processing T93 (Processing T94; refer to (v) in FIG. 38).

The controller 41B then executes volume update processing for deleting the migration source physical volume 42-1 with the volume number "0x01" (Processing T95; refer to (vi) in FIG. 38).

In the volume update processing in Processing T95, the update processing of the flag management information 47 is executed by the flag manager 48 in the controller 41B (Processing B3). In Processing B3, the entry of the physical volume number "0x01" is deleted from the flag management information 47.

The controller 41B then sends a response to the virtualization manager 21 (Processing T96), the virtualization manager 21 sends the terminal apparatus 5 a response to the storage migration instruction (Processing T97), and the processing ends. Note that migration destination physical volume number is determined by the controller 41B, and may be notified to the virtualization manager 21 in the response in Processing T96. In such a case, the information manager 24 may update the virtual machine information 22 after receiving the response in Processing T96.

As described above, in the storage migration processing, the control flag for the migration destination physical volume 42 is set to "OFF", and the control flag of the migration source physical volume 42 is deleted.

<4-3-5> Continuation of Copy Operation (Refer to FIGS. 39 to 42)

Figure 39:
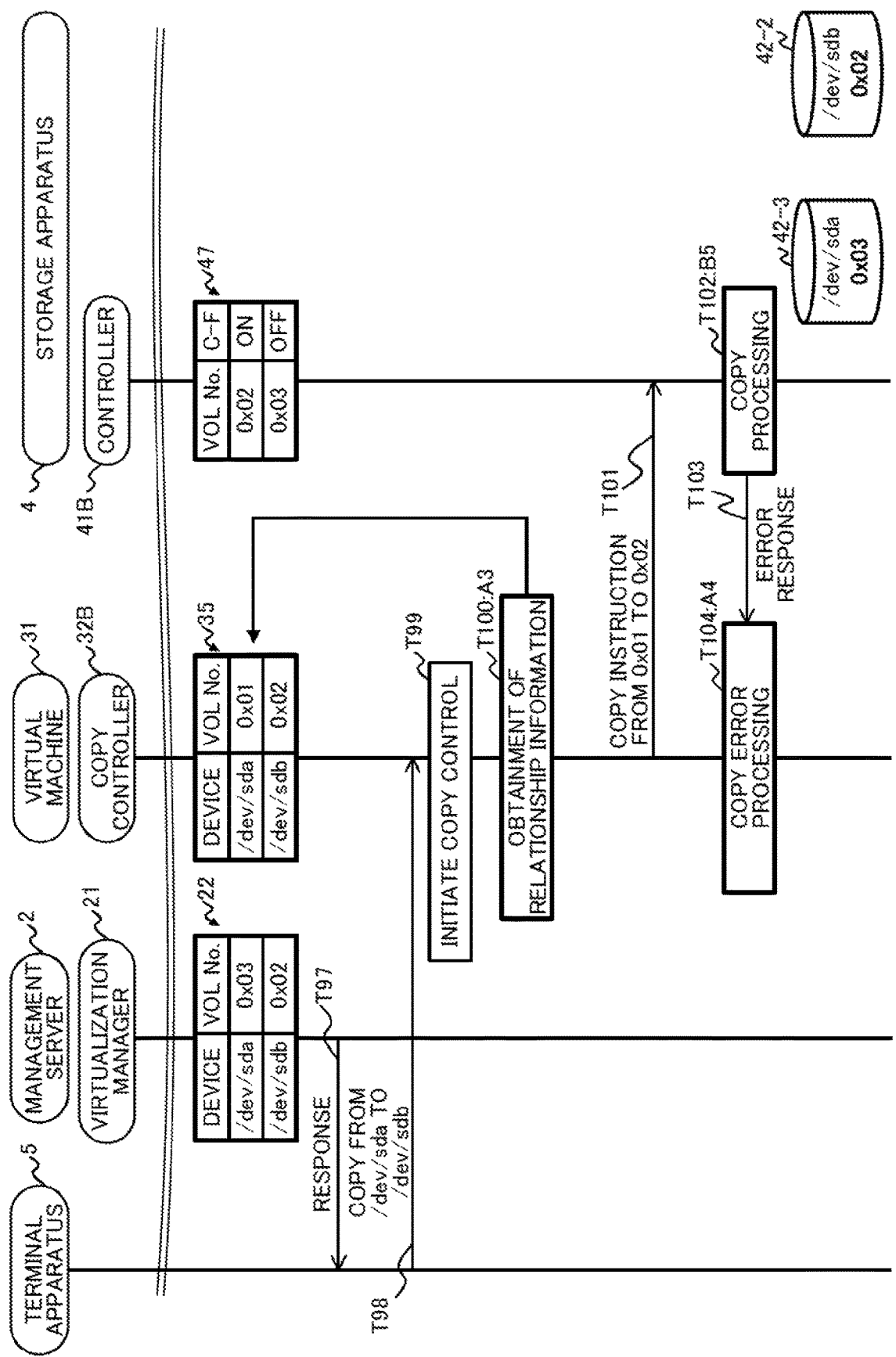
FIG. 39 is a sequence diagram depicting an exemplary operation (1) when a copy operation is continued after a storage migration.

Next, an exemplary operation when a copy operation is continued after the storage migration will be described. After the storage migration processing depicted in FIG. 38 (after the execution of Processing T97 in FIG. 37), as depicted in FIG. 39, the terminal apparatus 5 sends the copy controller 32B a copy instruction from the device with the device name "/dev/sda" to the device with the device name "/dev/sdb" (Processing T98; refer to the arrow (1) in FIG. 40). The copy controller 32B initiates a copy control (Processing T99), and obtains the relationship information in the copy control (Processing T100, Processing A3).

Figure 40:
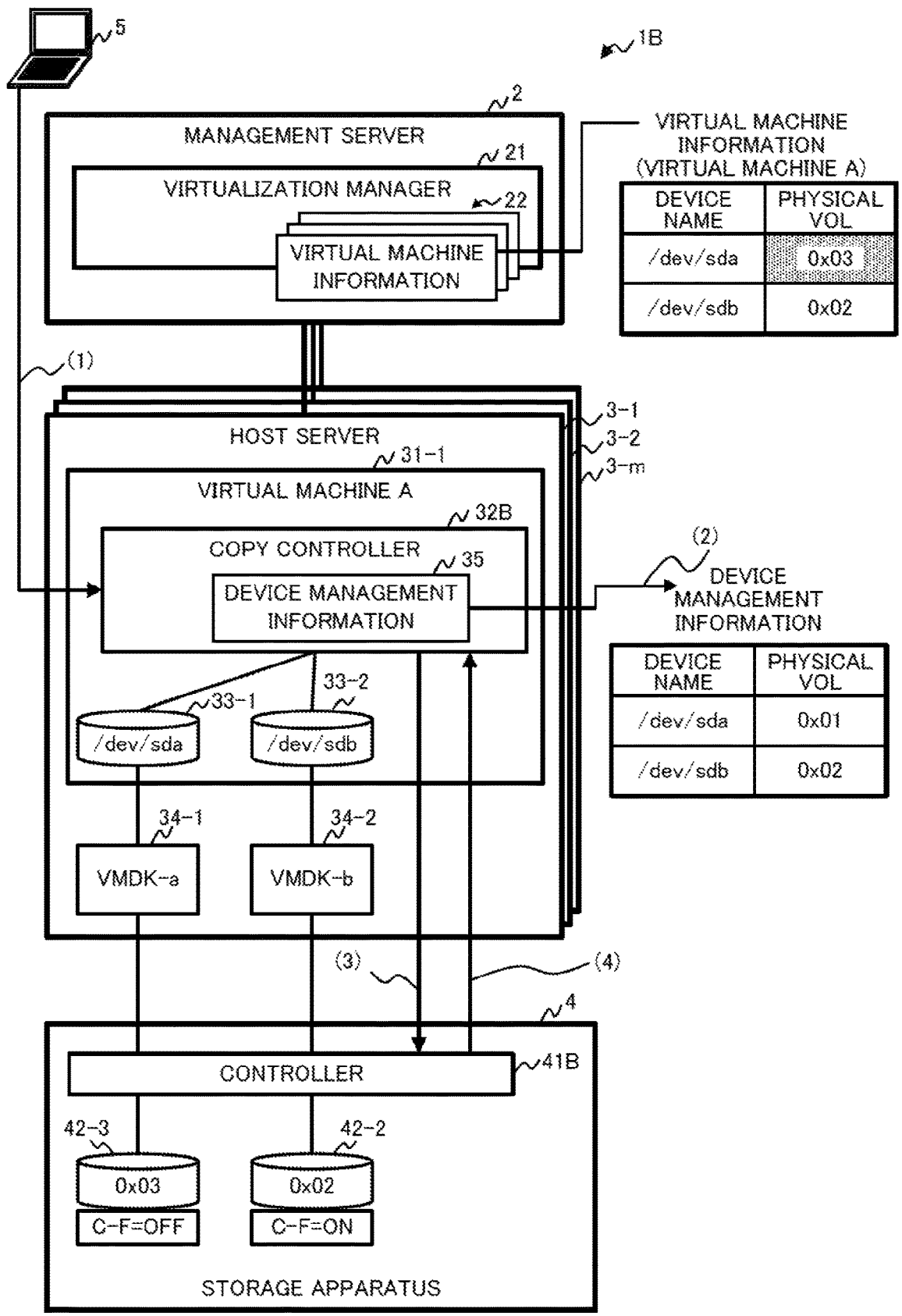
FIG. 40 is a diagram illustrating the exemplary operation (1) when a copy operation is continued after a storage migration.

In Processing T100, since the devices of "/dev/sda" and "/dev/sdb" that are designated in the copy instruction are both present in the device management information 35, the relationship information is obtained from the device management information 35 (refer to the arrow (2) in FIG. 40).

The copy controller 32B then, based on the relationship information obtained from the device management information 35, sends a copy instruction from the physical volume with the volume number "0x01" to the physical volume with the volume number "0x02", to the controller 41B in the storage apparatus 4 (Processing T101; refer to the arrow (3) in FIG. 40).

The controller 41B executes the copy processing for the designated devices (Processing T102, Processing B5). However, since the physical volume 42-1 ("0x01") designated as the copy source is not present, Step S51 in FIG. 32 is determined as negative ("No") and an error response indicating that the device is not present is sent from the controller 41B to the copy controller 32B (Processing T103; refer to the arrow (4) in FIG. 40).

The information obtainment unit 38B in the copy controller 32B executes the copy error processing based on the error response from the controller 41B (Processing T104, Processing A4). In the copy error processing, since the error response received from the controller 41B indicates that "the device is not present", Step S61 in FIG. 33 is determined as affirmative ("Yes").

Figure 41:
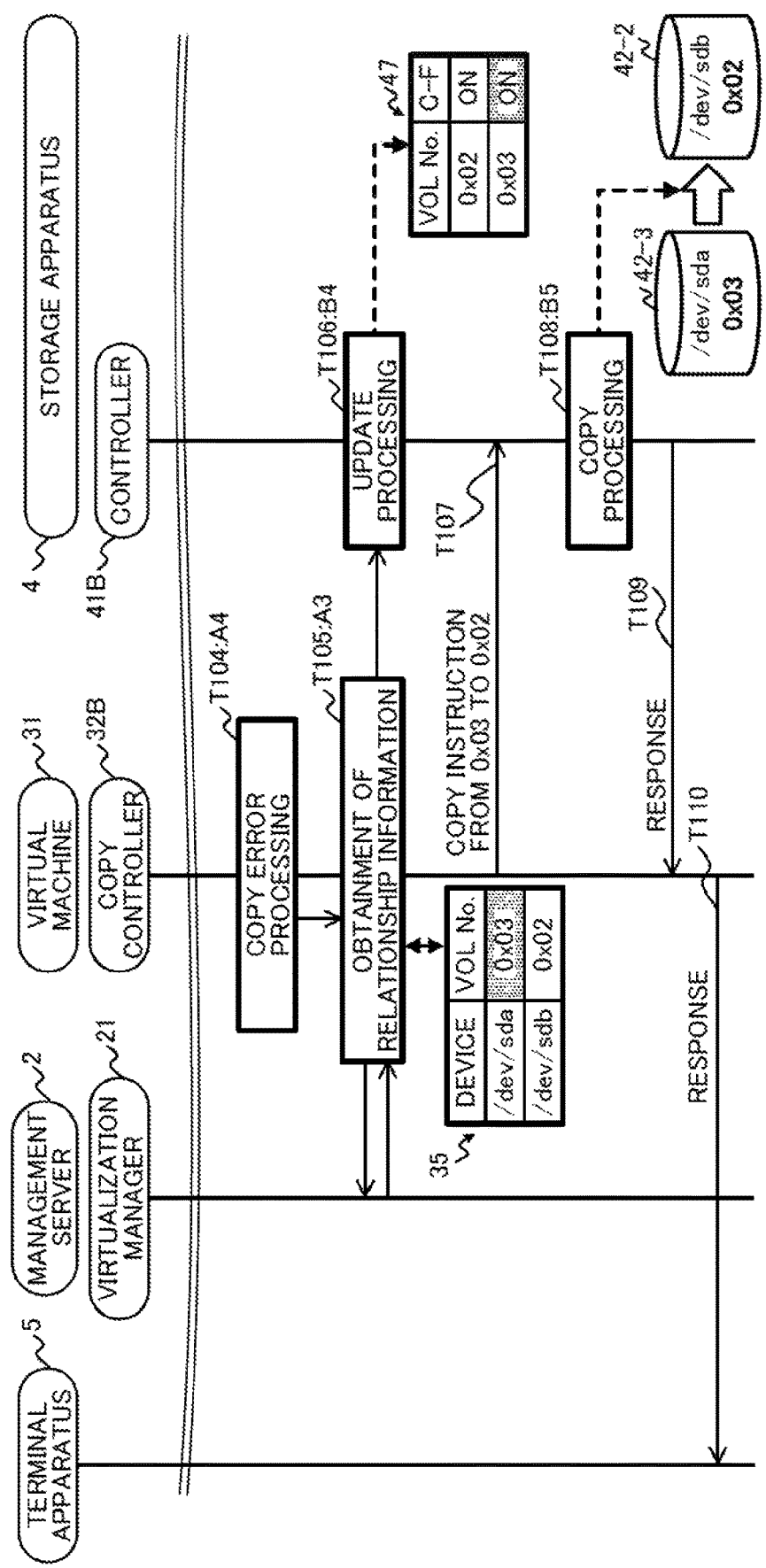
FIG. 41 is a sequence diagram depicting an exemplary operation (2) when a copy operation is continued after a storage migration.

Hence, as depicted in FIG. 41, the information obtainment unit 38B executes the obtainment processing of the relationship information (Processing T105, Processing A3).

Figure 42:
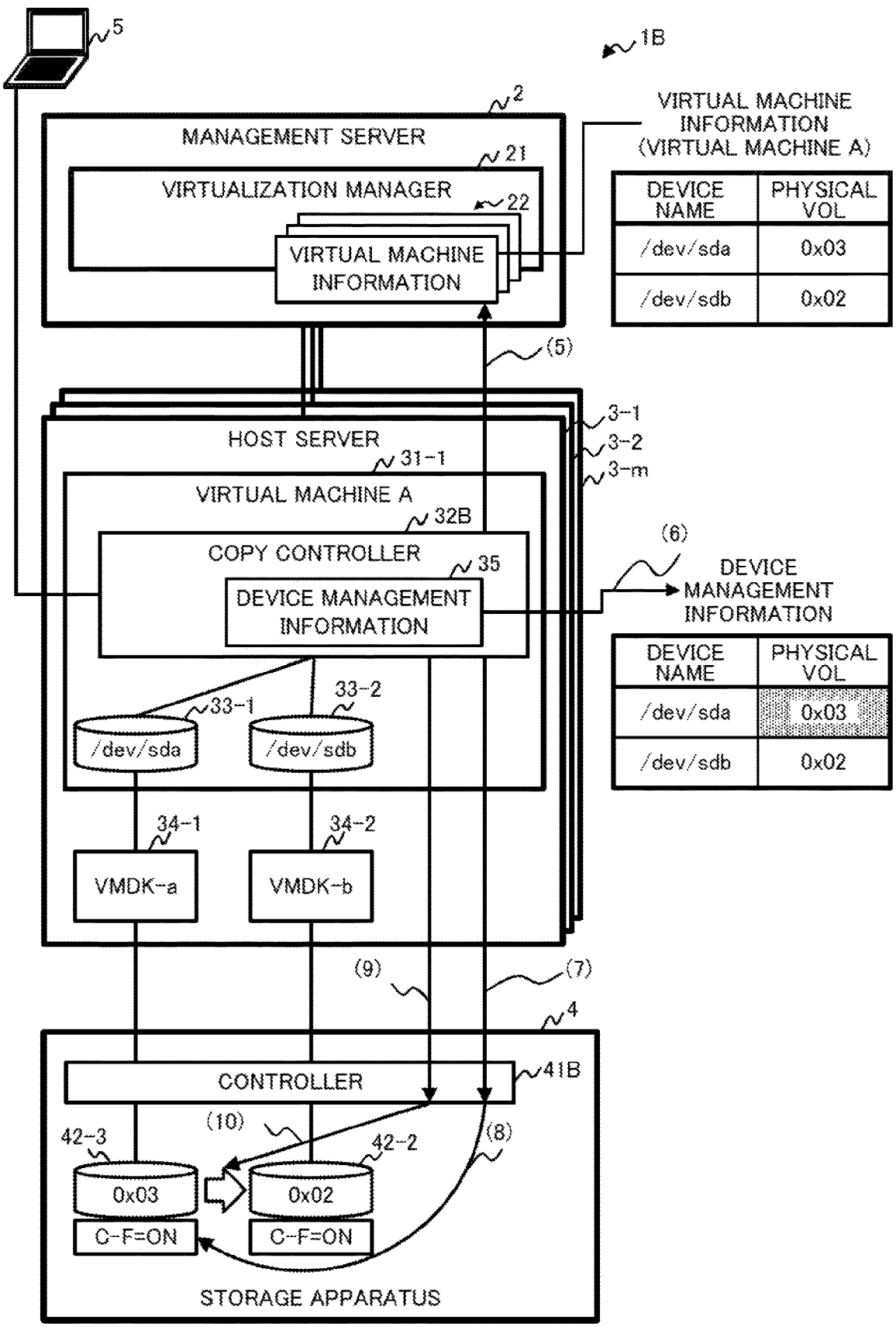
FIG. 42 is a diagram illustrating an exemplary operation (2) when a copy operation is continued after a storage migration.

The information obtainment unit 38B obtains the relationship information from the virtualization manager 21 in the obtainment processing (refer to the arrow (5) in FIG. 42), and updates the device management information 35 (refer to the arrow (6) in FIG. 42). The information obtainment unit 38B also causes the controller 41B to set the control flag for the volume number "0x03", which is placed under the management of the copy controller 32B, to "ON" (refer to the arrow (7) in FIG. 42).

The controller 41B, in response to the update instruction of the control flag from the information obtainment unit 38B, executes the update processing for setting the control flag of the volume number "0x03" to "ON" (Processing T106, Processing B4; refer to the arrow (8) in FIG. 42).

Further, in the copy controller 32B, the copy unit 36 sends a copy instruction from the physical volume with the volume number "0x03 to the physical volume with the volume number "0x02" to the controller 41B, based on the updated device management information 35 (Processing T107; refer to the arrow (9) in FIG. 42).

The copy processing unit 45B in the controller 41B executes the copy processing from the designated physical volume with the volume number "0x03 to the physical volume with the volume number "0x02" (Processing T108, Processing B5; refer to the arrow (10) in FIG. 42), and sends a success response to the copy controller 32B (Processing T109).

In response to receiving the success response from the controller 41B, the copy controller 32B sends a success response to the terminal apparatus 5 (Processing T110), and the processing ends.

As described above, in the copy processing after a storage migration, a copy request of a physical volume 42 that is not present, may be issued from the copy controller 32B to the controller 41B. In this case, the storage apparatus 4 returns an error response indicating that the device is not present.

When the error response indicating that the device is not present is returned, the copy controller 32B determines that that physical volume 42 has undergone a storage migration, and reconstructs a relationship between the device and the physical volume 42. The copy controller 32B then places the physical volume 42 of which the device management information 35 has been updated, under the management of the copy controller 32B (controls it by setting its control flag to "ON"), and requests a copy to the controller 41B once again.

Accordingly, in accordance with the information processing system 1B according to the second embodiment, the above-described failure (a) can be avoided wherein copy processing fails in the storage apparatus 4 when an absent physical volume number is designated in a copy instruction.

Just avoiding the above-described failure (a) may be achieved by applying the copy error processing depicted in FIG. 33 to the copy controller 32A in the information processing system 1A according to the first embodiment, for example. In such a case, this is achieved by migrating the processing to Step S2 depicted in FIG. 12 when Step S61 is determined as negative ("No").

Figure 43:
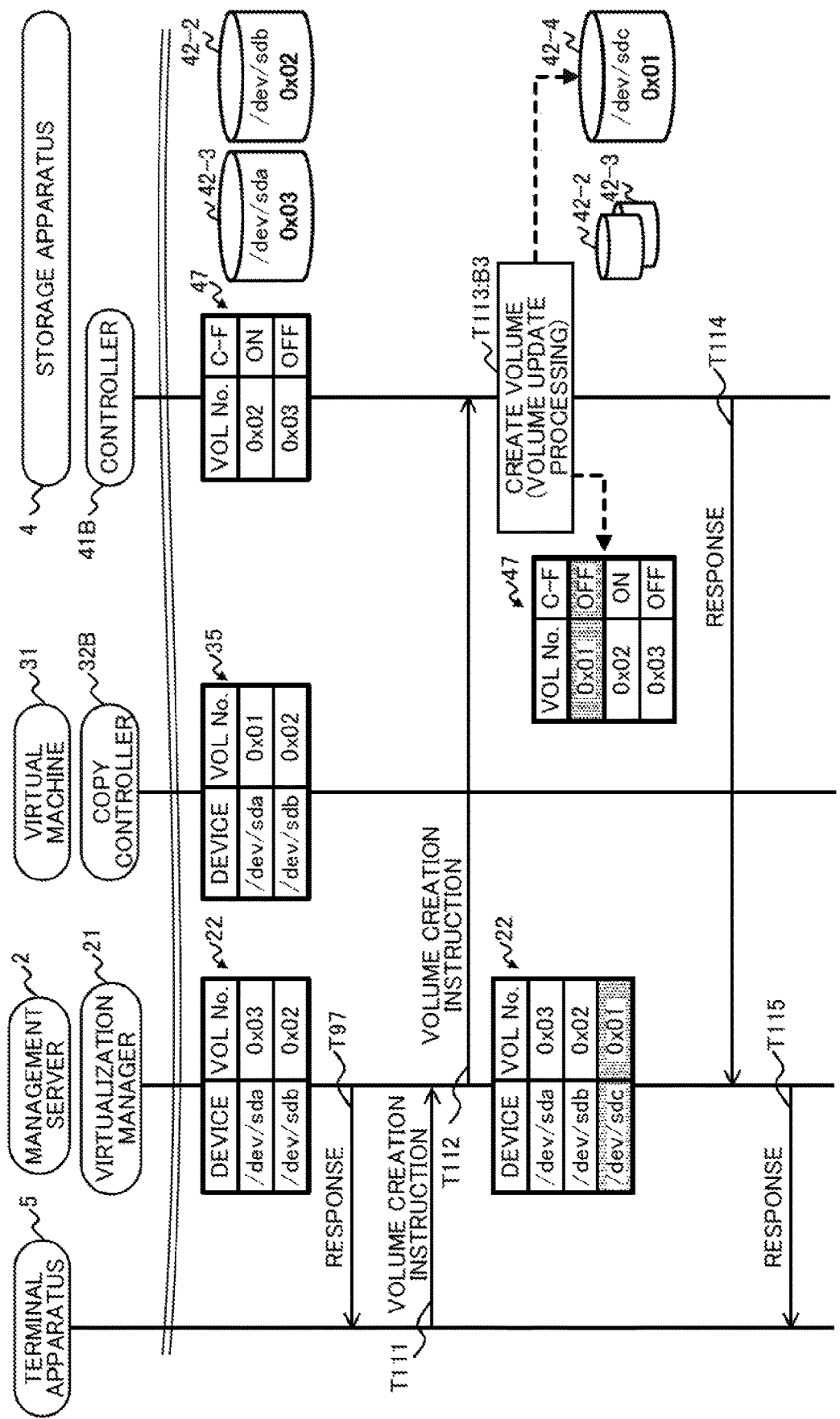
FIG. 43 is a sequence diagram depicting an exemplary operation when a new volume is created after a storage migration.
Figure 44:
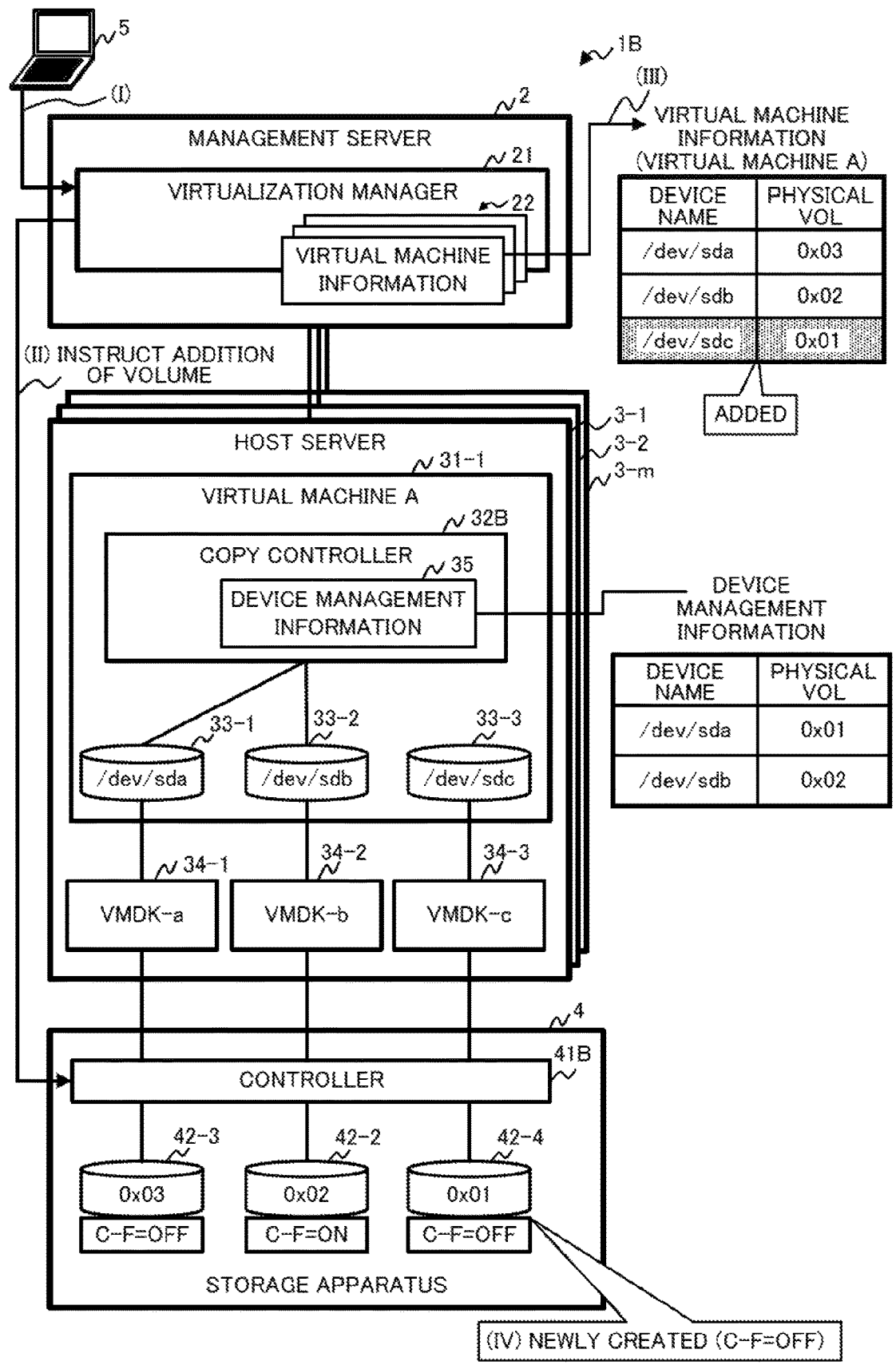
FIG. 44 is a diagram illustrating an exemplary operation when a new volume is created after a storage migration.

<4-3-6> Creation of New Volume (Refer to FIGS. 43 and 44)

Next, an exemplary operation when a new volume is created after the storage migration will be described. After the storage migration processing depicted in FIG. 38 (after the execution of Processing T97 in FIG. 37), as depicted in FIG. 43, the terminal apparatus 5 sends a volume creation instruction to the virtualization manager 21 (Processing T111; refer to the arrow (I) in FIG. 44).

The virtualization manager 21 sends the volume creation instruction to the controller 41B in the storage apparatus 4 (Processing T112; refer to the arrow (II) in FIG. 44).

The virtualization manager 21 also adds the relationship information between the device name ("/dev/sdc") and the physical volume number ("0x01") to the virtual machine information 22 (refer to the arrow (III) in FIG. 44). An update of the virtual machine information 22 may be carried out after Processing T112 or after Processing T114.

The controller 41B executes volume update processing for creating a physical volume 42-4 in response to the volume creation instruction (Processing T113; refer to (IV) in FIG. 44). The creation of the physical volume 42-4 may involve an allocation of the physical volume 42-4 ("0x01") to the volume 33-3 ("/dev/sdc").

In the volume update processing in Processing T113, the update processing of the flag management information 47 is executed by the flag manager 48 in the controller 41B (Processing B3).

In Processing T113 and Processing B3, the physical volume 42-4 is created by reusing the physical volume number "0x01", and the control flag of the physical volume number "0x01" is set to "OFF".

<4-3-7> Continuation of Copy Operation (Refer to FIGS. 45 to 48)

Next, an exemplary operation when a copy operation is continued after the storage migration processing and the volume creation processing have been executed, will be described.

Figure 45:
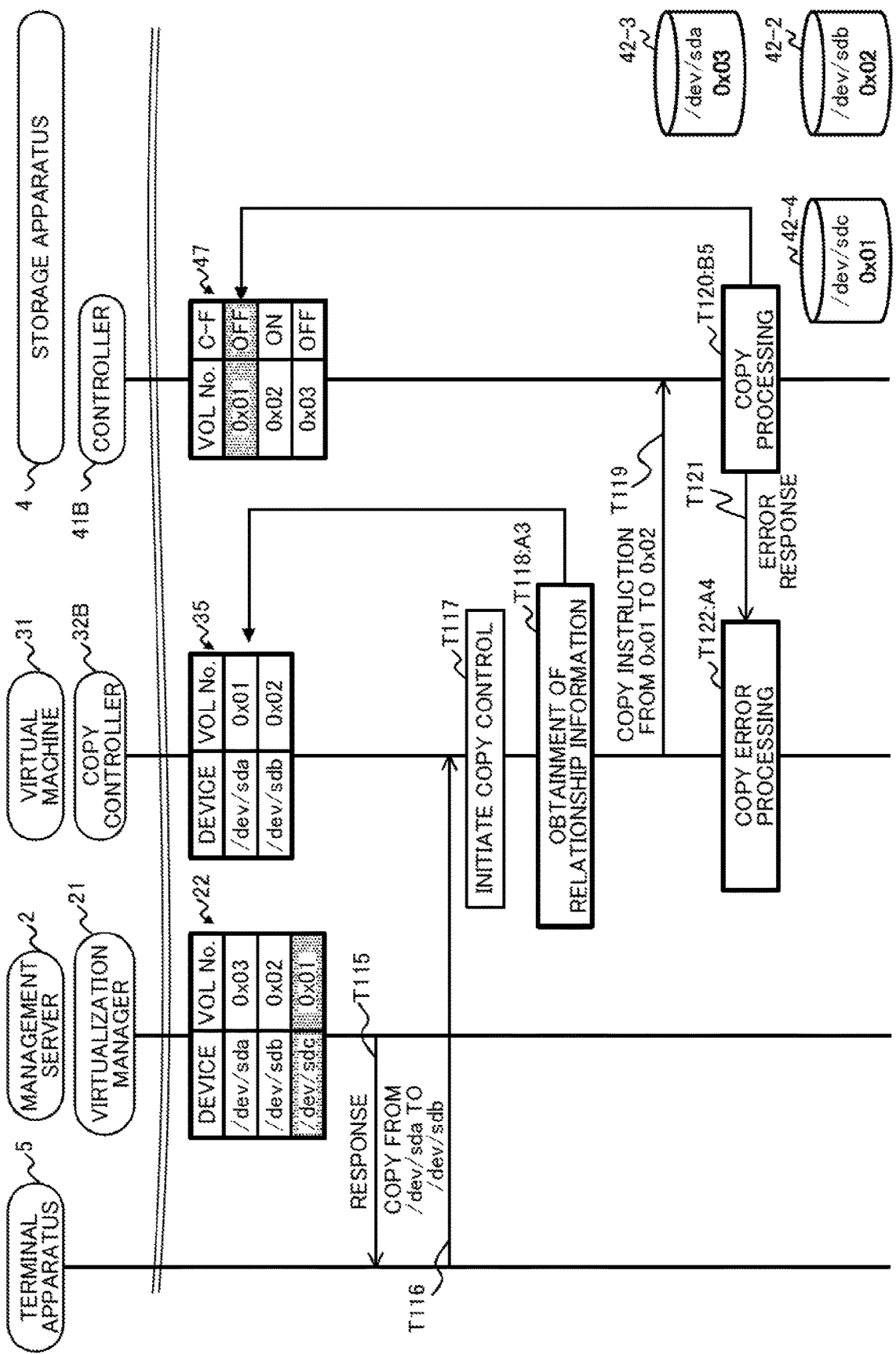
FIG. 45 is a sequence diagram depicting an exemplary operation (1) when a copy operation is continued after storage migration processing and volume creation processing are executed.
Figure 46:
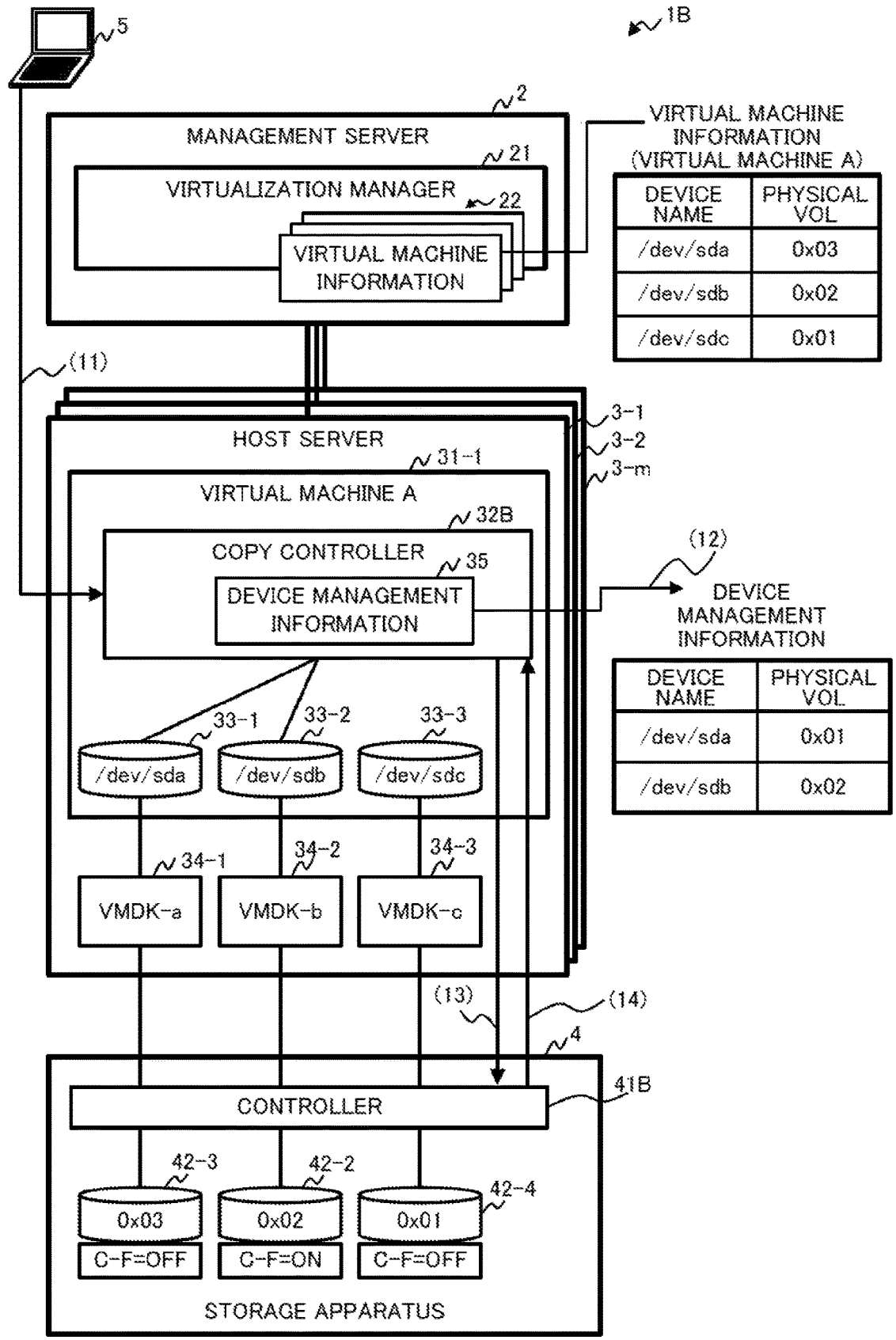
FIG. 46 is a diagram illustrating the exemplary operation (1) when a copy operation is continued after storage migration processing and volume creation processing are executed.

After the storage migration processing depicted in FIG. 44 (after the execution of Processing T115 in FIG. 43), as depicted in FIG. 45, the terminal apparatus 5 sends the copy controller 32B a copy instruction from the device with the device name "/dev/sda" to the device with the device name "/dev/sdb" (Processing T116; refer to the arrow (11) in FIG. 46). The copy controller 32B initiates a copy control (Processing T117), and obtains the relationship information in the copy control (Processing T118, Processing A3).

In Processing T118, since the devices of "/dev/sda" and "/dev/sdb" that are designated in the copy instruction are both present in the device management information 35, the relationship information is obtained from the device management information 35 (refer to the arrow (12) in FIG. 46).

The copy controller 32B then, based on the relationship information obtained from the device management information 35, sends a copy instruction from the physical volume with the volume number "0x01" to the physical volume with the volume number "0x02", to the controller 41B in the storage apparatus 4 (Processing T119; refer to the arrow (13) in FIG. 46).

The controller 41B executes the copy processing for the designated devices (Processing T120, Processing B5). Since the control flag for the physical volume 42-1 ("0x01") designated as the copy source, however, is "OFF", Step S53 in FIG. 32 is determined as negative ("No") and an error response indicating that the control flag is "OFF" is sent from the controller 41B to the copy controller 32B (Processing T121; refer to the arrow (14) in FIG. 46).

The information obtainment unit 38B in the copy controller 32B executes the copy error processing based on the error response from the controller 41B (Processing T122, Processing A4). In the copy error processing, since the error response received from the controller 41B indicates the "'C–F=OFF' error", Step S61 in FIG. 33 is determined as affirmative ("Yes").

Figure 47:
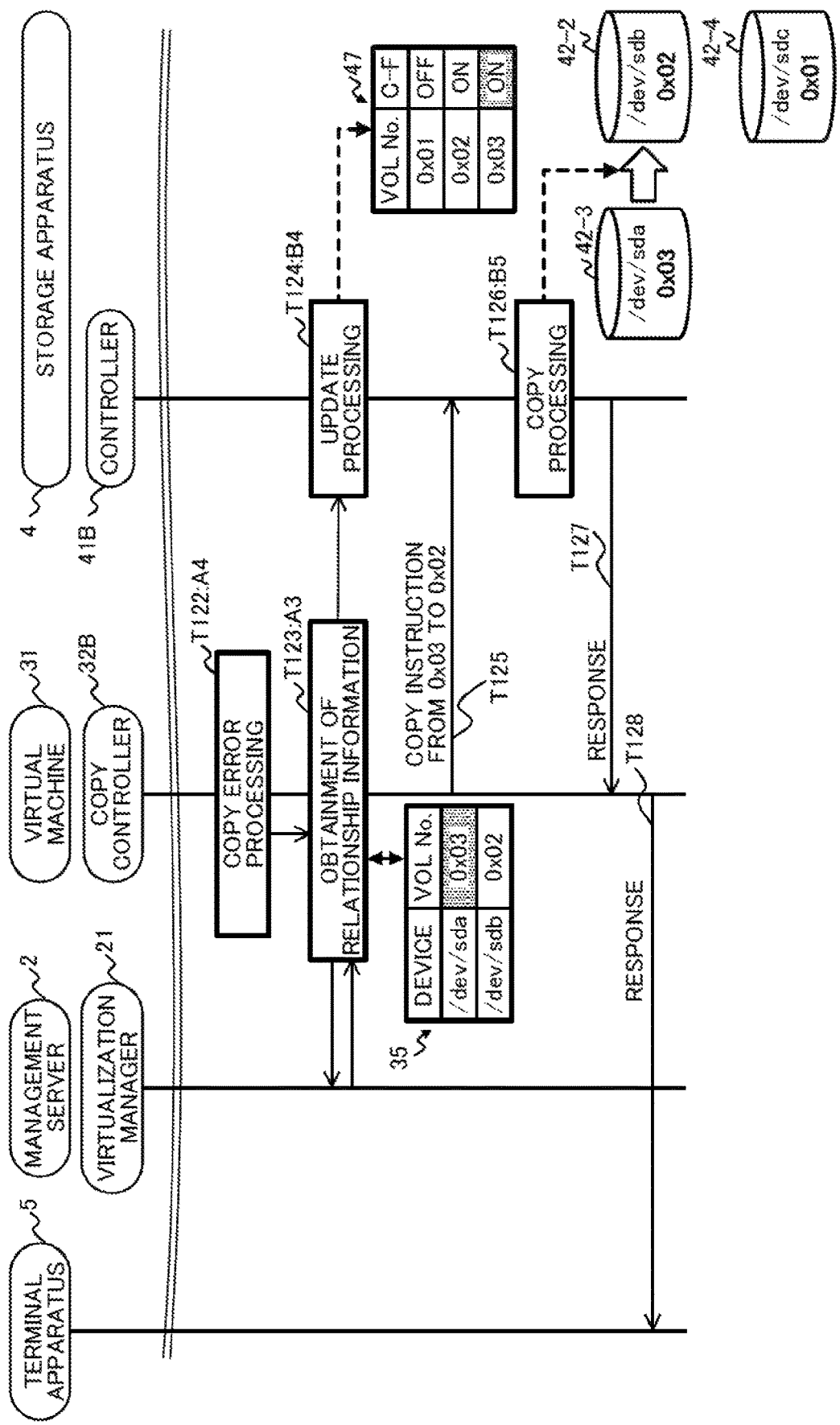
FIG. 47 is a sequence diagram depicting an exemplary operation (2) when a copy operation is continued after storage migration processing and volume creation processing are executed.

Hence, as depicted in FIG. 47, the information obtainment unit 38B executes the obtainment processing of the relationship information (Processing T123, Processing A3).

Figure 48:
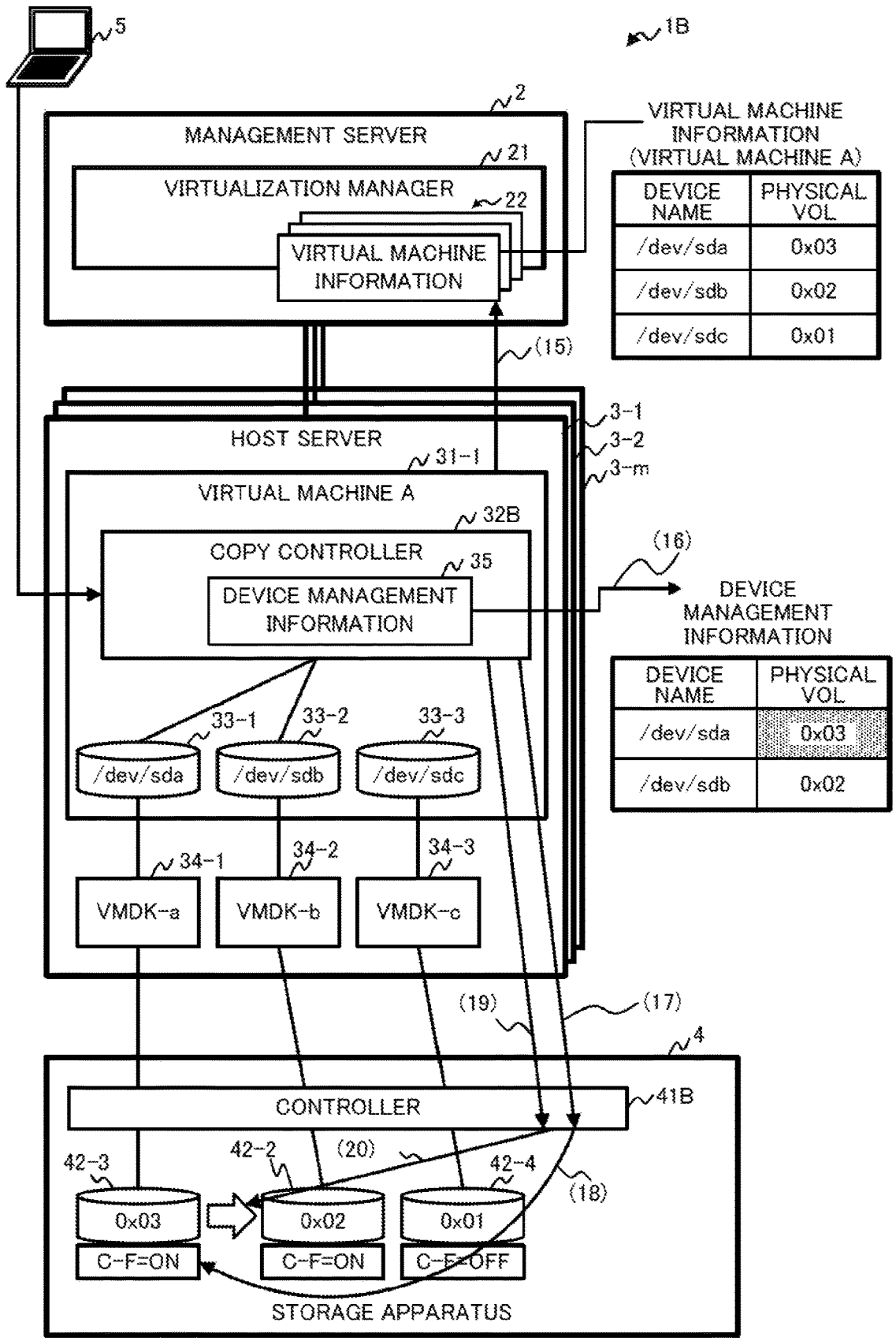
FIG. 48 is a diagram illustrating the exemplary operation (2) when a copy operation is continued after storage migration processing and volume creation processing are executed.

The information obtainment unit 38B obtains the relationship information from the virtualization manager 21 in the obtainment processing (refer to the arrow (15) in FIG. 48), and updates the device management information 35 (refer to the arrow (16) in FIG. 48). The information obtainment unit 38B also causes the controller 41B to set the control flag for the volume number "0x03", which is placed under the management of the copy controller 32B, to "ON" (refer to the arrow (17) in FIG. 48).

The controller 41B, in response to the update instruction of the control flag from the information obtainment unit 38B, executes the update processing for setting the control flag of the volume number "0x03" to "ON" (Processing T124, Processing B4; refer to the arrow (18) in FIG. 48).

Further, in the copy controller 32B, the copy unit 36 sends a copy instruction from the physical volume with the volume number "0x03 to the physical volume with the volume number "0x02" to the controller 41B, based on the updated device management information 35 (Processing T125; refer to the arrow (19) in FIG. 48).

The copy processing unit 45B in the controller 41B executes the copy processing from the designated physical volume with the volume number "0x03 to the physical volume with the volume number "0x02" (Processing T126, Processing B5; refer to the arrow (20) in FIG. 48), and sends a success response to the copy controller 32B (Processing T127).

In response to receiving the success response from the controller 41B, the copy controller 32B sends a success response to the terminal apparatus 5 (Processing T127), and the processing ends.

As described above, in copy processing after storage migration processing and volume creation processing are executed, the copy controller 32B identifies the physical volume number from the device management information 35 on the virtual machine 31, and sends a copy instruction from the physical volume with the volume number "0x01" to the physical volume with the volume number "0x02". However, since the volume number "0x01" has been used for the newly created physical volume 42, the control flag is "OFF".

When a copy request for a physical volume 42 with the control flag "OFF" is received from the copy controller 32B, the storage apparatus 4 returns a control flag error (new volume error).

Similar to the case wherein an error response indicating that a device is not present is received, when an error response of a control flag is received, the copy controller 32B reconstructs a relationship between the device and the physical volume 42. The copy controller 32B then places the physical volume 42 of which the device management information 35 has been updated, under the management of the copy controller 32B (controls it by setting its control flag to "ON"), and requests a copy to the controller 41B once again.

Accordingly, in accordance with the information processing system 1B according to the second embodiment, in the storage apparatus 4, the above-described failure (b) can be avoided wherein a different volume is copied.

As set forth above, similar to the first embodiment, in the information processing system 1B, since the relationship information indicating relations between virtual devices and the physical volumes 42 is stored in the memory unit 37 in the virtual machine 31, advantageous effects similar to those of the first embodiment are achieved.

Further, similar to the information processing system 1A, in the information processing system 1B, a copy of data is executed using the copy function of the storage apparatus 4. In the copy processing, disk information on the storage apparatus 4 is used for a copy instruction.

However, the relation between devices (e.g., the C drive and the D drive) visible from work servers (e.g., the virtual machines 31) and disk areas (e.g., addresses) on the storage apparatus 4 may be changed while operations continue. The triggers of such changes include expansion of disk areas for overcoming shortage of disk spaces and a data migration due to a disk failure.

Hence, processing of matching devices visible from the work servers with the disks on the storage apparatus 4 is to be executed, and the processing may prolong the backup time.

Thus, the second embodiment provides a mechanism to detect a modification in the relationship information. The copy controller 32B obtains the relationship information once again in response to the modification to the relationship information to update the device management information 35.

In this configuration, when the relationship between the virtual machines 31 and the physical volumes 42 is modified due to a storage migration and the like, the copy controller 32B can maintain the integrity of (e.g., correct) the relationship information based on a result of whether a copy is possible or not from the storage apparatus 4.

Note that the information processing system 1B is a system for a backup of business data, for example, and it is assumed that backups are carried out in regular intervals. In contrast, modifications to the relationship information are not so frequently. Thus, the frequency of updates of the device management information 35 can be reduced as compare to the frequency of copy processing, and accordingly the update processing of the relationship information has only a small impact on the processing time of copies.

<5> Miscellaneous

The techniques according to the first and second embodiments may be practiced in modifications and variations as follows.

Figure 7:
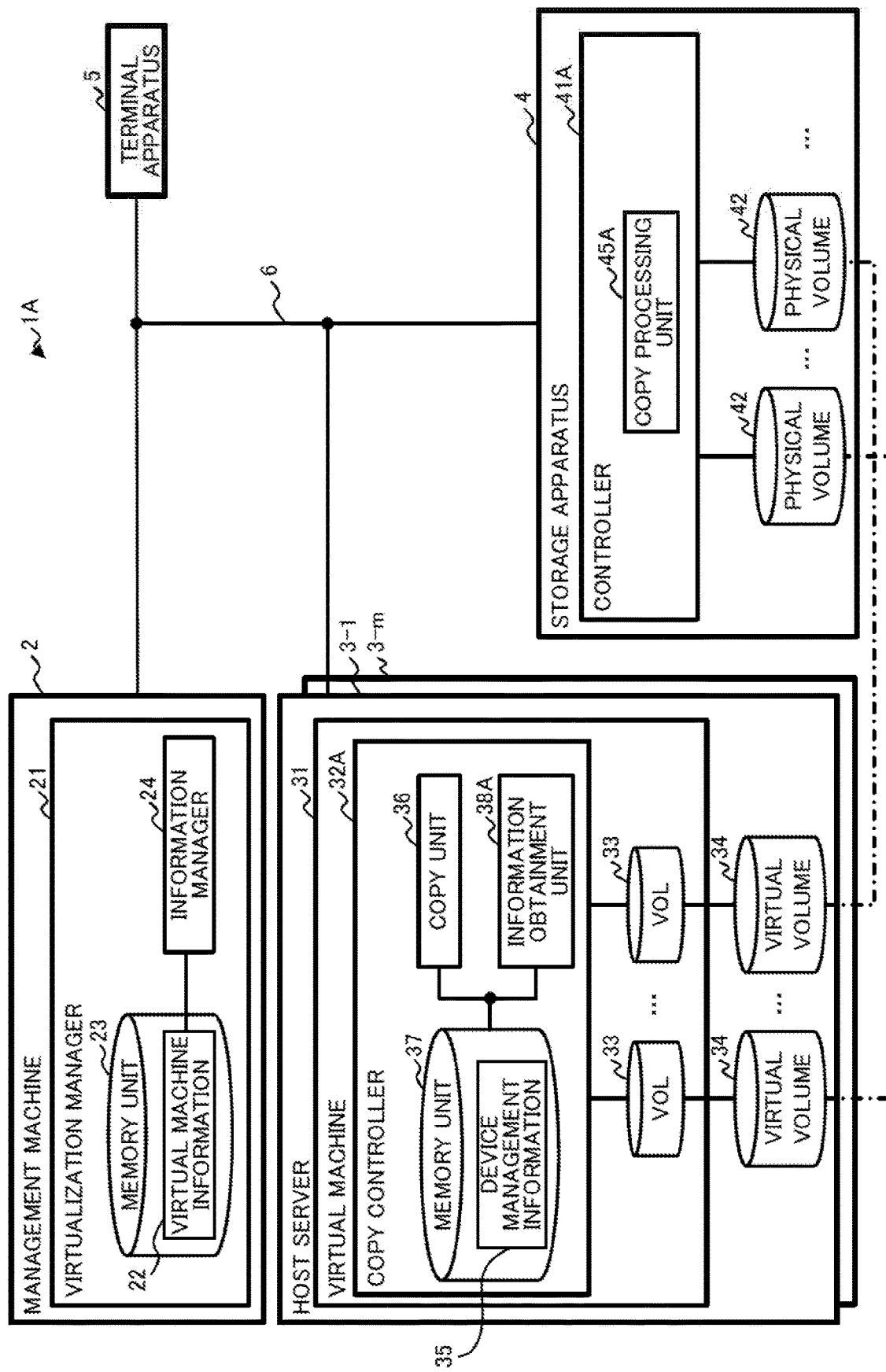
FIG. 7 is a block diagram depicting an exemplary functional configuration of the information processing system according to the first embodiment.

For example, the function blocks of the information processing system 1 depicted in FIG. 7 or FIG. 24 may be combined in any combinations, or may be divided.

Further, while the physical volumes 42 associated with the volumes 33 of a virtual machine 31 are located in the single storage apparatus 4 in the first and second embodiments, this is not limiting. For example, multiple physical volumes 42 associated with respective multiple volumes 33 of a virtual machine 31 may be located in multiple storage apparatus 4 in a distributed manner.

Note that the virtualization manager 21 may be executed on the OS on the management server 2, or may be executed on a virtual OS running on a virtual machine when the management server 2 executes the virtual machine. Alternatively, the virtualization manager 21 may be provided to a virtual machine 31 provided by the host server 3, and may be executed on a virtual OS running on that virtual machine 31.

Further, while the functions of the virtual machines 31 have been described focusing on one virtual machine 31 (e.g., the virtual machine 31-1) executed on the host server 3 in the first and second embodiments, the functions may be provided to every virtual machines 31 executed on the host server 3.

In one aspect, the processing time for copying a virtual volume can be reduced.

All examples and conditional language recited provided herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus comprising:
a memory configured to store a management information; and
a processor coupled to the memory, the processor being configured to:
obtain information on one or more relations between virtual volumes used by a virtual machine and physical volumes provided in a storage apparatus from a management machine configured to manage allocations of the virtual volumes to the physical volumes;
store the obtained information on the one or more relations into the management information stored in the memory;
in response to receiving a copy request, determine whether or not information on a first virtual volume designated as a copy participant in the copy request is present in the management information;
obtain information on a first physical volume allocated to the first virtual volume from the management information when the information on the first virtual volume is present in the management information, and send the storage apparatus a copy instruction designating the first physical volume as the copy participant;
obtain the information on the one or more relations from the management machine when the information on the first virtual volume is not present in the management information, and update the management information; and
in response to receiving, from the storage apparatus, a first response indicating that the first physical volume designated in the copy instruction is not present in the storage apparatus, obtain the information on the one or more relations from the management machine, and update the management information stored in the memory.

2. The information processing apparatus according to claim 1, wherein the processor is further configured to:
issue, to the storage apparatus, an instruction for changing control information indicating a validity of the management information stored in the memory, the control information being stored in the storage apparatus;
and in response to receiving, from the storage apparatus, a second response indicating that information on the first physical volume designated in the copy instruction is invalid based on the control information, obtain the information on the one or more relations from the management machine, and update the management information stored in the memory.

3. The information processing apparatus according to claim 2, wherein the control information contains one state indicator for each of the physical volumes provided in the storage apparatus, each of the state indicator indicating valid state or invalid state,
when one of the physical volumes is configured by the storage apparatus, the control information is set to indicate that a state indicator of the one state indicator for each of the physical volumes, corresponding to the one of the physical volumes which is configured, is invalid state, the processor is further configured to:
issue, to the storage apparatus, the instruction for setting the control information to indicate that a state indicator of the one state indicator for each of the physical volumes, corresponding to one of the physical volumes contained in the information on the one or more relations obtained from the management machine, is valid state,
and the second response is a response indicating that a state indicator of the one state indicator for each of the physical volumes, corresponding to the first physical volume designated in the copy instruction, is invalid state in the control information.

4. The information processing apparatus according to claim 1, wherein the processor is further configured to obtain information on a second physical volume allocated to the first virtual volume from the updated management information, and send the storage apparatus a copy instruction designating the second physical volume as a copy participant.

5. A storage apparatus comprising:
a plurality of physical volumes;
a controller configured to control the physical volumes, the controller comprising a memory and a processor coupled to the memory, the processor being configured to:
manage control information indicating a validity of management information stored in a virtual machine;
in response to receiving a copy instruction from the virtual machine, execute a copy of a physical volume of the physical volumes designated as a copy participant in the copy instruction;
the management information is information on one or more relations between virtual volumes used by the virtual machine and the physical volumes, and is obtained from a management machine to the virtual machine, the management machine being configured to manage allocations of virtual volumes to the physical volumes,
the copy instruction designates, as the copy participant, the physical volume that is obtained by the virtual machine by converting a virtual volume of the copy participant based on the management information,
the control information contains one state indicator for each of the physical volumes, each of the state indicator indicating valid state or invalid state, and the processor is configured to:
set the control information to indicate that a state indicator of the one state indicator for each of the physical volumes, corresponding to the physical volume of the physical volumes designated under a control from an information processing apparatus configured to execute the virtual machine, is valid state;
when one of the physical volumes is configured, set the control information to indicate that a state indicator of the one state indicator for each of the physical volumes, corresponding to the one of the physical volumes which is configured, is invalid state;
and when a state indicator of the one state indicator for each of the physical volumes, corresponding to the physical volume of the physical volumes designated in the copy instruction, is invalid state based on the control information, send the information processing apparatus a response indicating that the state indicator corresponding to the physical volume of the physical volumes designated in the copy instruction is invalid state, the response causing the information processing apparatus to obtain the management information on the one or more relations from the management machine, and to update the management information stored in the information processing apparatus.

6. An information processing system comprising:
an information processing apparatus configured to execute a virtual machine;
a storage apparatus comprising physical volumes;
a management machine configured to manage allocations of the physical volumes to virtual volumes used by the virtual machine, and store information on one or more relations between the virtual volumes and the physical volumes,
the information processing apparatus is configured to:
in response to receiving a copy request, determine whether or not information on a first virtual volume designated as a copy participant in the copy request is present in management information in a memory; and
send the management machine an obtainment request for the information on the one or more relations when the information on the first virtual volume is not present in the management information,
the management machine is configured to:
in response to the obtainment request, send the information processing apparatus the information on the one or more relations,
the information processing apparatus is configured to:
store, in the management information, the information on the one or more relations obtained from the management machine;
obtain information on a first physical volume allocated to the first virtual volume from the management information when the information on the first virtual volume is present in the management information; and
send the storage apparatus a copy instruction designating the first physical volume as the copy participant, and
the storage apparatus is configured to:
in response to receiving the copy instruction from the information processing apparatus, execute a copy of the first physical volume designated as the copy participant in the copy instruction; and
the storage apparatus is further configured to:
send the information processing apparatus a first response indicating that the first physical volume is not present in the storage apparatus when the first physical volume designated in the copy instruction is not present in the storage apparatus, and
the information processing apparatus is further configured to:
in response to receiving the first response, obtain the information on the one or more relations from the management machine, and update the management information stored in the memory.

7. The information processing system according to claim 6, wherein the storage apparatus is further configured to:
store control information indicating a validity of the management information; and
send the information processing apparatus a second response indicating that information on the first physical volume is invalid when the information on the first physical volume designated in the copy instruction is invalid based on the control information, and the information processing apparatus is further configured to:

in response to receiving the second response from the storage apparatus, obtain the information on the one or more relations from the management machine, and update the management information stored in the memory.

8. The information processing system according to claim 7, wherein the control information contains one state indicator for each of the physical volumes provided in the storage apparatus, each of the state indicator indicating valid state or invalid state, when one of the physical volumes is configured by the storage apparatus, the control information is set to indicate that a state indicator of the one state indicator for each of the physical volumes, corresponding to the one of the physical volumes which is configured, is invalid state, the information processing apparatus is further configured to:

issue, to the storage apparatus, an instruction for setting the control information to indicate that a state indicator of the one state indicator for each of the physical volume, corresponding to one of the physical volumes contained in the information on the one or more relations obtained from the management machine, is valid state, and the second response is a response indicating that a state indicator of the one state indicator for each of the physical volumes, corresponding to the first physical volume designated in the copy instruction, is invalid state in the control information.

9. The information processing system according to claim 6, wherein the information processing apparatus is further configured to obtain information on a second physical volume allocated to the first virtual volume from the updated management information, and send the storage apparatus a copy instruction designating the second physical volume as a copy participant.

10. An information processing apparatus comprising:
a memory configured to store a management information; and
a processor coupled to the memory, the processor being configured to:
obtain information on one or more relations between virtual volumes used by a virtual machine and physical volumes provided in a storage apparatus from a management machine configured to manage allocations of the virtual volumes to the physical volumes;
store the obtained information on the one or more relations into the management information stored in the memory;
in response to receiving a copy request, determine whether or not information on a first virtual volume designated as a copy participant in the copy request is present in the management information;
obtain information on a first physical volume allocated to the first virtual volume from the management information when the information on the first virtual volume is present in the management information, and send the storage apparatus a copy instruction designating the first physical volume as the copy participant;
obtain the information on the one or more relations from the management machine when the information on the first virtual volume is not present in the management information, and update the management information;
issue, to the storage apparatus, an instruction for changing a state of control information indicating a validity of the management information stored in the memory, the control information being stored in the storage apparatus; and
in response to receiving, from the storage apparatus, a second response indicating that information on the first physical volume designated in the copy instruction is invalid based on the control information, obtain the information on the one or more relations from the management machine, and update the management information stored in the memory.

* * * * *